(12) United States Patent
Baek et al.

(10) Patent No.: US 9,917,720 B2
(45) Date of Patent: Mar. 13, 2018

(54) APPARATUS FOR TRANSMITTING BROADCAST SIGNALS, APPARATUS FOR RECEIVING BROADCAST SIGNALS, METHOD FOR TRANSMITTING BROADCAST SIGNALS AND METHOD FOR RECEIVING BROADCAST SIGNALS

(71) Applicant: LG ELECTRONICS INC., Seoul (KR)

(72) Inventors: Jongseob Baek, Seoul (KR); Woosuk Ko, Seoul (KR); Sungryong Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/687,014

(22) Filed: Aug. 25, 2017

(65) Prior Publication Data

US 2017/0353339 A1    Dec. 7, 2017

Related U.S. Application Data

(63) Continuation of application No. 15/485,012, filed on Apr. 11, 2017, now Pat. No. 9,787,516, which is a
(Continued)

(51) Int. Cl.
*H04L 27/06* (2006.01)
*H04L 27/26* (2006.01)
(Continued)

(52) U.S. Cl.
CPC .......... *H04L 27/265* (2013.01); *H04L 1/0045* (2013.01); *H04L 1/0071* (2013.01); *H04L 5/0007* (2013.01)

(58) Field of Classification Search
USPC .......................................... 375/260, 26, 208
See application file for complete search history.

(56) References Cited

U.S. PATENT DOCUMENTS

| 5,241,385 A | 8/1993 | Halozan |
| 6,289,000 B1 | 9/2001 | Yonge |

(Continued)

FOREIGN PATENT DOCUMENTS

| EP | 2536133 A2 * 12/2012 ........... H04L 5/0023 |
| KR | 10-2013-0122756 A  11/2013 |

(Continued)

OTHER PUBLICATIONS

Translation of International Search Report and Written Opinion from PCT/KR2015/008875, dated Dec. 9, 2015.
(Continued)

*Primary Examiner* — Wednel Cadeau
(74) *Attorney, Agent, or Firm* — Dentons US LLP

(57) ABSTRACT

A method and an apparatus for receiving broadcast signals thereof are disclosed. The apparatus for receiving broadcast signals, the apparatus comprises a receiver to receive the broadcast signals, a demodulator to perform demodulation on the received broadcast signals by an OFDM (Orthogonal Frequency Division Multiplex) scheme, a frequency de-interleaver to frequency de-interleave the demodulated broadcast signals by using a different interleaving sequence, wherein the different interleaving sequence is used for data corresponding to an OFDM symbol pair or data corresponding to an OFDM symbol according to an FFT size of the demodulation, a frame parser to parse at least one signal frame from the frequency de-interleaved broadcast signals and a decoder to decode service data in the parsed at least one signal frame.

4 Claims, 69 Drawing Sheets

Related U.S. Application Data continuation of application No. 14/863,899, filed on Sep. 24, 2015, now Pat. No. 9,667,461.

(60) Provisional application No. 62/112,650, filed on Feb. 6, 2015, provisional application No. 62/120,338, filed on Feb. 24, 2015, provisional application No. 62/133,482, filed on Mar. 16, 2015, provisional application No. 62/152,038, filed on Apr. 24, 2015.

(51) Int. Cl.
*H04L 5/00* (2006.01)
*H04L 1/00* (2006.01)

(56) References Cited

U.S. PATENT DOCUMENTS

| | | | |
|---|---|---|---|
| 9,246,635 | B2 | 1/2016 | Baek et al. |
| 9,565,044 | B2 | 2/2017 | Lee et al. |
| 2004/0093545 | A1 | 5/2004 | Khandani et al. |
| 2006/0062314 | A1* | 3/2006 | Palin .......... H04L 27/2626 375/260 |
| 2008/0144733 | A1 | 6/2008 | ElGamal et al. |
| 2009/0103649 | A1 | 4/2009 | Vare et al. |
| 2009/0296840 | A1 | 12/2009 | Atungsiri et al. |
| 2010/0309969 | A1 | 12/2010 | Kim et al. |
| 2010/0316110 | A1 | 12/2010 | Choi et al. |
| 2011/0085487 | A1 | 4/2011 | Song et al. |
| 2011/0107176 | A1 | 5/2011 | Song et al. |
| 2012/0002739 | A1 | 1/2012 | Peron |
| 2012/0099660 | A1 | 4/2012 | Mun et al. |
| 2012/0189079 | A1 | 7/2012 | Taylor et al. |
| 2014/0105328 | A1 | 4/2014 | Ko et al. |
| 2015/0049828 | A1 | 2/2015 | Baek et al. |
| 2015/0049837 | A1 | 2/2015 | Baek et al. |
| 2015/0078477 | A1 | 3/2015 | Hong et al. |
| 2015/0139353 | A1 | 5/2015 | Baek et al. |
| 2015/0146804 | A1 | 5/2015 | Baek et al. |
| 2015/0155975 | A1 | 6/2015 | Baek et al. |
| 2016/0373213 | A1 | 12/2016 | Baek et al. |

FOREIGN PATENT DOCUMENTS

| | | |
|---|---|---|
| WO | 2012/070837 A2 | 5/2012 |
| WO | 2014/171673 A1 | 10/2014 |
| WO | 2014/193160 A1 | 12/2014 |
| WO | 2015/005604 A1 | 1/2015 |

OTHER PUBLICATIONS

Translation of International Search Report and Written Opinion from PCT/KR2015/009104, dated Dec. 15, 2015.
Information Disclosure Form SB08 for U.S. Appl. No. 14/848,651.

\* cited by examiner

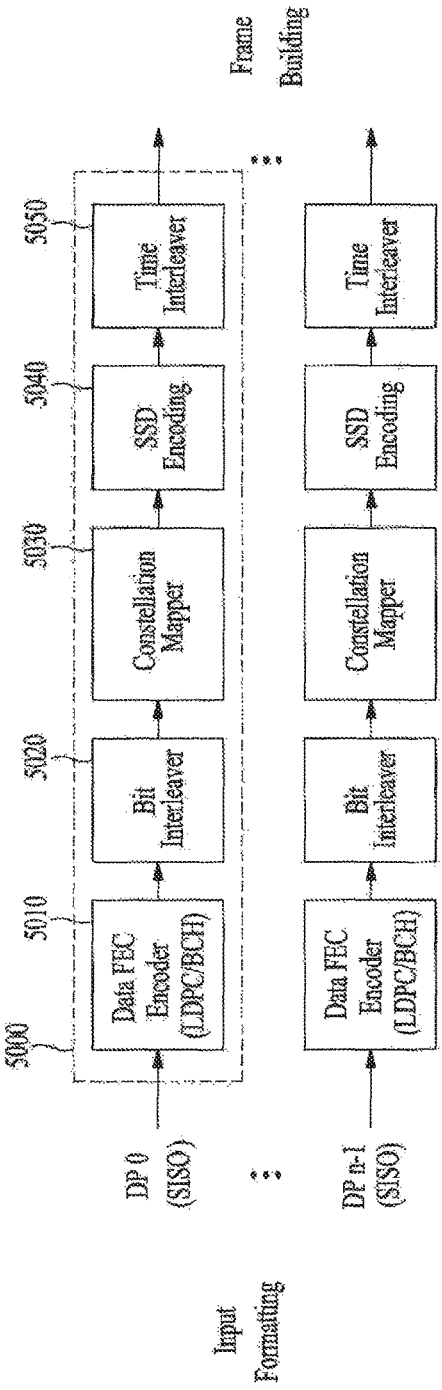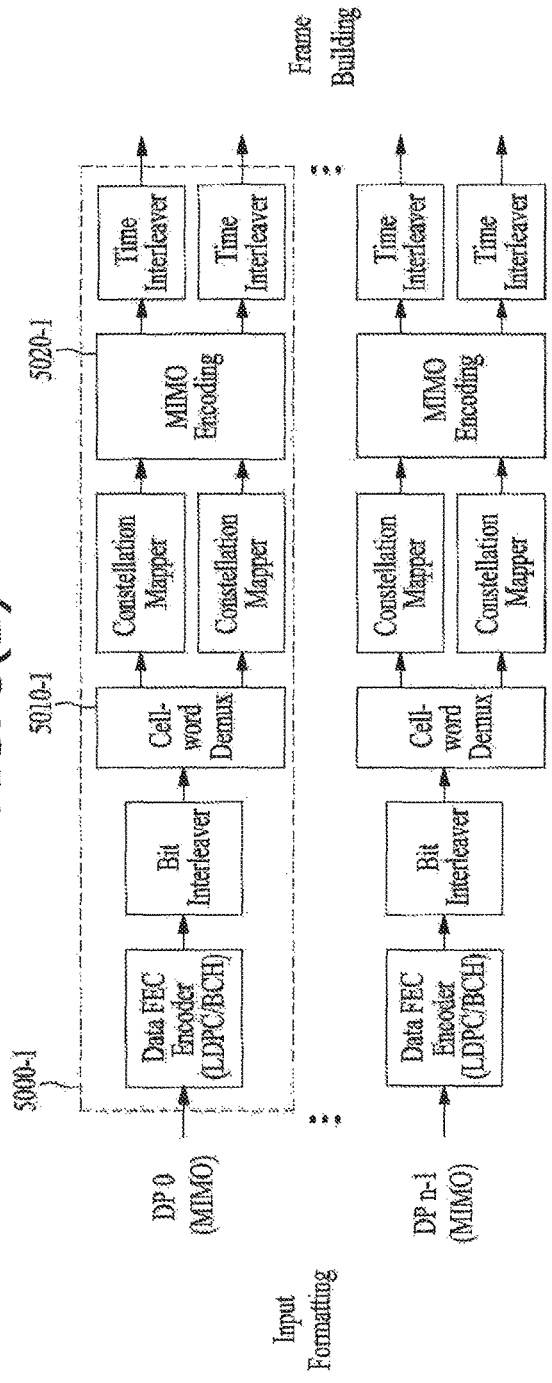

| Content | Bits |
|---|---|
| PHY_PROFILE | 3 |
| FFT_SIZE | 2 |
| GI_FRACTION | 3 |
| EAC_FLAG | 1 |
| PILOT_MODE | 1 |
| PAPR_FLAG | 1 |
| FRU_CONFIGURE | 3 |
| RESERVED | 7 |

FIG. 13

| Content | Bits |
|---|---|
| PREAMBLE_DATA | 20 |
| NUM_FRAME_FRU | 2 |
| PAYLOAD_TYPE | 3 |
| NUM_FSS | 2 |
| SYSTEM_VERSION | 8 |
| CELL_ID | 16 |
| NETWORK_ID | 16 |
| SYSTEM_ID | 16 |
| for i = 0:3<br>    FRU_PHY_PROFILE<br>    FRU_FRAME_LENGTH<br>    FRU_GI_FRACTION<br>    RESERVED<br>end | <br>3<br>2<br>3<br>4 |
| PLS2_FEC_TYPE | 2 |
| PLS2_MOD | 3 |
| PLS2_SIZE_CELL | 15 |
| PLS2_STAT_SIZE_BIT | 14 |
| PLS2_SYN_SIZE_BIT | 14 |
| PLS2_REP_FLAG | 1 |
| PLS2_REP_SIZE_CELL | 15 |
| PLS2_NEXT_FEC_TYPE | 2 |
| PLS2_NEXT_MODE | 3 |
| PLS2_NEXT_REP_FLAG | 1 |
| PLS2_NEXT_REP_SIZE_CELL | 15 |
| PLS2_NEXT_REP_STAT_SIZE_BIT | 14 |
| PLS2_NEXT_REP_DYN_SIZE_BIT | 14 |
| PLS2_AP_MODE | 2 |
| PLS2_AP_SIZE_CELL | 15 |
| PLS2_NEXT_AP_MODE | 2 |
| PLS2_NEXT_AP_SIZE_CELL | 15 |
| RESERVED | 32 |
| CRC 32 | 32 |

FIG. 14

| Content | Bits |
|---|---|
| FIC_FLAG | 1 |
| AUX_FLAG | 1 |
| NUM_DP | 6 |
| for i = 1: NUM_DP | |
|     DP_ID | 6 |
|     DP_TYPE | 3 |
|     DP_GROUP_ID | 8 |
|     BASE_DP_ID | 6 |
|     DP_FEC_TYPE | 2 |
|     DP_COD | 4 |
|     DP_MOD | 4 |
|     DP_SSD_FLAG | 1 |
|     if PHY_PROFILE == '010' | |
|         DP_MIMO | 3 |
|     end | |
|     DP_TI_TYPE | 1 |
|     DP_TI_LENGTH | 2 |
|     DP_TI_BYPASS | 1 |
|     DP_FRAME_INTERVAL | 2 |
|     DP_FIRST_FRAME_IDX | 5 |
|     DP_NUM_BLOCK_MAX | 10 |
|     DP_PAYLOAD_TYPE | 2 |
|     DP_INBAND_MODE | 2 |
|     DP_PROTOCOL_TYPE | 2 |
|     DP_CRC_MODE | 2 |
|     if DP_PAYLOAD_TYPE == TS('00') | |
|         DNP_MODE | 2 |
|         ISSY_MODE | 2 |
|         HC_MODE_TS | 2 |
|         if HC_MODE_TS == '01' or '10' | |
|             PID | 13 |
|         end | |
|     if DP_PAYLOAD_TYPE == IP('01') | |
|         HC_MODE_IP | 2 |
|     end | |
|     RESERVED | 8 |
| end | |
| if FIC_FLAG == 1 | |
|     FIC_VERSION | 8 |
|     FIC_LENGTH_BYTE | 13 |
|     RESERVED | 8 |
| end | |
| if AUX_FLAG == 1 | |
|     NUM_AUX | 4 |
|     AUX_CONFIG_RFU | 8 |
|     for - 1: NUM_AUX | |
|         AUX_STREAM_TYPE | 4 |
|         AUX_PRIVATE_CONF | 28 |
|     end | |
| end | |

| Content | Bit |
|---|---|
| FRAME_INDEX | 5 |
| PLS_CHANGE_COUNTER | 4 |
| FIC_CHANGE_COUNTER | 4 |
| RESERVED | 16 |
| for i = 1: NUM_DP | |
|     DP_ID | 6 |
|     DP_START | 15 (or 13) |
|     DP_NUM_BLOCK | 10 |
|     RESERVED | 8 |
| end | |
| EAC_FLAG | 1 |
| EAS_WAKE_UP_VERSION_NUM | 8 |
| if EAC_FLAG == 1 | |
|     EAC_LENGTH_BYTE | 12 |
| else | |
|     EAC_COUNTER | 12 |
| end | |
| for i=1:NUM_AUX | |
|     AUX_PRIVATE_DYN | 48 |
| end | |
| CRC 32 | 32 |

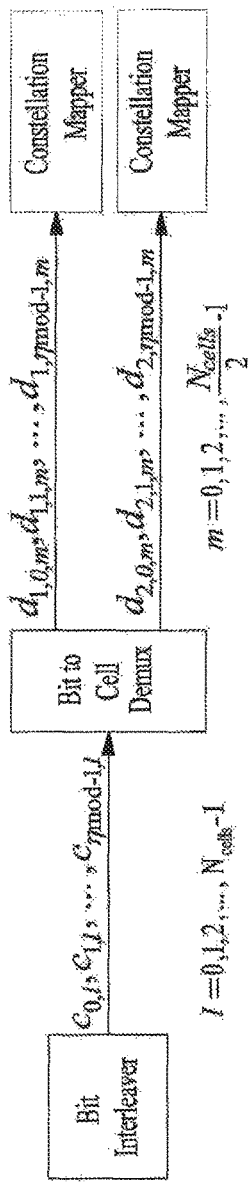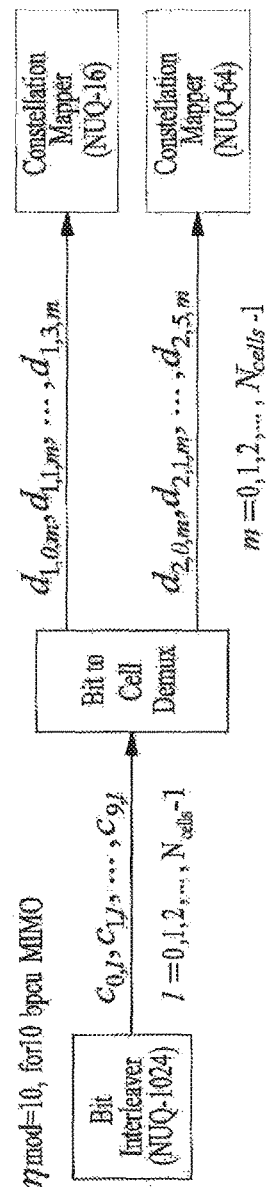
FIG. 24(A)
FIG. 24(B)

Deinterleaving seeds corresponding to interleaving seeds

FIG. 33

○ For the first OFDM symbol, i.e., (j mod 2) = 0 of the ith OFDM symbol pair for $j = 0, 1, ..., N_{sym}$ and for $k = 0, 1, ..., N_{max}$, $F_j(H_j(k)) = X_j(k)$ where $H_j(k) = (T(k) + S_{\lfloor j/2 \rfloor}) \mod N_{max}$ $T(k)$ : is a random sequence generated by a random generator, used in the main FI $S_{\lfloor j/2 \rfloor}$ : is a random symbol offset generated by a random symbol-offset generator, used in the jth OFDM symbol pair ○ For the second OFDM symbol, i.e., (j mod 2) = 1 of the ith OFDM symbol pair for $j = 0, 1, ..., N_{sym}$ and $k = 0, 1, ..., N_{max}$ $F_j(k) = X_j(H_j(k))$ where $H_j(k)$ is the same random sequence used for the first symbol

FIG. 34(A)

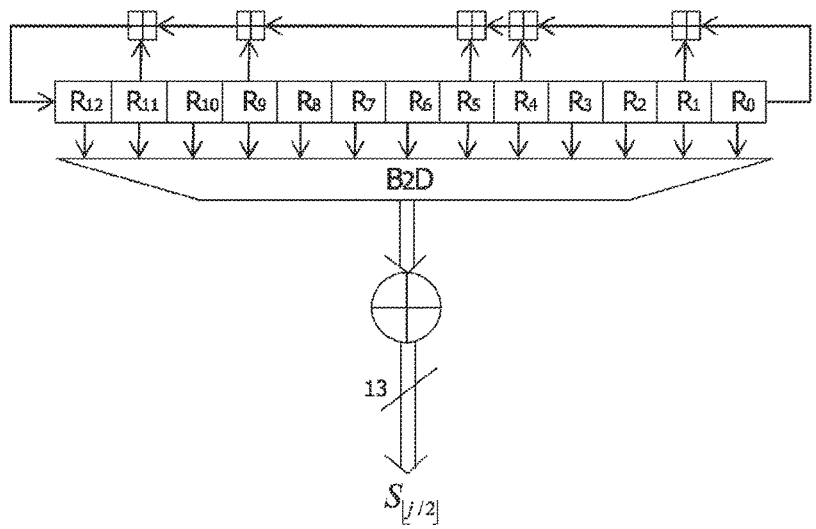

FIG. 34(B)

The associated 13$^{th}$ primitive polynomial,
$f(x) = 1 + x^2 + x^4 + x^8 + x^9 + x^{12} + x^{13}$
Operation of the PN generator for $0 \leq n < \lfloor N_{sym}/2 \rfloor$ $n = 0$
$\quad R^0_{[12,11,10,9,8,7,6,5,4,3,2,1,0]} = 0,0,0,0,0,0,0,0,0,0,0,0,0$
$n = 1$
$\quad R^1_{[12,11,10,9,8,7,6,5,4,3,2,1,0]} = 1,1,1,1,1,1,1,1,1,1,1,1,1$
$1 < n < \lfloor N_{sym}/2 \rfloor$
$\quad R^n_{[11,10,9,8,7,6,5,4,3,2,1,0]} = R^{n-1}_{[12,11,10,9,8,7,6,5,4,3,2,1]}$
$\quad R^n_{12} = R^{n-1}_0 \oplus R^{n-1}_1 \oplus R^{n-1}_4 \oplus R^{n-1}_5 \oplus R^{n-1}_9 \oplus R^{n-1}_{11}$ $$\text{for } (n=0; n < \lfloor \frac{N_{sym}}{2} \rfloor; n = n+1)$$
$$\{$$
$$S_n = \sum_{m=0}^{12}(2^m \times R^n_m);$$
$$\}$$

The associated 11$^{th}$ primitive polynomial, $f(x)=1+x^9+x^{11}$
Operation of the PN generator for $0 \leq n < \lfloor N_{sym}/2 \rfloor$

FIG. 37

The associated 12$^{th}$ primitive polynomial, $f(x)=1+x^6+x^8+x^{11}+x^{12}$
Operation of the PN generator for $0 \leq l < N_{max}$ (8192)

$0 \leq l < 2$ $\quad R^l_{[11,10,9,8,7,6,5,4,3,2,1,0]} = 0,0,0,0,0,0,0,0,0,0,0,0$ $l = 2$ $\quad R^2_{[11,10,9,8,7,6,5,4,3,2,1,0]} = 0,0,0,0,0,0,0,0,0,0,0,1$ $2 < l < N_{max}$ $\quad R^l_{[10,9,8,7,6,5,4,3,2,1,0]} = R^{l-1}_{[11,10,9,8,7,6,5,4,3,2,1]}$ $\quad R^l_{11} = R^{l-1}_0 \oplus R^{l-1}_1 \oplus R^{l-1}_4 \oplus R^{l-1}_6$

---

$k = 0;$ $for \ (l=0; l<N_{max}; l=l+1)$ $\{$ $\quad T(l) = P_{data}(l) + \sum_{n=0}^{11}(2^n \times R^l_n);$ $\quad C_j(l) = (T(l) + S_{\lfloor l/2 \rfloor}) \bmod N_{max}$ $\quad if \ C_j(l) < N_{data}$ $\quad \quad \{$ $\quad \quad \quad H_j(k) = C_j(l);$ $\quad \quad \quad k = k+1;$ $\quad \quad \}$ $\}$

FIG. 40(a)

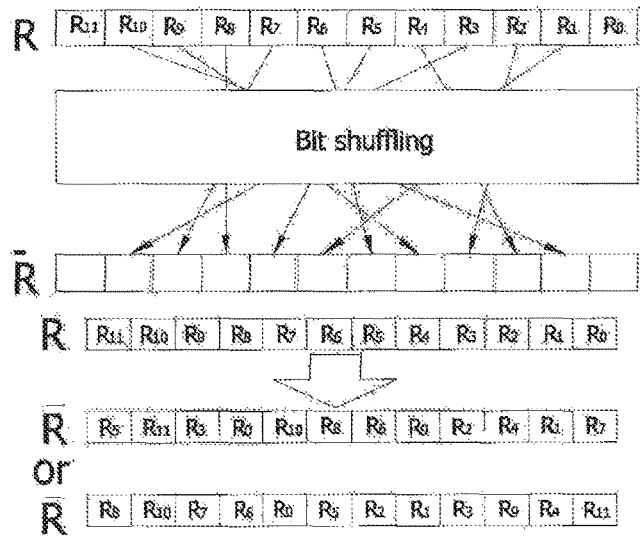

FIG. 40(b)

The associated 12$^{th}$ primitive polynomial, $f(x)=1+x^6+x^8+x^{11}+x^{12}$

Operation of the PN generator for $0 \leq l < N_{max}(8192)$ $0 \leq l < 2$
$\quad R^l_{[11,10,9,8,7,6,5,4,3,2,1,0]} = 0,0,0,0,0,0,0,0,0,0,0,0$
$l = 2$
$\quad R^2_{[11,10,9,8,7,6,5,4,3,2,1,0]} = 0,0,0,0,0,0,0,0,0,0,0,1$
$2 < l < N_{max}$
$\quad R^l_{[10,9,8,7,6,5,4,3,2,1,0]} = R^{l-1}_{[11,10,9,8,7,6,5,4,3,2,1]}$
$\quad R^l_{11} = R^{l-1}_0 \oplus R^{l-1}_1 \oplus R^{l-1}_4 \oplus R^{l-1}_6$ $k=0;\ \bar{R}^l_n \gets R^l_n$ (bit shuffling)
for $(l=0; l<N_{max}; l=l+1)$
{
$\quad T(l) = P_{data}(l) + \sum_{n=0}^{11}(2^n \times \bar{R}^l_n);$
$\quad C_j(l) = (T(l) + S_{\lfloor l/2 \rfloor}) \bmod N_{max};$
$\quad \text{if } C_j(l) < N_{data}$
$\quad \{$
$\quad\quad H_j(k) = C_j(l);$
$\quad\quad k = k+1;$
$\quad \}$
}

FIG. 41(a)
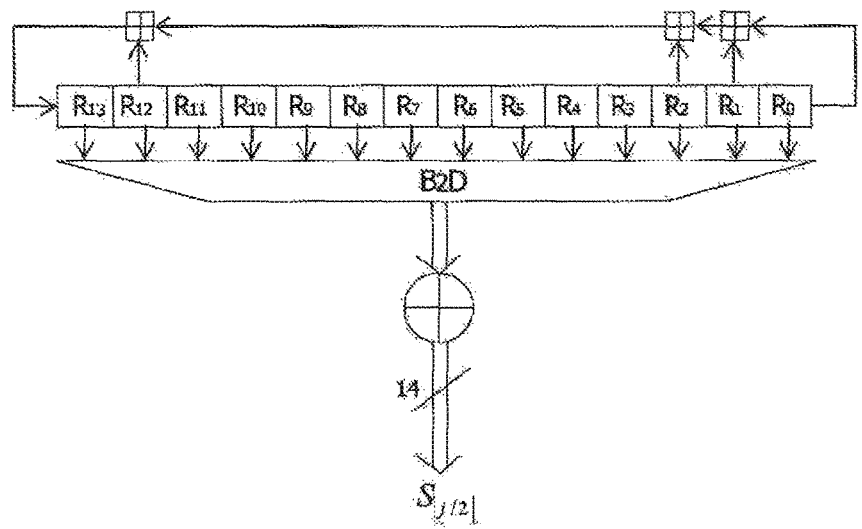
FIG. 41(b)
The associated 14th primitive polynomial,
$f(x)=1+x^2+x^{12}+x^{13}+x^{14}$
Operation of the PN generator for $0 \leq n < \lfloor N_{sym}/2 \rfloor$
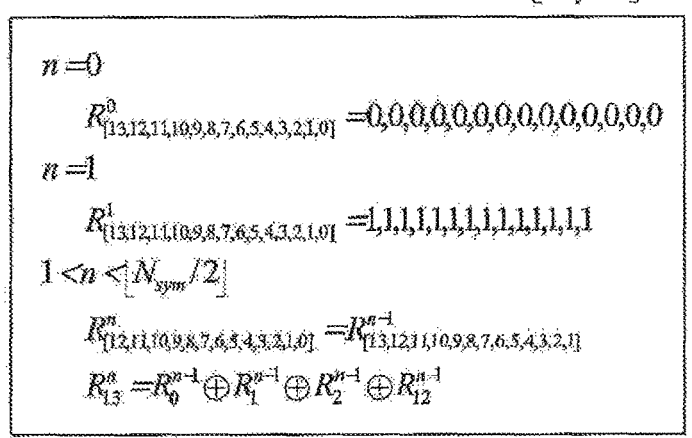
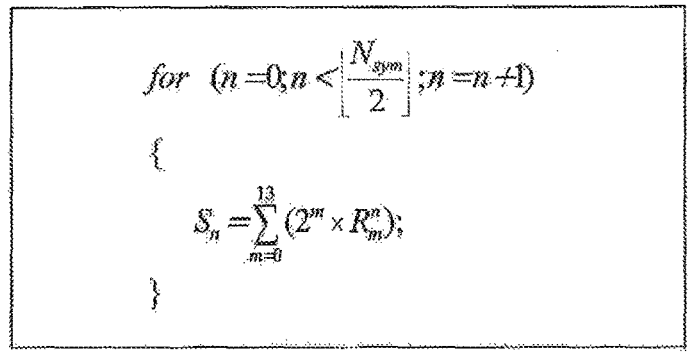

FIG. 44

The associated 13$^{th}$ primitive polynomial, $f(x) = 1+x^2+x^4+x^8+x^9+x^{12}+x^{13}$
Operation of the PN generator for $0 \leq l < N_{max}$ (16384)

$0 \leq l < 2$ $\quad R^l_{[12,11,10,9,8,7,6,5,4,3,2,1,0]} = 0,0,0,0,0,0,0,0,0,0,0,0,0$ $l = 2$ $\quad R^2_{[12,11,10,9,8,7,6,5,4,3,2,1,0]} = 0,0,0,0,0,0,0,0,0,0,0,0,1$ $2 < l < N_{max}$ $\quad R^l_{[11,10,9,8,7,6,5,4,3,2,1,0]} = R^{l-1}_{[12,11,10,9,8,7,6,5,4,3,2,1]}$ $\quad R^l_{12} = R^{l-1}_0 \oplus R^{l-1}_1 \oplus R^{l-1}_4 \oplus R^{l-1}_5 \oplus R^{l-1}_9 \oplus R^{l-1}_{11}$

---

$k = 0;$ for $(l = 0; l < N_{max}; l = l+1)$

{

$\quad T(l) = P_{data}(l) + \sum_{n=0}^{12}(2^n \times R^l_n);$ $\quad C_j(l) = (T(l) + S_{\lfloor l/2 \rfloor}) \bmod N_{max};$ $\quad \text{if } C_j(l) < N_{data}$ $\quad \quad \{$ $\quad \quad \quad H_j(k) = C_j(l);$ $\quad \quad \quad k = k+1;$ $\quad \quad \}$

}

The associated 13th primitive polynomial, $f(x)=1+x^2+x^4+x^8+x^9+x^{12}+$
Operation of the PN generator for $0 \leq l < N_{max}$ (16384)

The associated 15$^{th}$ primitive polynomial, $f(x)=1+x^{14}+x^{15}$
Operation of the PN generator for $0 \leq n < \lfloor N_{sym}/2 \rfloor$ $n=0$
$\quad R^0_{[14,13,12,11,10,9,8,7,6,5,4,3,2,1,0]} = 0,0,0,0,0,0,0,0,0,0,0,0,0,0,0$
$n=1$
$\quad R^1_{[14,13,12,11,10,9,8,7,6,5,4,3,2,1,0]} = 1,1,1,1,1,1,1,1,1,1,1,1,1,1,1$
$1 < n < \lfloor N_{sym}/2 \rfloor$
$\quad R^n_{[13,12,11,10,9,8,7,6,5,4,3,2,1,0]} = R^{n-1}_{[14,13,12,11,10,9,8,7,6,5,4,3,2,1]}$
$\quad R^n_{14} = R^{n-1}_0 \oplus R^{n-1}_1$ $$\text{for } (n=0; n<\lfloor \frac{N_{sym}}{2} \rfloor; n=n+1)$$
$$\{$$
$$\quad S_n = \sum_{m=0}^{14}(2^m \times R^n_m);$$
$$\}$$

FIG. 51

The associated 14$^{th}$ polynomial, $f(x)=1+x^2+x^{12}+x^{13}+x^{14}$
Operation of the PN generator for $0 \leq l < N_{max}(32768)$ $0 \leq l < 2$
$\quad R^l_{[13,12,11,10,9,8,7,6,5,4,3,2,1,0]} = 0,0,0,0,0,0,0,0,0,0,0,0,0,0$
$l = 2$
$\quad R^2_{[13,12,11,10,9,8,7,6,5,4,3,2,1,0]} = 0,0,0,0,0,0,0,0,0,0,0,0,0,1$
$2 < l < N_{max}$
$\quad R^l_{[11,10,9,8,7,6,5,4,3,2,1,0]} = R^{l-1}_{[13,12,11,10,9,8,7,6,5,4,3,2,1]}$
$\quad R^l_{13} = R^{l-1}_0 \oplus R^{l-1}_1 \oplus R^{l-1}_2 \oplus R^{l-1}_{12}$ $k = 0;$
for $(l = 0; l < N_{max}; l = l+1)$
{
$\quad T(l) = P_{data}(l) + \sum_{n=0}^{13}(2^n \times R^l_n);$
$\quad C_j(l) = (T(l) + S_{\lfloor l/2 \rfloor}) \bmod N_{max};$
$\quad$ if $C_j(l) < N_{data}$
$\quad$ {
$\quad\quad H_j(k) = C_j(l);$
$\quad\quad k = k+1;$
$\quad$ }
}

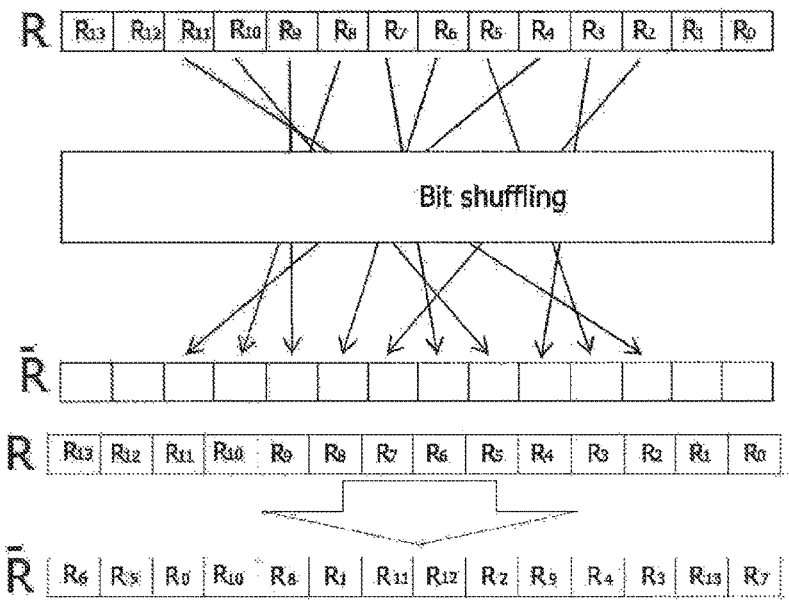

The associated 14th primitive polynomial, $f(x)=1+x^2+x^{12}+x^{13}+x^{14}$
Operation of the PN generator for $0 \leq l < N_{max}$ (32768)

$0 \leq l < 2$
$R^l_{[13,12,11,10,9,8,7,6,5,4,3,2,1,0]} = 0,0,0,0,0,0,0,0,0,0,0,0,0,0$
$l = 2$
$R^2_{[13,12,11,10,9,8,7,6,5,4,3,2,1,0]} = 0,0,0,0,0,0,0,0,0,0,0,0,0,1$
$2 < l < N_{max}$
$R^l_{[12,11,10,9,8,7,6,5,4,3,2,1,0]} = R^{l-1}_{[13,12,11,10,9,8,7,6,5,4,3,2,1]}$
$R^l_{13} = R^{l-1}_0 \oplus R^{l-1}_1 \oplus R^{l-1}_2 \oplus R^{l-1}_{12}$ $k = 0, \bar{R}^l_n \leftarrow R^l_n$ (bit shuffling)
for $(l=0; l<N_{max}; l=l+1)$
{
　　$T(l) = P_{data}(l) + \sum_{n=0}^{13}(2^n)(\bar{R}^l_n);$
　　$C_j(l) = (T(l) + S_{\lfloor j/2 \rfloor}) \bmod N_{max}$
　　if $C_j(l) < N_{data}$
　　{
　　　　$H_j(k) = C_j(l);$
　　　　$k = k + 1;$
　　}
}

FIG. 55

$A_{m,l,H(p)} = X_{m,l,p}$ for $l = 0,2,4,\ldots$
$A_{m,l,p} = X_{m,l,H(p)}$ for $l = 1,3,5,\ldots$ $A_{m,l}$: interleaved vector
$X_{m,l}$: interleaver input vector $F(p) = mod([H(p) + S(l)] / N_{max})$, where $N_{max} = 32768$ and $S(l)$ is a symbol offset

FIG. 56(A)

$A_{m,l,H(p)} = X_{m,l,p}$ for $l = 0,2,4,\ldots$
$A_{m,l,p} = X_{m,l,H(p)}$ for $l = 1,3,5,\ldots$ $A_{m,l}$: interleaved vector
$X_{m,l}$: interleaver input vector $F(p) = mod([H(p) + S(l)] / N_{max})$, where $N_{max} = 16384$ and $S(l)$ is a symbol offset

FIG. 56(B)

$A_{m,l,p} = X_{m,l,H(p)}$ for $l = 1,2,3,\ldots$ $A_{m,l}$: interleaved vector
$X_{m,l}$: interleaver input vector $F(p) = mod([H(p) + S(l)] / N_{max})$, where $N_{max} = 16384$ and $S(l)$ is a symbol offset

FIG. 57

$A_{m,l,p} = X_{m,l,H(p)}$ for l = 1,2,3,....

$A_{m,l}$: interleaved vector
$X_{m,l}$: interleaver input vector $F(p) = mod([H(p) + S(l)] / N_{max})$, where $N_{max} = 8192$ and $S(l)$ is a symbol offset

FIG. 58

- For 32K FFT mode and 16K FFT mode

The interleaved vector $A_{m,l} = (a_{m,l,0}, a_{m,l,1}, \cdots, a_{m,l,Ndata-1})$ is defined by
$a_{m,l,H_l(p)} = x_{m,l,p}$ for even symbol of the frame ($l \bmod 2 = 0$) for $p = 0, \cdots, Ndata - 1$)
$a_{m,l,p} = x_{m,l,H_l(p)}$ for odd symbol of the frame ($l \bmod 2 = 1$) for $p = 0, \cdots, Ndata - 1$)

- For 16K FFT and 8K FFT modes

The interleaved vector $A_{m,l} = (a_{m,l,0}, a_{m,l,1}, \cdots, a_{m,l,Ndata-1})$ is defined by
$a_{m,l,p} = x_{m,l,H_l(p)}$ for even symbol of the frame ($p = 0, \cdots, Ndata - 1$)

FIG. 62(A)

| R' bit position | 13 | 12 | 11 | 10 | 9 | 8 | 7 | 6 | 5 | 4 | 3 | 2 | 1 | 0 |
|---|---|---|---|---|---|---|---|---|---|---|---|---|---|---|
| R bit position | 6 | 5 | 0 | 10 | 8 | 1 | 11 | 12 | 2 | 9 | 4 | 3 | 13 | 7 |

FIG. 62(B)

| R' bit position | 12 | 11 | 10 | 9 | 8 | 7 | 6 | 5 | 4 | 3 | 2 | 1 | 0 |
|---|---|---|---|---|---|---|---|---|---|---|---|---|---|
| R bit position | 7 | 9 | 5 | 3 | 11 | 1 | 4 | 0 | 2 | 12 | 10 | 8 | 6 |

FIG. 62(C)

| R' bit position | 12 | 11 | 10 | 9 | 8 | 7 | 6 | 5 | 4 | 3 | 2 | 1 | 0 |
|---|---|---|---|---|---|---|---|---|---|---|---|---|---|
| R bit position (even) | 8 | 4 | 3 | 2 | 0 | 11 | 1 | 5 | 12 | 10 | 6 | 7 | 9 |
| R bit position (odd) | 7 | 9 | 5 | 3 | 11 | 1 | 4 | 0 | 2 | 12 | 10 | 8 | 6 |

FIG. 62(D)

| R' bit position | 11 | 10 | 9 | 8 | 7 | 6 | 5 | 4 | 3 | 2 | 1 | 0 |
|---|---|---|---|---|---|---|---|---|---|---|---|---|
| R bit position (even) | 5 | 11 | 3 | 0 | 10 | 8 | 6 | 9 | 2 | 4 | 1 | 7 |
| R bit position (odd) | 8 | 10 | 7 | 6 | 0 | 5 | 2 | 1 | 3 | 9 | 4 | 11 |

FIG. 63

- The basic interleaving sequence generator is defined based on the (Nr-1) bit binary word sequence $N_r = \log_2 N_{max}$ 1. $0 \leq n < 2$
   $R'_n [N_r-2, N_r-3, \cdots, 1, 0] = [0, 0, \cdots, 0, 0]$
2. $n = 2$
   $R'_n [N_r-2, N_r-3, \cdots, 1, 0] = [0, 0, \cdots, 0, 1]$
3. $2 < n < N_{max}$
   $R'_n [N_r-3, N_r-4, \cdots, 1, 0] = R'_n [N_r-2, N_r-3, \cdots, 2, 1]$

FIG. 64

- The random symbol-offset generator is defined based on the (Nr-1) bit binary word sequence $$N_r = \log_2 N_{max}$$
1. $0 \leq k < 2$
   $G_n[N_r-1, N_r-2, \cdots, 1, 0] = [1, 1, \cdots, 1, 1]$
2. $2 < k < L_F$
   $G_k[N_r-2, N_r-3, \cdots, 1, 0] = G_{k-1}[N_r-1, N_r-2, \cdots, 2, 1]$

FIG. 65

- Random address generator with the basic interleaving sequence generator and symbol-offset generator $$N_r = \log_2 N_{max}$$
$p = 0$
for $(n = 0; n < N_{max}; n = n + 1)$
{
   $T(n) = (n \bmod 2)2^{N_r-1} + \sum_{i=0}^{N_r-2} 2^i R_n[i]$;
   $S_l(n) = (T(n) + A_{\lfloor l/2 \rfloor}) \bmod N_{max}$;

if $(S_l(n) < N_{max})$ {
      $H_l(p) = S_l(n); p = p+1;$ }
} where $A_{\lfloor l/2 \rfloor} = A_k$ is calculated every OFDM symbol pair for $(k = 0; k < \lfloor \frac{N_{max}}{2} \rfloor; k = k+1)$
{
   $A_k = \sum_{k=0}^{N_r-1} 2^i G_k[i]$;
}

FIG. 66

$A_{m,l,H(p)} = X_{m,l,p}$     for $l = 1,2,3,\ldots$ $A_{m,l}$: interleaved vector
$X_{m,l}$: interleaver input vector $F(p) = \mod([H(p) + S(l)] / N_{max})$, where $N_{max} = 16384$ and $S(l)$ is a symbol offset

FIG. 67(A)

$A_{m,l,H(p)} = X_{m,l,p}$     for $l = 0,2,4,\ldots$
$A_{m,l,p} = X_{m,l,H(p)}$     for $l = 1,3,5,\ldots$ $A_{m,l}$: interleaved vector
$X_{m,l}$: interleaver input vector $F(p) = \mod([H(p) + S(l)] / N_{max})$, where $N_{max} = 8192$ and $S(l)$ is a symbol offset

FIG. 67(B)

$A_{m,l,H(p)} = X_{m,l,p}$     for $l = 1,2,3,\ldots$ $A_{m,l}$: interleaved vector
$X_{m,l}$: interleaver input vector $F(p) = \mod([H(p) + S(l)] / N_{max})$, where $N_{max} = 8192$ and $S(l)$ is a symbol offset

FIG. 68

The interleaved vector $A_{m,l} = (a_{m,l,0}, a_{m,l,1}, \cdots, a_{m,l,N_{data}-1})$ is defined by
$a_{m,l,H_l(p)} = x_{m,l,p}$ for even symbol of the frame ($p = 0, \cdots, N_{data}-1$)

FIG. 69(A)

$a_{m,l,H_{\lfloor l/2 \rfloor}(p)} = x_{m,l,p}$ for even symbol of a symbol pair, $l = 0, 2, \cdots, p = 0, \cdots, N_{data} - 1$
$a_{m,l,p} = x_{m,l,H_{\lfloor l/2 \rfloor}(p)}$ for odd symbol of a symbol pair, $l = 1, 3, \cdots, p = 0, \cdots, N_{data} - 1$ Interleaved symbol: $A_{m,l} = (a_{m,l,0}, a_{m,l,1}, a_{m,l,2}, \cdots, a_{m,l,N_{data}-1})$
Input symbol of interleaver: $X_{m,l} = (x_{m,l,0}, x_{m,l,1}, a_{m,l,2}, \cdots, x_{m,l,N_{data}-1})$

FIG. 69(B)

$a_{m,l,p} = x_{m,l,H_l(p)}$ for even/odd symbol of a symbol pair, $l = 0, 1, \cdots, N_F - 1, p = 0, \cdots, N_{data} - 1$ Interleaved symbol: $A_{m,l} = (a_{m,l,0}, a_{m,l,1}, a_{m,l,2}, \cdots, a_{m,l,N_{data}-1})$
Input symbol of interleaver: $X_{m,l} = (x_{m,l,0}, x_{m,l,1}, a_{m,l,2}, \cdots, x_{m,l,N_{data}-1})$ $m$ is a frame index
$p$ is a cell index
$l$ is an OFDM symbol index
$N_F-1$ is the number of OFDM symbol within a frame
$N_{data}$ is the number of active data cells within an OFDM symbol $N_r = \log_2 N_{max}$ for $(l = 0; l < N_p; l = l+1)$
{
   $p = 0$,
   for $(n = 0; n < N_{max}; n = n + 1)$
   {
      $H_l(p) = ((n \bmod 2)2^{Nr-1} + \sum_{i=0}^{Nr-2} 2^i R_n[i] + \sum_{i=0}^{Nr-2} 2^i G_{\lfloor l/2 \rfloor}[i]) \bmod N_{max}$;
      if $(H_l(p) < N_{data})\ p = p + 1$;
   }
}

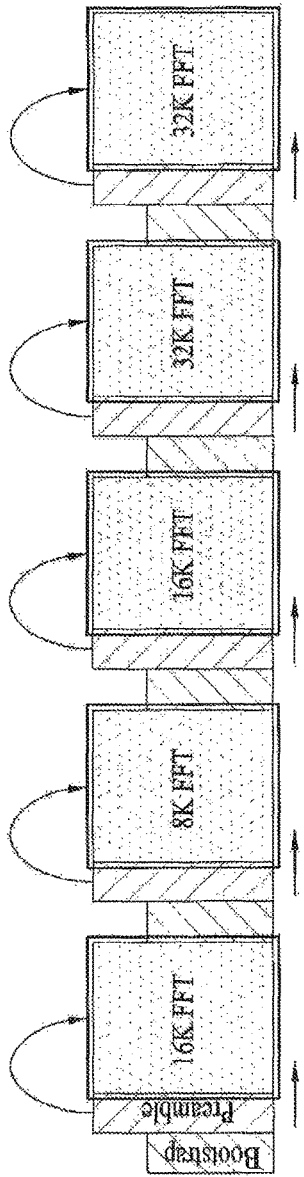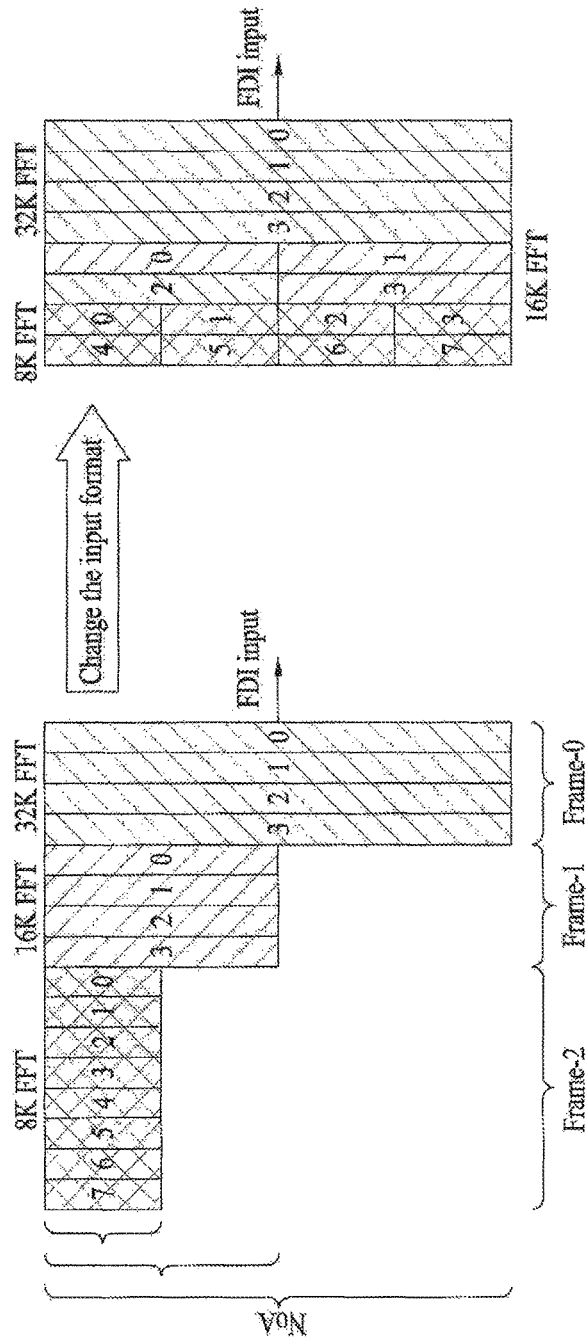
FIG. 78(A)
FIG. 78(B)

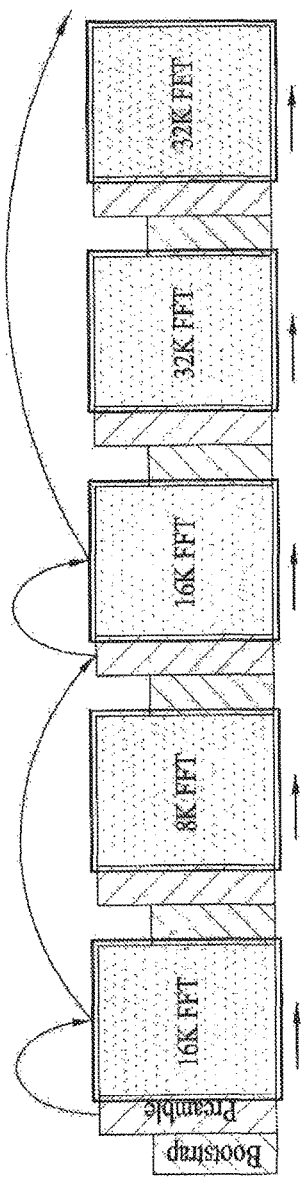
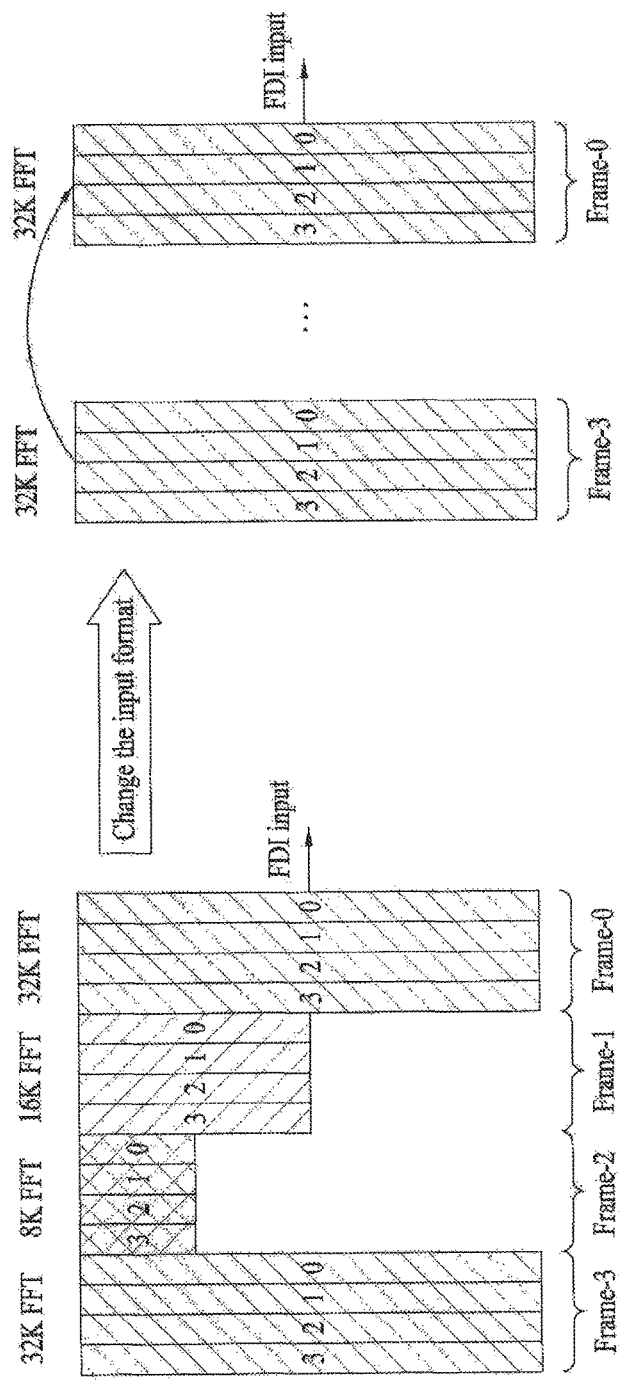
FIG. 79(A)
FIG. 79(B)

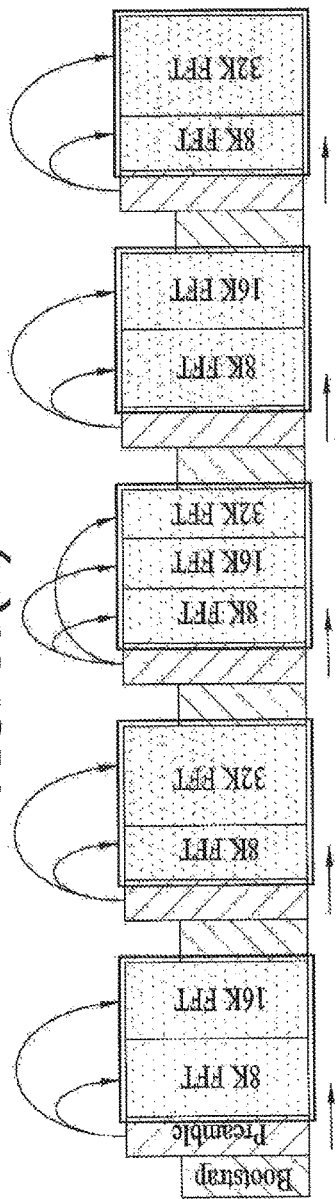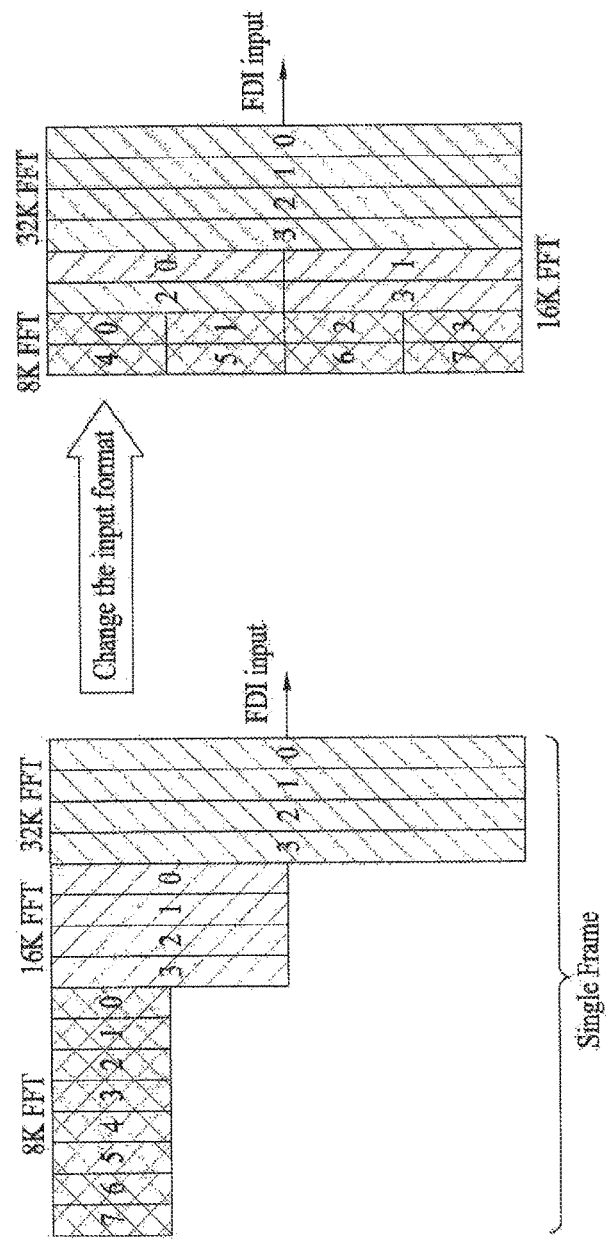
FIG. 80(A)
FIG. 80(B)

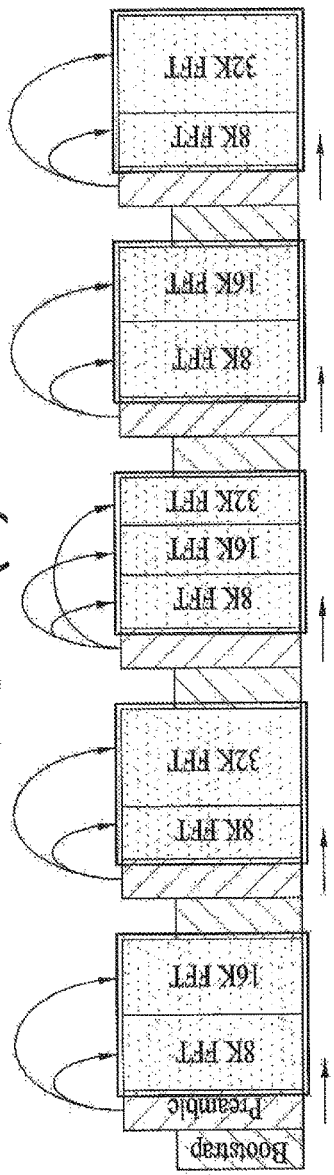
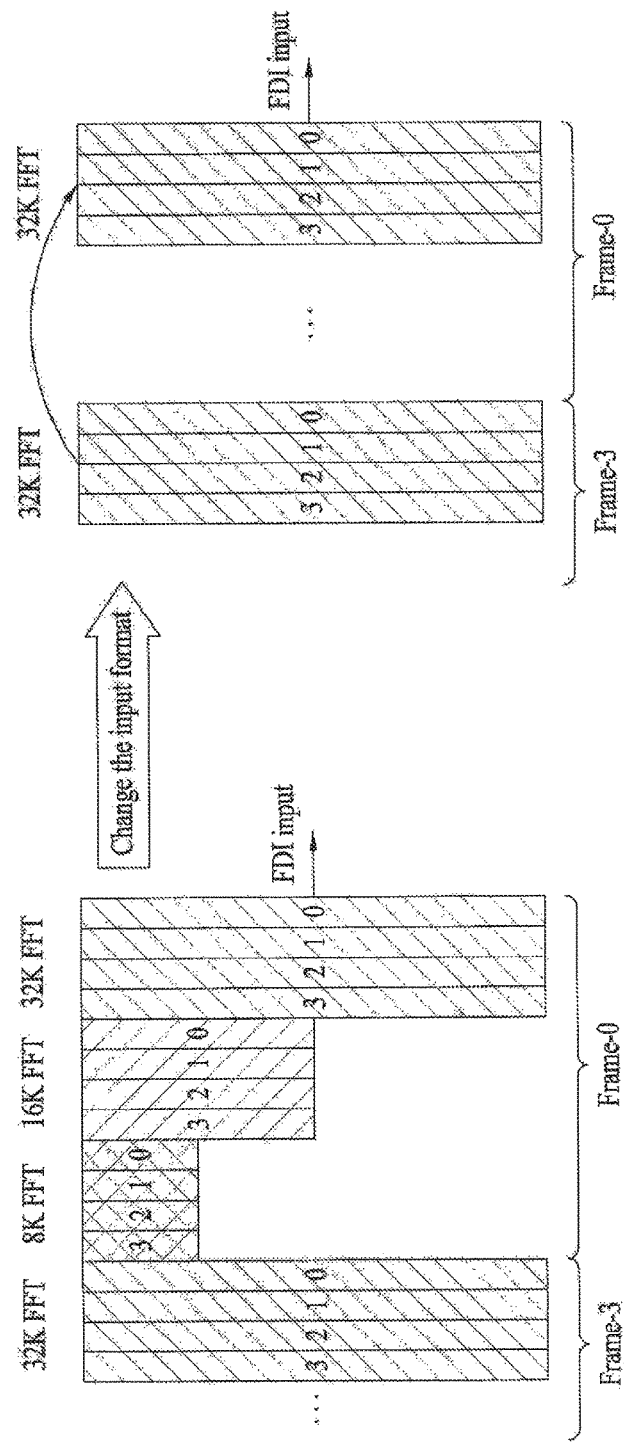
FIG. 81(A)
FIG. 81(B)

APPARATUS FOR TRANSMITTING BROADCAST SIGNALS, APPARATUS FOR RECEIVING BROADCAST SIGNALS, METHOD FOR TRANSMITTING BROADCAST SIGNALS AND METHOD FOR RECEIVING BROADCAST SIGNALS

This application is a Continuation Application of U.S. patent application Ser. No. 15/485,012, filed Apr. 11, 2017, which is a Continuation of U.S. patent application Ser. No. 14/863,899, filed on Sep. 24, 2015, which claims the benefit of U.S. Application Nos. 62/112,650, filed on Feb. 6, 2015, 62/120,338, filed Feb. 24, 2015, 62/133,482 filed on Mar. 16, 2015, 62/152,038, filed Apr. 24, 2015, all of which are hereby incorporated by reference in their entirety for all purposes as if fully set forth herein.

BACKGROUND OF THE INVENTION

Field of the Invention

The present invention relates to an apparatus for transmitting broadcast signals, an apparatus for receiving broadcast signals and methods for transmitting and receiving broadcast signals.

Discussion of the Related Art

As analog broadcast signal transmission comes to an end, various technologies for transmitting/receiving digital broadcast signals are being developed. A digital broadcast signal may include a larger amount of video/audio data than an analog broadcast signal and further include various types of additional data in addition to the video/audio data.

That is, a digital broadcast system can provide HD (high definition) images, multi-channel audio and various additional services. However, data transmission efficiency for transmission of large amounts of data, robustness of transmission/reception networks and network flexibility in consideration of mobile reception equipment need to be improved for digital broadcast.

SUMMARY OF THE INVENTION

Accordingly, the present invention is directed to an apparatus for transmitting broadcast signals and an apparatus for receiving broadcast signals for future broadcast services and methods for transmitting and receiving broadcast signals for future broadcast services.

An object of the present invention is to provide an apparatus and method for transmitting broadcast signals to multiplex data of a broadcast transmission/reception system providing two or more different broadcast services in a time domain and transmit the multiplexed data through the same RF signal bandwidth and an apparatus and method for receiving broadcast signals corresponding thereto.

Another object of the present invention is to provide an apparatus for transmitting broadcast signals, an apparatus for receiving broadcast signals and methods for transmitting and receiving broadcast signals to classify data corresponding to services by components, transmit data corresponding to each component as a data pipe, receive and process the data Still another object of the present invention is to provide an apparatus for transmitting broadcast signals, an apparatus for receiving broadcast signals and methods for transmitting and receiving broadcast signals to signal signaling information necessary to provide broadcast signals.

Technical Solution

To achieve the object and other advantages and in accordance with the purpose of the invention, as embodied and broadly described herein, a method for receiving broadcast signals, the method comprises receiving the broadcast signals, demodulating the received broadcast signals by an OFDM (Orthogonal Frequency Division Multiplex) scheme, frequency de-interleaving the demodulated broadcast signals by using a different interleaving sequence, wherein the different interleaving sequence is used for data corresponding to an OFDM symbol pair or data corresponding to an OFDM symbol according to an FFT size of the demodulating, parsing at least one signal frame from the frequency de-interleaved broadcast signals and decoding service data in the parsed at least one signal frame.

Advantageous Effects

The present invention can process data according to service characteristics to control QoS (Quality of Services) for each service or service component, thereby providing various broadcast services.

The present invention can achieve transmission flexibility by transmitting various broadcast services through the same RF signal bandwidth.

The present invention can improve data transmission efficiency and increase robustness of transmission/reception of broadcast signals using a MIMO system.

According to the present invention, it is possible to provide broadcast signal transmission and reception methods and apparatus capable of receiving digital broadcast signals without error even with mobile reception equipment or in an indoor environment.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5(a) and FIG. 5(b) illustrate a BICM block according to an embodiment of the present invention.

FIG. 13 illustrates PLS1 data according to an embodiment of the present invention.

FIG. 14 illustrates PLS2 data according to an embodiment of the present invention.

FIG. 24(a) and FIG. 24(b) illustrate a cell-word demultiplexing according to an embodiment of the present invention.

FIG. 27 illustrates an operation of a twisted row-column block interleaver according to another embodiment of the present invention.

FIG. 29 illustrates interleaved XFECBLOCKs from each interleaving array according to an embodiment of the present invention.

FIG. 33 illustrates equations for describing a process for changing an interleaving sequence within each memory bank, according to an embodiment of the present invention.

FIG. 34(a) and FIG. 34(b) illustrate a symbol offset generator of 8K FFT mode and equations showing operation of the symbol offset generator, according to an embodiment of the present invention.

FIG. 37 illustrates equations showing operation of the frequency interleaver of 8K FFT mode according to an embodiment of the present invention.

FIG. 40(a) and FIG. 40(b) illustrate bit shuffling of the frequency interleaver of 8K FFT mode and equations showing operation of the frequency interleaver, according to an embodiment of the present invention.

FIG. 41(a) and FIG. 41(b) illustrate a symbol offset generator of 16K FFT mode and equations showing operation of the symbol offset generator, according to an embodiment of the present invention.

FIG. 44 illustrates equations showing operation of the frequency interleaver of 16K FFT mode according to an embodiment of the present invention.

FIG. 51 illustrates equations showing operation of the frequency interleaver of 32K FFT mode according to an embodiment of the present invention.

FIG. 54(a) and FIG. 54(b) illustrate bit shuffling of the frequency interleaver of 32K FFT mode and equations showing operation of the frequency interleaver, according to an embodiment of the present invention.

FIG. 55 illustrates an equation showing operation of the frequency interleaver of 32K FFT mode according to the present invention.

FIG. 56(a) and FIG. 56(b) illustrate equations showing operation of the frequency interleaver of 16K FFT mode according to the present invention.

FIG. 57 illustrates an equation showing operation of the frequency interleaver of 8K FFT mode according to the present invention.

FIG. 58 illustrates equations showing input and output of a frequency interleaver based on each FFT mode.

FIG. 62(a), FIG. 62(b), FIG. 62(c) and FIG. 62(d) illustrate wire permutation tables according to embodiments of the present invention.

FIG. 63 illustrates an equation showing operation of the basic interleaving sequence generator according to an embodiment of the present invention.

FIG. 64 illustrates an equation showing operation of the symbol offset generator according to an embodiment of the present invention.

FIG. 65 illustrates equations showing an interleaving address according to an embodiment of the present invention.

FIG. 66 illustrates an equation showing a frequency interleaver of 16K FFT mode according to another embodiment of the present invention.

FIG. 67(a) and FIG. 67(b) illustrate equations showing operation of the frequency interleaver of 8K FFT mode according to another embodiment of the present invention.

FIG. 68 illustrates an equation showing input and output of a frequency interleaver based on each FFT mode.

FIG. 69(a) and FIG. 69(b) illustrate equations showing operation of the frequency interleaver based on an FFT mode according to an embodiment of the present invention.

FIG. 78(a) and FIG. 78(b) illustrate a procedure for processing single-FFT-mode signal frames by the broadcast signal reception apparatus, according to an embodiment of the present invention.

FIG. 79(a) and FIG. 79(b) illustrate a procedure for processing single-FFT-mode signal frames by the broadcast signal reception apparatus, according to another embodiment of the present invention.

FIG. 80(a) and FIG. 80(b) illustrate a procedure for processing mixed-FFT-mode signal frames by the broadcast signal reception apparatus, according to an embodiment of the present invention.

FIG. 81(a) and FIG. 81(b) illustrate a procedure for processing mixed-FFT-mode signal frames by the broadcast signal reception apparatus, according to another embodiment of the present invention.

DETAILED DESCRIPTION OF THE INVENTION

Figure 1:
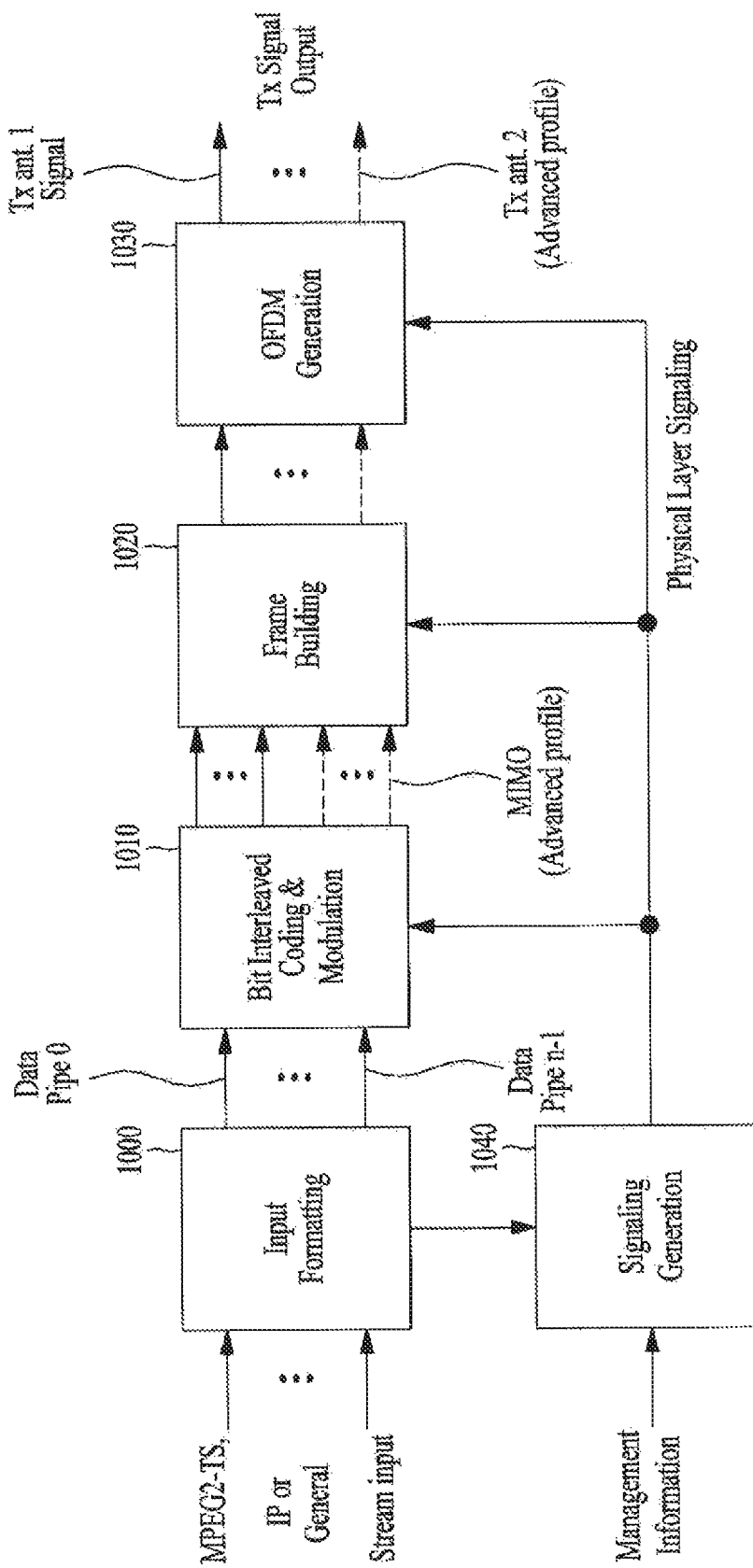
FIG. 1 illustrates a structure of an apparatus for transmitting broadcast signals for future broadcast services according to an embodiment of the present invention.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although most terms used in the present invention have been selected from general ones widely used in the art, some terms have been arbitrarily selected by the applicant and their meanings are explained in detail in the following description as needed. Thus, the present invention should be understood based upon the intended meanings of the terms rather than their simple names or meanings.

The present invention provides apparatuses and methods for transmitting and receiving broadcast signals for future broadcast services. Future broadcast services according to an embodiment of the present invention include a terrestrial broadcast service, a mobile broadcast service, a UHDTV service, etc. The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

While MISO or MIMO uses two antennas in the following for convenience of description, the present invention is applicable to systems using two or more antennas.

The present invention may defines three physical layer (PL) profiles—base, handheld and advanced profiles—each optimized to minimize receiver complexity while attaining the performance required for a particular use case. The physical layer (PHY) profiles are subsets of all configurations that a corresponding receiver should implement.

The three PHY profiles share most of the functional blocks but differ slightly in specific blocks and/or parameters. Additional PHY profiles can be defined in the future. For the system evolution, future profiles can also be multiplexed with the existing profiles in a single RF channel through a future extension frame (FEF). The details of each PHY profile are described below.

1. Base Profile

The base profile represents a main use case for fixed receiving devices that are usually connected to a roof-top antenna. The base profile also includes portable devices that could be transported to a place but belong to a relatively stationary reception category. Use of the base profile could be extended to handheld devices or even vehicular by some improved implementations, but those use cases are not expected for the base profile receiver operation.

Target SNR range of reception is from approximately 10 to 20 dB, which includes the 15 dB SNR reception capability of the existing broadcast system (e.g. ATSC A/53). The receiver complexity and power consumption is not as critical as in the battery-operated handheld devices, which will use the handheld profile. Key system parameters for the base profile are listed in below table 1.

TABLE 1

| | |
|---|---|
| LDPC codeword length | 16K, 64K bits |
| Constellation size | 4~10 bpcu (bits per channel use) |
| Time de-interleaving memory size | $\leq 2^{19}$ data cells |
| Pilot patterns | Pilot pattern for fixed reception |
| FFT size | 16K, 32K points |

2. Handheld Profile

The handheld profile is designed for use in handheld and vehicular devices that operate with battery power. The devices can be moving with pedestrian or vehicle speed. The power consumption as well as the receiver complexity is very important for the implementation of the devices of the handheld profile. The target SNR range of the handheld profile is approximately 0 to 10 dB, but can be configured to reach below 0 dB when intended for deeper indoor reception.

In addition to low SNR capability, resilience to the Doppler Effect caused by receiver mobility is the most important performance attribute of the handheld profile. Key system parameters for the handheld profile are listed in the below table 2.

TABLE 2

| | |
|---|---|
| LDPC codeword length | 16K bits |
| Constellation size | 2~8 bpcu |
| Time de-interleaving memory size | $\leq 2^{18}$ data cells |
| Pilot patterns | Pilot patterns for mobile and indoor reception |
| FFT size | 8K, 16K points |

3. Advanced Profile

The advanced profile provides highest channel capacity at the cost of more implementation complexity. This profile requires using MIMO transmission and reception, and UHDTV service is a target use case for which this profile is specifically designed. The increased capacity can also be used to allow an increased number of services in a given bandwidth, e.g., multiple SDTV or HDTV services.

The target SNR range of the advanced profile is approximately 20 to 30 dB. MIMO transmission may initially use existing elliptically-polarized transmission equipment, with extension to full-power cross-polarized transmission in the future. Key system parameters for the advanced profile are listed in below table 3.

TABLE 3

| | |
|---|---|
| LDPC codeword length | 16K, 64K bits |
| Constellation size | 8~12 bpcu |
| Time de-interleaving memory size | $\leq 2^{19}$ data cells |
| Pilot patterns | Pilot pattern for fixed reception |
| FFT size | 16K, 32K points |

In this case, the base profile can be used as a profile for both the terrestrial broadcast service and the mobile broadcast service. That is, the base profile can be used to define a concept of a profile which includes the mobile profile.

Also, the advanced profile can be divided advanced profile for a base profile with MIMO and advanced profile for a handheld profile with MIMO. Moreover, the three profiles can be changed according to intention of the designer.

The following terms and definitions may apply to the present invention. The following terms and definitions can be changed according to design.

auxiliary stream: sequence of cells carrying data of as yet undefined modulation and coding, which may be used for future extensions or as required by broadcasters or network operators base data pipe: data pipe that carries service signaling data baseband frame (or BBFRAME): set of Kbch bits which form the input to one FEC encoding process (BCH and LDPC encoding)

cell: modulation value that is carried by one carrier of the OFDM transmission coded block: LDPC-encoded block of PLS1 data or one of the LDPC-encoded blocks of PLS2 data data pipe: logical channel in the physical layer that carries service data or related metadata, which may carry one or multiple service(s) or service component(s).

data pipe unit: a basic unit for allocating data cells to a DP in a frame.

data symbol: OFDM symbol in a frame which is not a preamble symbol (the frame signaling symbol and frame edge symbol is included in the data symbol)

DP_ID: this 8-bit field identifies uniquely a DP within the system identified by the SYSTEM_ID dummy cell: cell carrying a pseudo-random value used to fill the remaining capacity not used for PLS signaling, DPs or auxiliary streams emergency alert channel: part of a frame that carries EAS information data frame: physical layer time slot that starts with a preamble and ends with a frame edge symbol frame repetition unit: a set of frames belonging to same or different physical layer profile including a FEF, which is repeated eight times in a super-frame fast information channel: a logical channel in a frame that carries the mapping information between a service and the corresponding base DP FECBLOCK: set of LDPC-encoded bits of a DP data FFT size: nominal FFT size used for a particular mode, equal to the active symbol period Ts expressed in cycles of the elementary period T frame signaling symbol: OFDM symbol with higher pilot density used at the start of a frame in certain combinations of FFT size, guard interval and scattered pilot pattern, which carries a part of the PLS data frame edge symbol: OFDM symbol with higher pilot density used at the end of a frame in certain combinations of FFT size, guard interval and scattered pilot pattern frame-group: the set of all the frames having the same PHY profile type in a super-frame.

future extension frame: physical layer time slot within the super-frame that could be used for future extension, which starts with a preamble Futurecast UTB system: proposed physical layer broadcasting system, of which the input is one or more MPEG2-TS or IP or general stream(s) and of which the output is an RF signal input stream: A stream of data for an ensemble of services delivered to the end users by the system.

normal data symbol: data symbol excluding the frame signaling symbol and the frame edge symbol PHY profile: subset of all configurations that a corresponding receiver should implement PLS: physical layer signaling data consisting of PLS1 and PLS2

PLS1: a first set of PLS data carried in the FSS symbols having a fixed size, coding and modulation, which carries basic information about the system as well as the parameters needed to decode the PLS2

NOTE: PLS1 data remains constant for the duration of a frame-group.

PLS2: a second set of PLS data transmitted in the FSS symbol, which carries more detailed PLS data about the system and the DPs PLS2 dynamic data: PLS2 data that may dynamically change frame-by-frame PLS2 static data: PLS2 data that remains static for the duration of a frame-group preamble signaling data: signaling data carried by the preamble symbol and used to identify the basic mode of the system preamble symbol: fixed-length pilot symbol that carries basic PLS data and is located in the beginning of a frame NOTE: The preamble symbol is mainly used for fast initial band scan to detect the system signal, its timing, frequency offset, and FFT-size.

reserved for future use: not defined by the present document but may be defined in future super-frame: set of eight frame repetition units time interleaving block (TI block): set of cells within which time interleaving is carried out, corresponding to one use of the time interleaver memory TI group: unit over which dynamic capacity allocation for a particular DP is carried out, made up of an integer, dynamically varying number of XFECBLOCKs NOTE: The TI group may be mapped directly to one frame or may be mapped to multiple frames. It may contain one or more TI blocks.

Type 1 DP: DP of a frame where all DPs are mapped into the frame in TDM fashion

Type 2 DP: DP of a frame where all DPs are mapped into the frame in FDM fashion

XFECBLOCK: set of Ncells cells carrying all the bits of one LDPC FECBLOCK

FIG. 1 illustrates a structure of an apparatus for transmitting broadcast signals for future broadcast services according to an embodiment of the present invention.

The apparatus for transmitting broadcast signals for future broadcast services according to an embodiment of the present invention can include an input formatting block 1000, a BICM (Bit interleaved coding & modulation) block 1010, a frame building block 1020, an OFDM (Orthogonal Frequency Division Multiplexing) generation block 1030 and a signaling generation block 1040. A description will be given of the operation of each module of the apparatus for transmitting broadcast signals.

IP stream/packets and MPEG2-TS are the main input formats, other stream types are handled as General Streams. In addition to these data inputs, Management Information is input to control the scheduling and allocation of the corresponding bandwidth for each input stream. One or multiple TS stream(s), IP stream(s) and/or General Stream(s) inputs are simultaneously allowed.

The input formatting block 1000 can demultiplex each input stream into one or multiple data pipe(s), to each of which an independent coding and modulation is applied. The data pipe (DP) is the basic unit for robustness control, thereby affecting quality-of-service (QoS). One or multiple service(s) or service component(s) can be carried by a single DP. Details of operations of the input formatting block 1000 will be described later.

The data pipe is a logical channel in the physical layer that carries service data or related metadata, which may carry one or multiple service(s) or service component(s).

Also, the data pipe unit: a basic unit for allocating data cells to a DP in a frame.

In the BICM block 1010, parity data is added for error correction and the encoded bit streams are mapped to complex-value constellation symbols. The symbols are interleaved across a specific interleaving depth that is used for the corresponding DP. For the advanced profile, MIMO encoding is performed in the BICM block 1010 and the additional data path is added at the output for MIMO transmission. Details of operations of the BICM block 1010 will be described later.

The Frame Building block 1020 can map the data cells of the input DPs into the OFDM symbols within a frame. After mapping, the frequency interleaving is used for frequency-domain diversity, especially to combat frequency-selective fading channels. Details of operations of the Frame Building block 1020 will be described later.

After inserting a preamble at the beginning of each frame, the OFDM Generation block 1030 can apply conventional OFDM modulation having a cyclic prefix as guard interval. For antenna space diversity, a distributed MISO scheme is applied across the transmitters. In addition, a Peak-to-Average Power Reduction (PAPR) scheme is performed in the time domain. For flexible network planning, this proposal provides a set of various FFT sizes, guard interval lengths and corresponding pilot patterns. Details of operations of the OFDM Generation block 1030 will be described later.

The Signaling Generation block 1040 can create physical layer signaling information used for the operation of each functional block. This signaling information is also transmitted so that the services of interest are properly recovered at the receiver side. Details of operations of the Signaling Generation block 1040 will be described later.

Figure 2A:
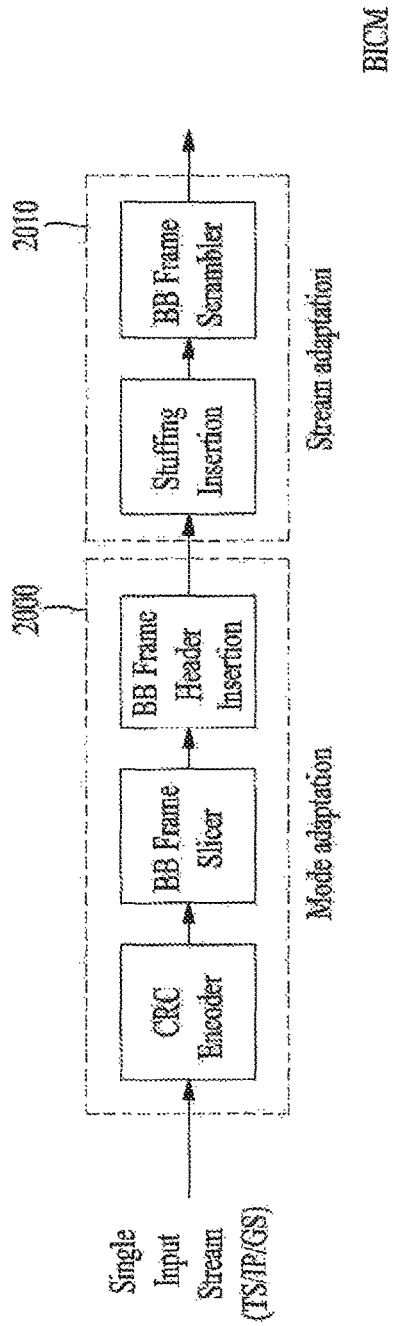
FIG. 2(a) and FIG. 2(b) illustrate an input formatting block according to one embodiment of the present invention.
Figure 2B:
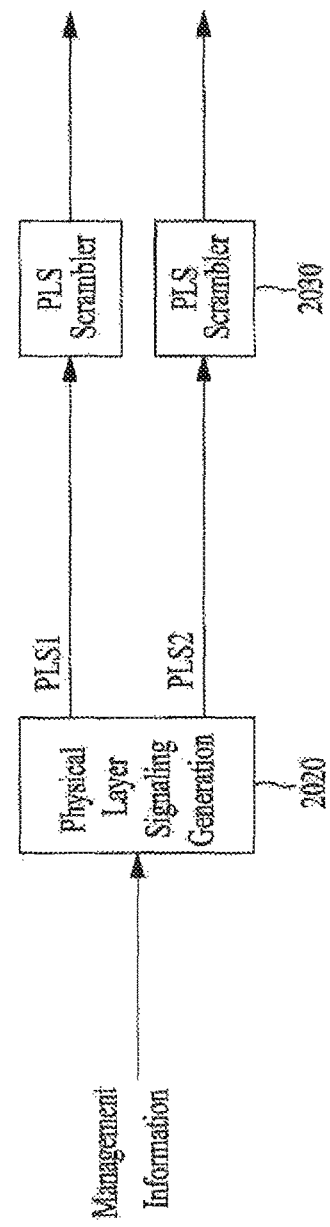
Figure 3:
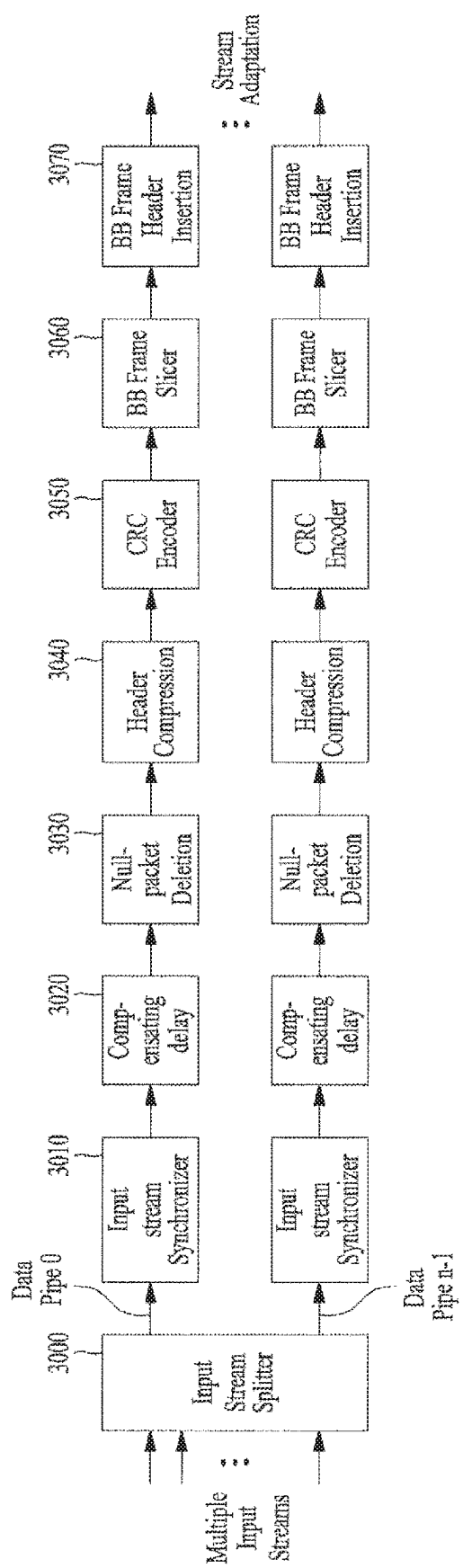
FIG. 3 illustrates an input formatting block according to another embodiment of the present invention.
Figure 4:
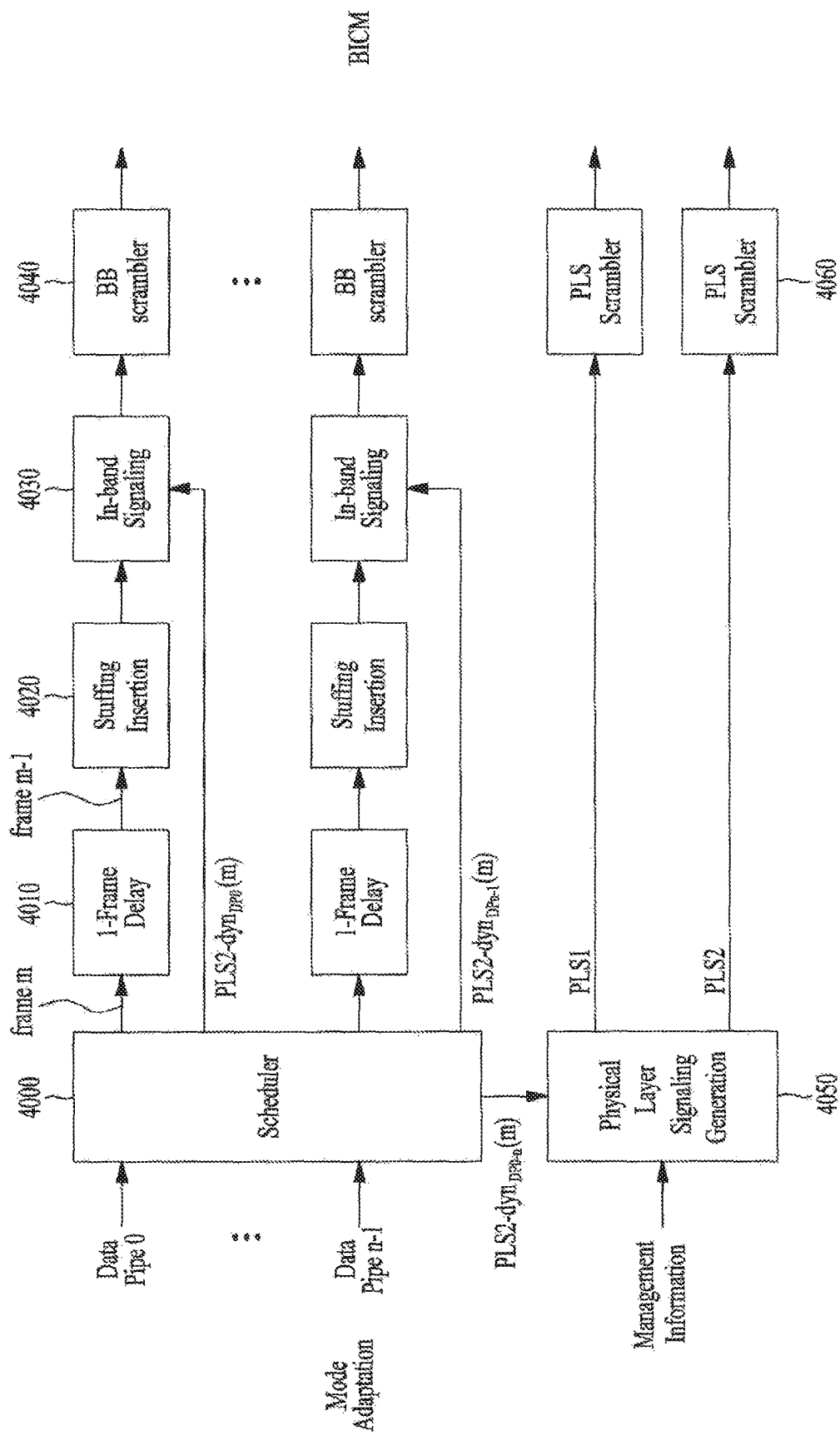
FIG. 4 illustrates an input formatting block according to another embodiment of the present invention.

FIGS. 2, 3 and 4 illustrate the input formatting block 1000 according to embodiments of the present invention. A description will be given of each figure.

FIG. 2 illustrates an input formatting block according to one embodiment of the present invention. FIG. 2 shows an input formatting module when the input signal is a single input stream.

The input formatting block illustrated in FIG. 2 corresponds to an embodiment of the input formatting block 1000 described with reference to FIG. 1.

The input to the physical layer may be composed of one or multiple data streams. Each data stream is carried by one DP. The mode adaptation modules slice the incoming data stream into data fields of the baseband frame (BBF). The system supports three types of input data streams: MPEG2-TS, Internet protocol (IP) and Generic stream (GS). MPEG2-TS is characterized by fixed length (188 byte) packets with the first byte being a sync-byte (0x47). An IP stream is composed of variable length IP datagram packets, as signaled within IP packet headers. The system supports both IPv4 and IPv6 for the IP stream. GS may be composed of variable length packets or constant length packets, signaled within encapsulation packet headers.

(a) shows a mode adaptation block 2000 and a stream adaptation 2010 for signal DP and (b) shows a PLS generation block 2020 and a PLS scrambler 2030 for generating and processing PLS data. A description will be given of the operation of each block.

The Input Stream Splitter splits the input TS, IP, GS streams into multiple service or service component (audio, video, etc.) streams. The mode adaptation module 2010 is comprised of a CRC Encoder, BB (baseband) Frame Slicer, and BB Frame Header Insertion block.

The CRC Encoder provides three kinds of CRC encoding for error detection at the user packet (UP) level, i.e., CRC-8, CRC-16, and CRC-32. The computed CRC bytes are appended after the UP. CRC-8 is used for TS stream and CRC-32 for IP stream. If the GS stream doesn't provide the CRC encoding, the proposed CRC encoding should be applied.

BB Frame Slicer maps the input into an internal logical-bit format. The first received bit is defined to be the MSB. The BB Frame Slicer allocates a number of input bits equal to the available data field capacity. To allocate a number of input bits equal to the BBF payload, the UP packet stream is sliced to fit the data field of BBF.

BB Frame Header Insertion block can insert fixed length BBF header of 2 bytes is inserted in front of the BB Frame. The BBF header is composed of STUFFI (1 bit), SYNCD (13 bits), and RFU (2 bits). In addition to the fixed 2-Byte BBF header, BBF can have an extension field (1 or 3 bytes) at the end of the 2-byte BBF header.

The stream adaptation 2010 is comprised of stuffing insertion block and BB scrambler.

The stuffing insertion block can insert stuffing field into a payload of a BB frame. If the input data to the stream adaptation is sufficient to fill a BB-Frame, STUFFI is set to '0' and the BBF has no stuffing field. Otherwise STUFFI is set to '1' and the stuffing field is inserted immediately after the BBF header. The stuffing field comprises two bytes of the stuffing field header and a variable size of stuffing data.

The BB scrambler scrambles complete BBF for energy dispersal. The scrambling sequence is synchronous with the BBF. The scrambling sequence is generated by the feedback shift register.

The PLS generation block 2020 can generate physical layer signaling (PLS) data. The PLS provides the receiver with a means to access physical layer DPs. The PLS data consists of PLS1 data and PLS2 data.

The PLS1 data is a first set of PLS data carried in the FSS symbols in the frame having a fixed size, coding and modulation, which carries basic information about the system as well as the parameters needed to decode the PLS2 data. The PLS1 data provides basic transmission parameters including parameters required to enable the reception and decoding of the PLS2 data. Also, the PLS1 data remains constant for the duration of a frame-group.

The PLS2 data is a second set of PLS data transmitted in the FSS symbol, which carries more detailed PLS data about the system and the DPs. The PLS2 contains parameters that provide sufficient information for the receiver to decode the desired DP. The PLS2 signaling further consists of two types of parameters, PLS2 Static data (PLS2-STAT data) and PLS2 dynamic data (PLS2-DYN data). The PLS2 Static data is PLS2 data that remains static for the duration of a frame-group and the PLS2 dynamic data is PLS2 data that may dynamically change frame-by-frame.

Details of the PLS data will be described later.

The PLS scrambler 2030 can scramble the generated PLS data for energy dispersal.

The above-described blocks may be omitted or replaced by blocks having similar or identical functions.

FIG. 3 illustrates an input formatting block according to another embodiment of the present invention.

The input formatting block illustrated in FIG. 3 corresponds to an embodiment of the input formatting block 1000 described with reference to FIG. 1.

FIG. 3 shows a mode adaptation block of the input formatting block when the input signal corresponds to multiple input streams.

The mode adaptation block of the input formatting block for processing the multiple input streams can independently process the multiple input streams.

Referring to FIG. 3, the mode adaptation block for respectively processing the multiple input streams can include an input stream splitter 3000, an input stream synchronizer 3010, a compensating delay block 3020, a null packet deletion block 3030, a head compression block 3040, a CRC encoder 3050, a BB frame slicer 3060 and a BB header insertion block 3070. Description will be given of each block of the mode adaptation block.

Operations of the CRC encoder 3050, BB frame slicer 3060 and BB header insertion block 3070 correspond to those of the CRC encoder, BB frame slicer and BB header insertion block described with reference to FIG. 2 and thus description thereof is omitted.

The input stream splitter 3000 can split the input TS, IP, GS streams into multiple service or service component (audio, video, etc.) streams.

The input stream synchronizer 3010 may be referred as ISSY. The ISSY can provide suitable means to guarantee Constant Bit Rate (CBR) and constant end-to-end transmission delay for any input data format. The ISSY is always used for the case of multiple DPs carrying TS, and optionally used for multiple DPs carrying GS streams.

The compensating delay block 3020 can delay the split TS packet stream following the insertion of ISSY information to allow a TS packet recombining mechanism without requiring additional memory in the receiver.

The null packet deletion block 3030, is used only for the TS input stream case. Some TS input streams or split TS streams may have a large number of null-packets present in order to accommodate VBR (variable bit-rate) services in a CBR TS stream. In this case, in order to avoid unnecessary transmission overhead, null-packets can be identified and not transmitted. In the receiver, removed null-packets can be re-inserted in the exact place where they were originally by reference to a deleted null-packet (DNP) counter that is inserted in the transmission, thus guaranteeing constant bit-rate and avoiding the need for time-stamp (PCR) updating.

The head compression block 3040 can provide packet header compression to increase transmission efficiency for TS or IP input streams. Because the receiver can have a priori information on certain parts of the header, this known information can be deleted in the transmitter.

For Transport Stream, the receiver has a-priori information about the sync-byte configuration (0x47) and the packet length (188 Byte). If the input TS stream carries content that has only one PID, i.e., for only one service component (video, audio, etc.) or service sub-component (SVC base layer, SVC enhancement layer, MVC base view or MVC dependent views), TS packet header compression can be applied (optionally) to the Transport Stream. IP packet header compression is used optionally if the input steam is an IP stream.

The above-described blocks may be omitted or replaced by blocks having similar or identical functions.

FIG. 4 illustrates an input formatting block according to another embodiment of the present invention.

The input formatting block illustrated in FIG. 4 corresponds to an embodiment of the input formatting block 1000 described with reference to FIG. 1.

FIG. 4 illustrates a stream adaptation block of the input formatting module when the input signal corresponds to multiple input streams.

Referring to FIG. 4, the mode adaptation block for respectively processing the multiple input streams can include a scheduler 4000, an 1-Frame delay block 4010, a stuffing insertion block 4020, an in-band signaling 4030, a BB Frame scrambler 4040, a PLS generation block 4050 and a PLS scrambler 4060. Description will be given of each block of the stream adaptation block.

Operations of the stuffing insertion block 4020, the BB Frame scrambler 4040, the PLS generation block 4050 and the PLS scrambler 4060 correspond to those of the stuffing insertion block, BB scrambler, PLS generation block and the PLS scrambler described with reference to FIG. 2 and thus description thereof is omitted.

The scheduler 4000 can determine the overall cell allocation across the entire frame from the amount of FECBLOCKs of each DP. Including the allocation for PLS, EAC and FIC, the scheduler generate the values of PLS2-DYN data, which is transmitted as in-band signaling or PLS cell in FSS of the frame. Details of FECBLOCK, EAC and FIC will be described later.

The 1-Frame delay block 4010 can delay the input data by one transmission frame such that scheduling information about the next frame can be transmitted through the current frame for in-band signaling information to be inserted into the DPs.

The in-band signaling 4030 can insert un-delayed part of the PLS2 data into a DP of a frame.

The above-described blocks may be omitted or replaced by blocks having similar or identical functions.

FIG. 5 illustrates a BICM block according to an embodiment of the present invention.

The BICM block illustrated in FIG. 5 corresponds to an embodiment of the BICM block 1010 described with reference to FIG. 1.

As described above, the apparatus for transmitting broadcast signals for future broadcast services according to an embodiment of the present invention can provide a terrestrial broadcast service, mobile broadcast service, UHDTV service, etc.

Since QoS (quality of service) depends on characteristics of a service provided by the apparatus for transmitting broadcast signals for future broadcast services according to an embodiment of the present invention, data corresponding to respective services needs to be processed through different schemes. Accordingly, the a BICM block according to an embodiment of the present invention can independently process DPs input thereto by independently applying SISO, MISO and MIMO schemes to the data pipes respectively corresponding to data paths. Consequently, the apparatus for transmitting broadcast signals for future broadcast services according to an embodiment of the present invention can control QoS for each service or service component transmitted through each DP.

(a) shows the BICM block shared by the base profile and the handheld profile and (b) shows the BICM block of the advanced profile.

The BICM block shared by the base profile and the handheld profile and the BICM block of the advanced profile can include plural processing blocks for processing each DP.

A description will be given of each processing block of the BICM block for the base profile and the handheld profile and the BICM block for the advanced profile.

A processing block 5000 of the BICM block for the base profile and the handheld profile can include a Data FEC encoder 5010, a bit interleaver 5020, a constellation mapper 5030, an SSD (Signal Space Diversity) encoding block 5040 and a time interleaver 5050.

The Data FEC encoder 5010 can perform the FEC encoding on the input BBF to generate FECBLOCK procedure using outer coding (BCH), and inner coding (LDPC). The outer coding (BCH) is optional coding method. Details of operations of the Data FEC encoder 5010 will be described later.

The bit interleaver 5020 can interleave outputs of the Data FEC encoder 5010 to achieve optimized performance with combination of the LDPC codes and modulation scheme while providing an efficiently implementable structure. Details of operations of the bit interleaver 5020 will be described later.

The constellation mapper 5030 can modulate each cell word from the bit interleaver 5020 in the base and the handheld profiles, or cell word from the Cell-word demultiplexer 5010-1 in the advanced profile using either QPSK, QAM-16, non-uniform QAM (NUQ-64, NUQ-256, NUQ-1024) or non-uniform constellation (NUC-16, NUC-64, NUC-256, NUC-1024) to give a power-normalized constellation point, el. This constellation mapping is applied only for DPs. Observe that QAM-16 and NUQs are square shaped, while NUCs have arbitrary shape. When each constellation is rotated by any multiple of 90 degrees, the rotated constellation exactly overlaps with its original one. This "rotation-sense" symmetric property makes the capacities and the average powers of the real and imaginary components equal to each other. Both NUQs and NUCs are defined specifically for each code rate and the particular one used is signaled by the parameter DP_MOD filed in PLS2 data.

The SSD encoding block 5040 can precode cells in two (2D), three (3D), and four (4D) dimensions to increase the reception robustness under difficult fading conditions.

The time interleaver 5050 can operates at the DP level. The parameters of time interleaving (11) may be set differently for each DP. Details of operations of the time interleaver 5050 will be described later.

A processing block 5000-1 of the BICM block for the advanced profile can include the Data FEC encoder, bit interleaver, constellation mapper, and time interleaver. However, the processing block 5000-1 is distinguished from the processing block 5000 further includes a cell-word demultiplexer 5010-1 and a MIMO encoding block 5020-1.

Also, the operations of the Data FEC encoder, bit interleaver, constellation mapper, and time interleaver in the processing block 5000-1 correspond to those of the Data FEC encoder 5010, bit interleaver 5020, constellation mapper 5030, and time interleaver 5050 described and thus description thereof is omitted.

The cell-word demultiplexer 5010-1 is used for the DP of the advanced profile to divide the single cell-word stream into dual cell-word streams for MIMO processing. Details of operations of the cell-word demultiplexer 5010-1 will be described later.

The MIMO encoding block 5020-1 can processing the output of the cell-word demultiplexer 5010-1 using MIMO encoding scheme. The MIMO encoding scheme was optimized for broadcasting signal transmission. The MIMO technology is a promising way to get a capacity increase but it depends on channel characteristics. Especially for broadcasting, the strong LOS component of the channel or a difference in the received signal power between two antennas caused by different signal propagation characteristics makes it difficult to get capacity gain from MIMO. The proposed MIMO encoding scheme overcomes this problem using a rotation-based pre-coding and phase randomization of one of the MIMO output signals.

MIMO encoding is intended for a 2×2 MIMO system requiring at least two antennas at both the transmitter and the receiver. Two MIMO encoding modes are defined in this proposal; full-rate spatial multiplexing (FR-SM) and full-rate full-diversity spatial multiplexing (FRED-SM). The FR-SM encoding provides capacity increase with relatively small complexity increase at the receiver side while the FRFD-SM encoding provides capacity increase and additional diversity gain with a great complexity increase at the receiver side. The proposed MIMO encoding scheme has no restriction on the antenna polarity configuration.

MIMO processing is required for the advanced profile frame, which means all DPs in the advanced profile frame are processed by the MIMO encoder. MIMO processing is applied at DP level. Pairs of the Constellation Mapper outputs NUQ (e1,i and e2,i) are fed to the input of the MIMO Encoder. Paired MIMO Encoder output (g1,i and g2,i) is transmitted by the same carrier k and OFDM symbol l of their respective TX antennas.

The above-described blocks may be omitted or replaced by blocks having similar or identical functions.

Figure 6:
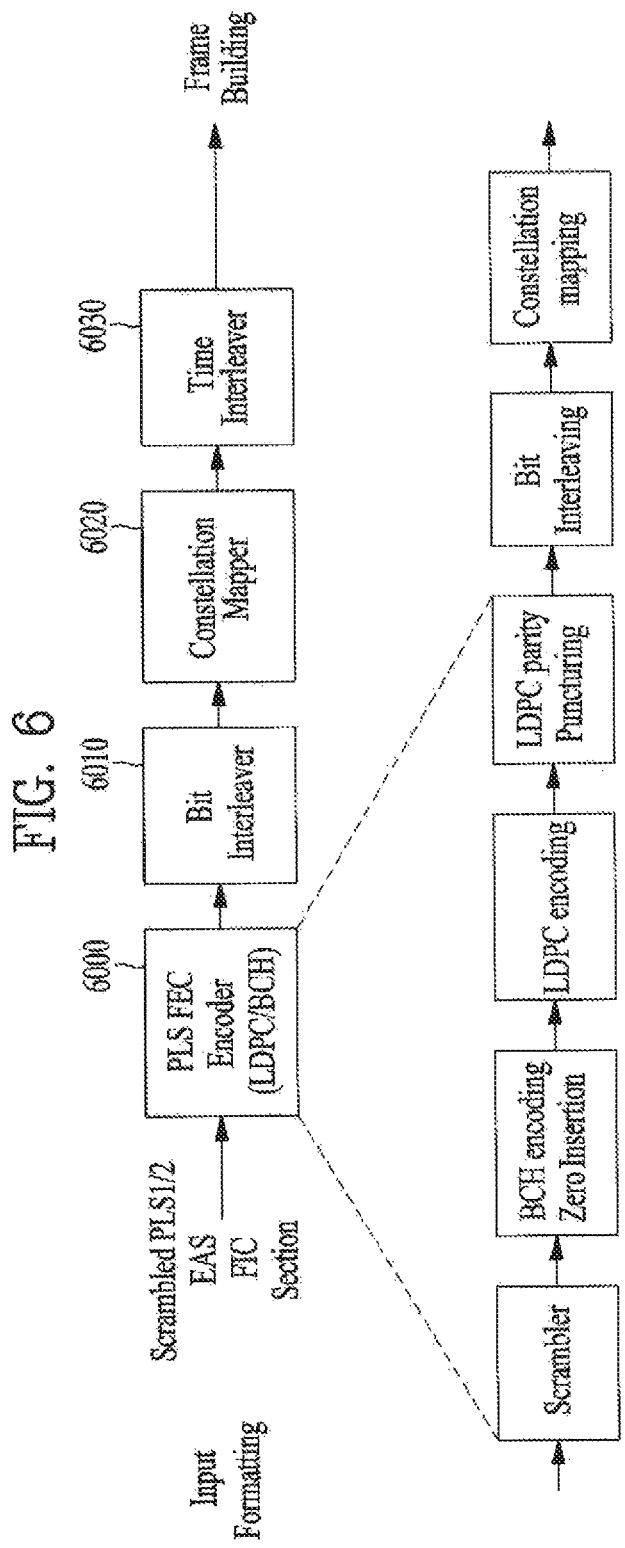
FIG. 6 illustrates a BICM block according to another embodiment of the present invention.

FIG. 6 illustrates a BICM block according to another embodiment of the present invention.

The BICM block illustrated in FIG. 6 corresponds to an embodiment of the BICM block 1010 described with reference to FIG. 1.

FIG. 6 illustrates a BICM block for protection of physical layer signaling (PLS), emergency alert channel (EAC) and fast information channel (FIC). EAC is a part of a frame that carries EAS information data and FIC is a logical channel in a frame that carries the mapping information between a service and the corresponding base DP. Details of the EAC and FIC will be described later.

Referring to FIG. 6, the BICM block for protection of PLS, EAC and FIC can include a PLS FEC encoder 6000, a bit interleaver 6010 and a constellation mapper 6020.

Also, the PLS FEC encoder 6000 can include a scrambler, BCH encoding/zero insertion block, LDPC encoding block and LDPC parity puncturing block. Description will be given of each block of the BICM block.

The PLS FEC encoder 6000 can encode the scrambled PLS 1/2 data, EAC and FIC section.

The scrambler can scramble PLS1 data and PLS2 data before BCH encoding and shortened and punctured LDPC encoding.

The BCH encoding/zero insertion block can perform outer encoding on the scrambled PLS 1/2 data using the shortened BCH code for PLS protection and insert zero bits after the BCH encoding. For PLS1 data only, the output bits of the zero insertion may be permutted before LDPC encoding.

The LDPC encoding block can encode the output of the BCH encoding/zero insertion block using LDPC code. To generate a complete coded block, Cldpc, parity bits, Pldpc are encoded systematically from each zero-inserted PLS information block, Ildpc and appended after it.

$$C_{ldpc} = [I_{ldpc}\ P_{ldpc}] = [i_0, i_1, \ldots, i_{K_{ldpc}-1}, p_0, p_1, \ldots, p_{N_{ldpc}-K_{ldpc}-1}]$$ [Math figure 1]

The LDPC code parameters for PLS1 and PLS2 are as following table 4.

TABLE 4

| Signaling Type | $K_{sig}$ | $K_{bch}$ | $N_{bch\_parity}$ | $N_{ldpc}$ (=$N_{bch}$) | $K_{ldpc}$ | $N_{ldpc\_parity}$ | code rate | $Q_{ldpc}$ |
|---|---|---|---|---|---|---|---|---|
| PLS1 | 342 | 1020 | 60 | 1080 | 4320 | 3240 | 1/4 | 36 |
| PLS2 | <1021 | | | | | | | |
| | >1020 | 2100 | | 2160 | 7200 | 5040 | 3/10 | 56 |

The LDPC parity puncturing block can perform puncturing on the PLS1 data and PLS 2 data.

When shortening is applied to the PLS1 data protection, some LDPC parity bits are punctured after LDPC encoding. Also, for the PLS2 data protection, the LDPC parity bits of PLS2 are punctured after LDPC encoding. These punctured bits are not transmitted.

The bit interleaver 6010 can interleave the each shortened and punctured PLS1 data and PLS2 data.

The constellation mapper 6020 can map the bit interleaved PLS1 data and PLS2 data onto constellations.

The above-described blocks may be omitted or replaced by blocks having similar or identical functions.

Figure 7:
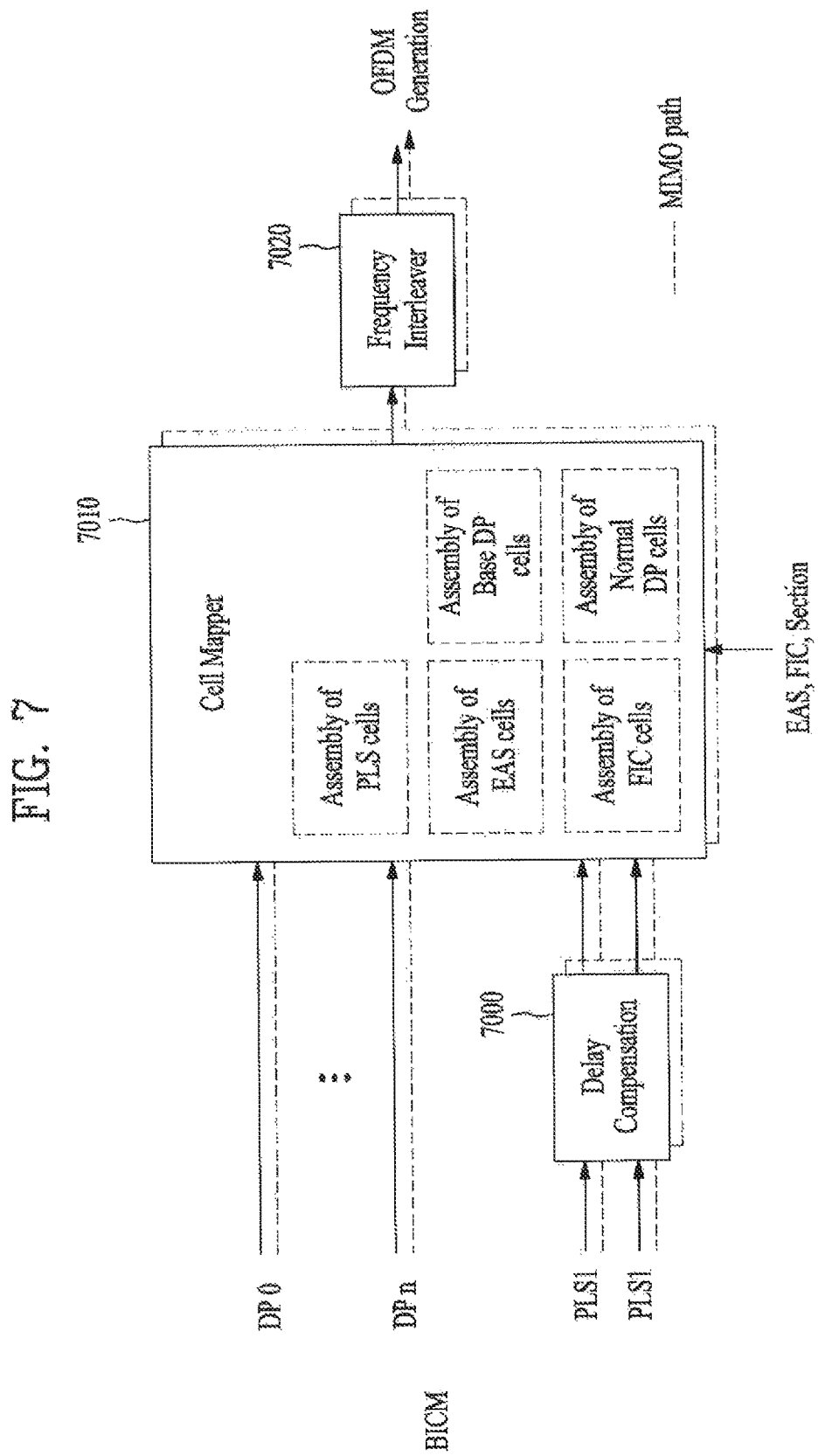
FIG. 7 illustrates a frame building block according to one embodiment of the present invention.

FIG. 7 illustrates a frame building block according to one embodiment of the present invention.

The frame building block illustrated in FIG. 7 corresponds to an embodiment of the frame building block 1020 described with reference to FIG. 1.

Referring to FIG. 7, the frame building block can include a delay compensation block 7000, a cell mapper 7010 and a frequency interleaver 7020. Description will be given of each block of the frame building block.

The delay compensation block 7000 can adjust the timing between the data pipes and the corresponding PLS data to ensure that they are co-timed at the transmitter end. The PLS data is delayed by the same amount as data pipes are by addressing the delays of data pipes caused by the Input Formatting block and BICM block. The delay of the BICM block is mainly due to the time interleaver 5050. In-band signaling data carries information of the next TI group so that they are carried one frame ahead of the DPs to be signaled. The Delay Compensating block delays in-band signaling data accordingly.

The cell mapper 7010 can map PLS, EAC, FIC, DPs, auxiliary streams and dummy cells into the active carriers of the OFDM symbols in the frame. The basic function of the cell mapper 7010 is to map data cells produced by the TIs for each of the DPs, PLS cells, and EAC/FIC cells, if any, into arrays of active OFDM cells corresponding to each of the OFDM symbols within a frame. Service signaling data (such as PSI(program specific information)/SI) can be separately gathered and sent by a data pipe. The Cell Mapper operates according to the dynamic information produced by the scheduler and the configuration of the frame structure. Details of the frame will be described later.

The frequency interleaver 7020 can randomly interleave data cells received from the cell mapper 7010 to provide frequency diversity. Also, the frequency interleaver 7020 can operate on very OFDM symbol pair comprised of two sequential OFDM symbols using a different interleaving-seed order to get maximum interleaving gain in a single frame.

The above-described blocks may be omitted or replaced by blocks having similar or identical functions.

Figure 8:
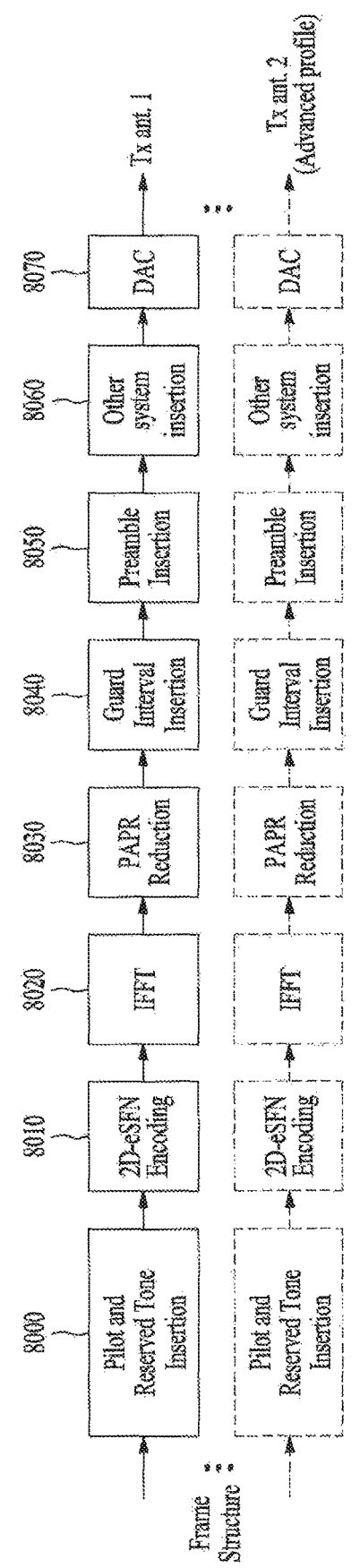
FIG. 8 illustrates an OFDM generation block according to an embodiment of the present invention.

FIG. 8 illustrates an OFDM generation block according to an embodiment of the present invention.

The OFDM generation block illustrated in FIG. 8 corresponds to an embodiment of the OFDM generation block 1030 described with reference to FIG. 1.

The OFDM generation block modulates the OFDM carriers by the cells produced by the Frame Building block, inserts the pilots, and produces the time domain signal for transmission. Also, this block subsequently inserts guard intervals, and applies PAPR (Peak-to-Average Power Radio) reduction processing to produce the final RF signal.

Referring to FIG. 8, the OFDM generation block can include a pilot and reserved tone insertion block 8000, a 2D-eSFN encoding block 8010, an IFFT (Inverse Fast Fourier Transform) block 8020, a PAPR reduction block 8030, a guard interval insertion block 8040, a preamble insertion block 8050, other system insertion block 8060 and a DAC block 8070. Description will be given of each block of the frame building block.

The pilot and reserved tone insertion block 8000 can insert pilots and the reserved tone.

Various cells within the OFDM symbol are modulated with reference information, known as pilots, which have transmitted values known a priori in the receiver. The information of pilot cells is made up of scattered pilots, continual pilots, edge pilots, FSS (frame signaling symbol) pilots and FES (frame edge symbol) pilots. Each pilot is transmitted at a particular boosted power level according to pilot type and pilot pattern. The value of the pilot information is derived from a reference sequence, which is a series of values, one for each transmitted carrier on any given symbol. The pilots can be used for frame synchronization, frequency synchronization, time synchronization, channel estimation, and transmission mode identification, and also can be used to follow the phase noise.

Reference information, taken from the reference sequence, is transmitted in scattered pilot cells in every symbol except the preamble, FSS and FES of the frame. Continual pilots are inserted in every symbol of the frame. The number and location of continual pilots depends on both the FFT size and the scattered pilot pattern. The edge carriers are edge pilots in every symbol except for the preamble symbol. They are inserted in order to allow frequency interpolation up to the edge of the spectrum. FSS pilots are inserted in FSS(s) and FES pilots are inserted in FES. They are inserted in order to allow time interpolation up to the edge of the frame.

The system according to an embodiment of the present invention supports the SFN network, where distributed MISO scheme is optionally used to support very robust transmission mode. The 2D-eSFN is a distributed MISO scheme that uses multiple TX antennas, each of which is located in the different transmitter site in the SFN network.

The 2D-eSFN encoding block 8010 can process a 2D-eSFN processing to distorts the phase of the signals transmitted from multiple transmitters, in order to create both time and frequency diversity in the SFN configuration. Hence, burst errors due to low flat fading or deep-fading for a long time can be mitigated.

The IFFT block 8020 can modulate the output from the 2D-eSFN encoding block 8010 using OFDM modulation scheme. Any cell in the data symbols which has not been designated as a pilot (or as a reserved tone) carries one of the data cells from the frequency interleaver. The cells are mapped to OFDM carriers.

The PAPR reduction block 8030 can perform a PAPR reduction on input signal using various PAPR reduction algorithm in the time domain.

The guard interval insertion block 8040 can insert guard intervals and the preamble insertion block 8050 can insert preamble in front of the signal. Details of a structure of the preamble will be described later. The other system insertion block 8060 can multiplex signals of a plurality of broadcast transmission/reception systems in the time domain such that data of two or more different broadcast transmission/reception systems providing broadcast services can be simultaneously transmitted in the same RF signal bandwidth. In this case, the two or more different broadcast transmission/reception systems refer to systems providing different broadcast services. The different broadcast services may refer to a terrestrial broadcast service, mobile broadcast service, etc. Data related to respective broadcast services can be transmitted through different frames.

The DAC block 8070 can convert an input digital signal into an analog signal and output the analog signal. The signal output from the DAC block 7800 can be transmitted through multiple output antennas according to the physical layer profiles. A Tx antenna according to an embodiment of the present invention can have vertical or horizontal polarity.

The above-described blocks may be omitted or replaced by blocks having similar or identical functions according to design.

Figure 9:
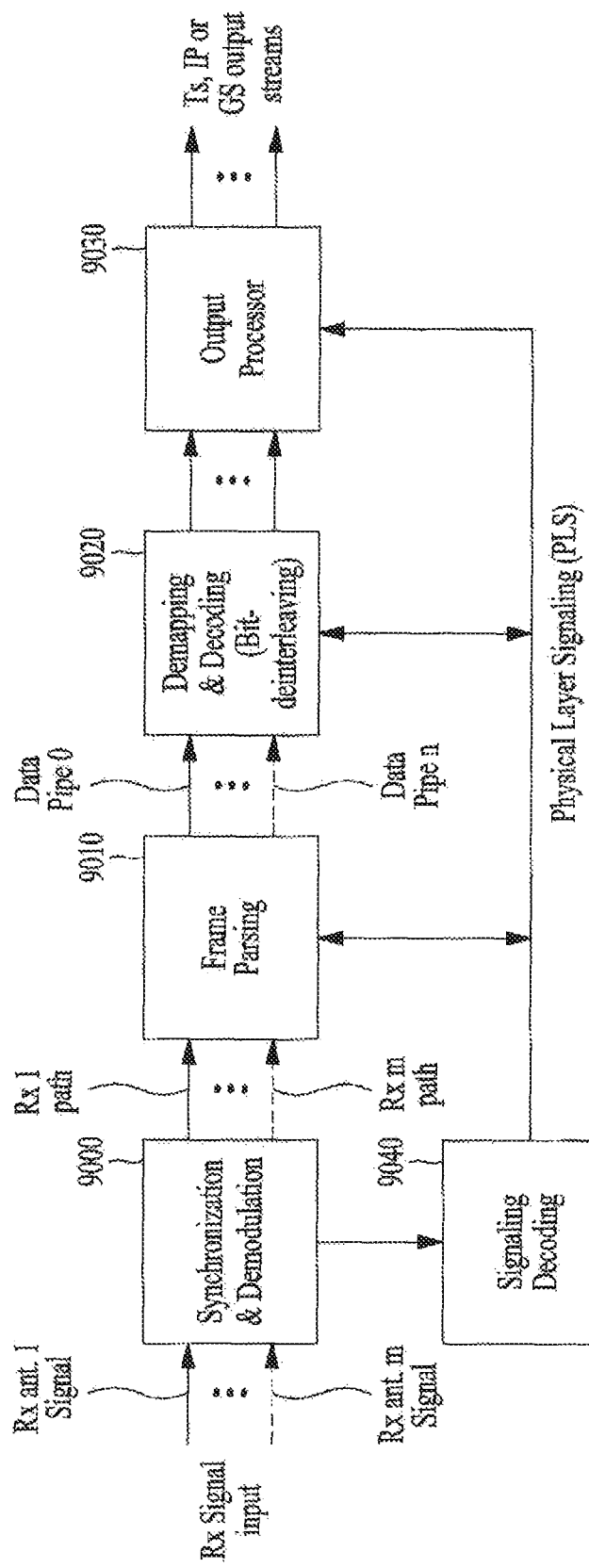
FIG. 9 illustrates a structure of an apparatus for receiving broadcast signals for future broadcast services according to an embodiment of the present invention.

FIG. 9 illustrates a structure of an apparatus for receiving broadcast signals for future broadcast services according to an embodiment of the present invention.

The apparatus for receiving broadcast signals for future broadcast services according to an embodiment of the present invention can correspond to the apparatus for transmitting broadcast signals for future broadcast services, described with reference to FIG. 1.

The apparatus for receiving broadcast signals for future broadcast services according to an embodiment of the present invention can include a synchronization & demodulation module 9000, a frame parsing module 9010, a demapping & decoding module 9020, an output processor 9030 and a signaling decoding module 9040. A description will be given of operation of each module of the apparatus for receiving broadcast signals.

The synchronization & demodulation module 9000 can receive input signals through m Rx antennas, perform signal detection and synchronization with respect to a system corresponding to the apparatus for receiving broadcast signals and carry out demodulation corresponding to a reverse procedure of the procedure performed by the apparatus for transmitting broadcast signals.

The frame parsing module 9010 can parse input signal frames and extract data through which a service selected by a user is transmitted. If the apparatus for transmitting broadcast signals performs interleaving, the frame parsing module 9010 can carry out deinterleaving corresponding to a reverse procedure of interleaving. In this case, the positions of a signal and data that need to be extracted can be obtained by decoding data output from the signaling decoding module 9040 to restore scheduling information generated by the apparatus for transmitting broadcast signals.

The demapping & decoding module 9020 can convert the input signals into bit domain data and then deinterleave the same as necessary. The demapping & decoding module 9020 can perform demapping for mapping applied for transmission efficiency and correct an error generated on a transmission channel through decoding. In this case, the demapping & decoding module 9020 can obtain transmission parameters necessary for demapping and decoding by decoding the data output from the signaling decoding module 9040.

The output processor 9030 can perform reverse procedures of various compression/signal processing procedures which are applied by the apparatus for transmitting broadcast signals to improve transmission efficiency. In this case, the output processor 9030 can acquire necessary control information from data output from the signaling decoding module 9040. The output of the output processor 8300 corresponds to a signal input to the apparatus for transmitting broadcast signals and may be MPEG-TSs, IP streams (v4 or v6) and generic streams.

The signaling decoding module 9040 can obtain PLS information from the signal demodulated by the synchronization & demodulation module 9000. As described above, the frame parsing module 9010, demapping & decoding module 9020 and output processor 9030 can execute functions thereof using the data output from the signaling decoding module 9040.

Figure 10:
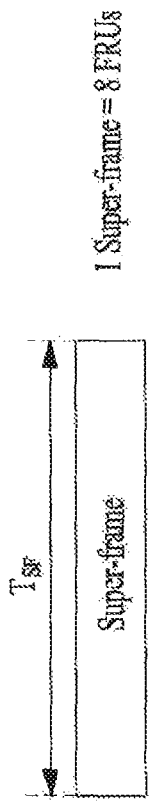
FIG. 10(a), FIG. 10(b), FIG. 10(c) and FIG. 10(d) illustrate a frame structure according to an embodiment of the present invention.

FIG. 10 illustrates a frame structure according to an embodiment of the present invention.

FIG. 10 shows an example configuration of the frame types and FRUs in a super-frame. (a) shows a super frame according to an embodiment of the present invention, (b) shows FRU (Frame Repetition Unit) according to an embodiment of the present invention, (c) shows frames of variable PHY profiles in the FRU and (d) shows a structure of a frame.

A super-frame may be composed of eight FRUs. The FRU is a basic multiplexing unit for TDM of the frames, and is repeated eight times in a super-frame.

Each frame in the FRU belongs to one of the PHY profiles, (base, handheld, advanced) or FEF. The maximum allowed number of the frames in the FRU is four and a given PHY profile can appear any number of times from zero times to four times in the FRU (e.g., base, base, handheld, advanced). PHY profile definitions can be extended using reserved values of the PHY_PROFILE in the preamble, if required.

The FEF part is inserted at the end of the FRU, if included. When the FEF is included in the FRU, the minimum number of FEFs is 8 in a super-frame. It is not recommended that FEF parts be adjacent to each other.

One frame is further divided into a number of OFDM symbols and a preamble. As shown in (d), the frame comprises a preamble, one or more frame signaling symbols (FSS), normal data symbols and a frame edge symbol (FES).

The preamble is a special symbol that enables fast Futurecast UTB system signal detection and provides a set of basic transmission parameters for efficient transmission and reception of the signal. The detailed description of the preamble will be will be described later.

The main purpose of the FSS(s) is to carry the PLS data. For fast synchronization and channel estimation, and hence fast decoding of PLS data, the FSS has more dense pilot pattern than the normal data symbol. The FES has exactly the same pilots as the FSS, which enables frequency-only interpolation within the FES and temporal interpolation, without extrapolation, for symbols immediately preceding the FES.

Figures 11, 12:
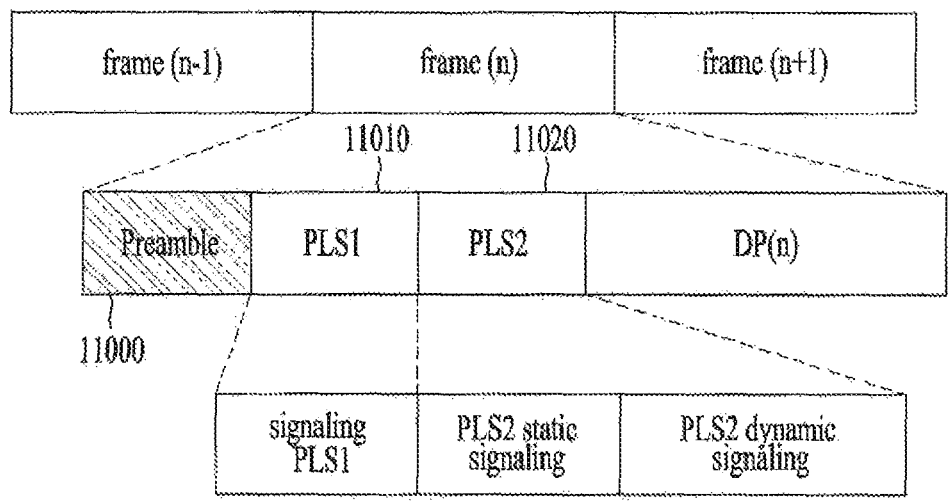
FIG. 11 illustrates a signaling hierarchy structure of the frame according to an embodiment of the present invention.
FIG. 12 illustrates preamble signaling data according to an embodiment of the present invention.

FIG. 11 illustrates a signaling hierarchy structure of the frame according to an embodiment of the present invention.

FIG. 11 illustrates the signaling hierarchy structure, which is split into three main parts: the preamble signaling data 11000, the PLS1 data 11010 and the PLS2 data 11020. The purpose of the preamble, which is carried by the preamble symbol in every frame, is to indicate the transmission type and basic transmission parameters of that frame. The PLS1 enables the receiver to access and decode the PLS2 data, which contains the parameters to access the DP of interest. The PLS2 is carried in every frame and split into two main parts: PLS2-STAT data and PLS2-DYN data. The static and dynamic portion of PLS2 data is followed by padding, if necessary.

FIG. 12 illustrates preamble signaling data according to an embodiment of the present invention.

Preamble signaling data carries 21 bits of information that are needed to enable the receiver to access PLS data and trace DPs within the frame structure. Details of the preamble signaling data are as follows:

PHY_PROFILE: This 3-bit field indicates the PHY profile type of the current frame. The mapping of different PHY profile types is given in below table 5.

TABLE 5

| Value | PHY profile |
|---|---|
| 000 | Base profile |
| 001 | Handheld profile |
| 010 | Advanced profiled |
| 011~110 | Reserved |
| 111 | FEF |

FFT_SIZE: This 2 bit field indicates the FFT size of the current frame within a frame-group, as described in below table 6.

TABLE 6

| Value | FFT size |
|---|---|
| 00 | 8K FFT |
| 01 | 16K FFT |
| 10 | 32K FFT |
| 11 | Reserved |

GI_FRACTION: This 3 bit field indicates the guard interval fraction value in the current super-frame, as described in below table 7.

TABLE 7

| Value | GI_FRACTION |
|---|---|
| 000 | 1/5 |
| 001 | 1/10 |
| 010 | 1/20 |
| 011 | 1/40 |
| 100 | 1/80 |
| 101 | 1/160 |
| 110~111 | Reserved |

EAC_FLAG: This 1 bit field indicates whether the EAC is provided in the current frame. If this field is set to '1', emergency alert service (EAS) is provided in the current frame. If this field set to '0', EAS is not carried in the current frame. This field can be switched dynamically within a super-frame.

PILOT_MODE: This 1-bit field indicates whether the pilot mode is mobile mode or fixed mode for the current frame in the current frame-group. If this field is set to '0', mobile pilot mode is used. If the field is set to '1', the fixed pilot mode is used.

PAPR_FLAG: This 1-bit field indicates whether PAPR reduction is used for the current frame in the current frame-group. If this field is set to value '1', tone reservation is used for PAPR reduction. If this field is set to '0', PAPR reduction is not used.

FRU_CONFIGURE: This 3-bit field indicates the PHY profile type configurations of the frame repetition units (FRU) that are present in the current super-frame. All profile types conveyed in the current super-frame are identified in this field in all preambles in the current super-frame. The 3-bit field has a different definition for each profile, as show in below table 8.

Minor version: The LSB four bits of SYSTEM_VERSION field indicate minor version information. A change in the minor version field is backward-compatible.

CELL_ID: This is a 16-bit field which uniquely identifies a geographic cell in an ATSC network. An ATSC cell coverage area may consist of one or more frequencies, depending on the number of frequencies used per Futurecast UTB system. If the value of the CELL_ID is not known or unspecified, this field is set to '0'.

NETWORK_ID: This is a 16-bit field which uniquely identifies the current ATSC network.

SYSTEM_ID: This 16-bit field uniquely identifies the Futurecast UTB system within the ATSC network. The Futurecast UTB system is the terrestrial broadcast system whose input is one or more input streams (TS, IP, GS) and whose output is an RF signal. The Futurecast UTB system carries one or more PHY profiles and FEF, if any. The same

TABLE 8

| | Current PHY_PROFILE = '000' (base) | Current PHY_PROFILE = '001' (handheld) | Current PHY_PROFILE = '010' (advanced) | Current PHY_PROFILE = '111' (FEF) |
|---|---|---|---|---|
| FRU_CONFIGURE = 000 | Only base profile present | Only handheld profile present | Only advanced profile present | Only FEF present |
| FRU_CONFIGURE = 1XX | Handheld profile present | Base profile present | Base profile present | Base profile present |
| FRU_CONFIGURE = X1X | Advanced profile present | Advanced profile present | Handheld profile present | Handheld profile present |
| FRU_CONFIGURE = XX1 | FEF present | FEF present | FEF present | Advanced profile present |

RESERVED: This 7-bit field is reserved for future use.

FIG. 13 illustrates PLS1 data according to an embodiment of the present invention.

PLS1 data provides basic transmission parameters including parameters required to enable the reception and decoding of the PLS2. As above mentioned, the PLS1 data remain unchanged for the entire duration of one frame-group. The detailed definition of the signaling fields of the PLS1 data are as follows:

PREAMBLE_DATA: This 20-bit field is a copy of the preamble signaling data excluding the EAC_FLAG.

NUM_FRAME_FRU: This 2-bit field indicates the number of the frames per FRU.

PAYLOAD_TYPE: This 3-bit field indicates the format of the payload data carried in the frame-group. PAYLOAD_TYPE is signaled as shown in table 9.

TABLE 9

| value | Payload type |
|---|---|
| 1XX | TS stream is transmitted |
| X1X | IP stream is transmitted |
| XX1 | GS stream is transmitted |

NUM_FSS: This 2-bit field indicates the number of FSS symbols in the current frame.

SYSTEM_VERSION: This 8-bit field indicates the version of the transmitted signal format. The SYSTEM_VERSION is divided into two 4-bit fields, which are a major version and a minor version.

Major version: The MSB four bits of SYSTEM_VERSION field indicate major version information. A change in the major version field indicates a non-backward-compatible change. The default value is '0000'. For the version described in this standard, the value is set to '0000'.

Futurecast UTB system may carry different input streams and use different RF frequencies in different geographical areas, allowing local service insertion. The frame structure and scheduling is controlled in one place and is identical for all transmissions within a Futurecast UTB system. One or more Futurecast UTB systems may have the same SYSTEM_ID meaning that they all have the same physical layer structure and configuration.

The following loop consists of FRU_PHY_PROFILE, FRU_FRAME_LENGTH, FRU_GI_FRACTION, and RESERVED which are used to indicate the FRU configuration and the length of each frame type. The loop size is fixed so that four PHY profiles (including a FEF) are signaled within the FRU. If NUM_FRAME_FRU is less than 4, the unused fields are filled with zeros.

FRU_PHY_PROFILE: This 3-bit field indicates the PHY profile type of the (i+1)th (i is the loop index) frame of the associated FRU. This field uses the same signaling format as shown in the table 8.

FRU_FRAME_LENGTH: This 2-bit field indicates the length of the (i+1)th frame of the associated FRU. Using FRU_FRAME_LENGTH together with FRU_GI_FRACTION, the exact value of the frame duration can be obtained.

FRU_GI_FRACTION: This 3-bit field indicates the guard interval fraction value of the (i+1)th frame of the associated FRU. FRU_GI_FRACTION is signaled according to the table 7.

RESERVED: This 4-bit field is reserved for future use.

The following fields provide parameters for decoding the PLS2 data.

PLS2_FEC_TYPE: This 2-bit field indicates the FEC type used by the PLS2 protection. The FEC type is signaled according to table 10. The details of the LDPC codes will be described later.

TABLE 10

| Content | PLS2 FEC type |
| --- | --- |
| 00 | 4K-¼ and 7K-³⁄₁₀ LDPC codes |
| 01~11 | Reserved |

PLS2_MOD: This 3-bit field indicates the modulation type used by the PLS2. The modulation type is signaled according to table 11.

TABLE 11

| Value | PLS2_MODE |
| --- | --- |
| 000 | BPSK |
| 001 | QPSK |
| 010 | QAM-16 |
| 011 | NUQ-64 |
| 100~111 | Reserved |

PLS2_SIZE_CELL: This 15-bit field indicates Ctotal_partial_block, the size (specified as the number of QAM cells) of the collection of full coded blocks for PLS2 that is carried in the current frame-group. This value is constant during the entire duration of the current frame-group.

PLS2_STAT_SIZE_BIT: This 14-bit field indicates the size, in bits, of the PLS2-STAT for the current frame-group. This value is constant during the entire duration of the current frame-group.

PLS2_DYN_SIZE_BIT: This 14-bit field indicates the size, in bits, of the PLS2-DYN for the current frame-group. This value is constant during the entire duration of the current frame-group.

PLS2_REP_FLAG: This 1-bit flag indicates whether the PLS2 repetition mode is used in the current frame-group. When this field is set to value '1', the PLS2 repetition mode is activated. When this field is set to value '0', the PLS2 repetition mode is deactivated.

PLS2_REP_SIZE_CELL: This 15-bit field indicates Ctotal_partial_block, the size (specified as the number of QAM cells) of the collection of partial coded blocks for PLS2 carried in every frame of the current frame-group, when PLS2 repetition is used. If repetition is not used, the value of this field is equal to 0. This value is constant during the entire duration of the current frame-group.

PLS2_NEXT_FEC_TYPE: This 2-bit field indicates the FEC type used for PLS2 that is carried in every frame of the next frame-group. The FEC type is signaled according to the table 10.

PLS2_NEXT_MOD: This 3-bit field indicates the modulation type used for PLS2 that is carried in every frame of the next frame-group. The modulation type is signaled according to the table 11.

PLS2_NEXT_REP_FLAG: This 1-bit flag indicates whether the PLS2 repetition mode is used in the next frame-group. When this field is set to value '1', the PLS2 repetition mode is activated. When this field is set to value '0', the PLS2 repetition mode is deactivated.

PLS2_NEXT_REP_SIZE_CELL: This 15-bit field indicates Ctotal_full_block, The size (specified as the number of QAM cells) of the collection of full coded blocks for PLS2 that is carried in every frame of the next frame-group, when PLS2 repetition is used. If repetition is not used in the next frame-group, the value of this field is equal to 0. This value is constant during the entire duration of the current frame-group.

PLS2_NEXT_REP_STAT_SIZE_BIT: This 14-bit field indicates the size, in bits, of the PLS2-STAT for the next frame-group. This value is constant in the current frame-group.

PLS2_NEXT_REP_DYN_SIZE_BIT: This 14-bit field indicates the size, in bits, of the PLS2-DYN for the next frame-group. This value is constant in the current frame-group.

PLS2_AP_MODE: This 2-bit field indicates whether additional parity is provided for PLS2 in the current frame-group. This value is constant during the entire duration of the current frame-group. The below table 12 gives the values of this field. When this field is set to '00', additional parity is not used for the PLS2 in the current frame-group.

TABLE 12

| Value | PLS2-AP mode |
| --- | --- |
| 00 | AP is not provided |
| 01 | AP1 mode |
| 10~11 | Reserved |

PLS2_AP_SIZE_CELL: This 15-bit field indicates the size (specified as the number of QAM cells) of the additional parity bits of the PLS2. This value is constant during the entire duration of the current frame-group.

PLS2_NEXT_AP_MODE: This 2-bit field indicates whether additional parity is provided for PLS2 signaling in every frame of next frame-group. This value is constant during the entire duration of the current frame-group. The table 12 defines the values of this field PLS2_NEXT_AP_SIZE_CELL: This 15-bit field indicates the size (specified as the number of QAM cells) of the additional parity bits of the PLS2 in every frame of the next frame-group. This value is constant during the entire duration of the current frame-group.

RESERVED: This 32-bit field is reserved for future use.

CRC_32: A 32-bit error detection code, which is applied to the entire PLS1 signaling.

FIG. 14 illustrates PLS2 data according to an embodiment of the present invention.

FIG. 14 illustrates PLS2-STAT data of the PLS2 data. The PLS2-STAT data are the same within a frame-group, while the PLS2-DYN data provide information that is specific for the current frame.

The details of fields of the PLS2-STAT data are as follows:

FIC_FLAG: This 1-bit field indicates whether the FIC is used in the current frame-group. If this field is set to '1', the FIC is provided in the current frame. If this field set to '0', the FIC is not carried in the current frame. This value is constant during the entire duration of the current frame-group.

AUX_FLAG: This 1-bit field indicates whether the auxiliary stream(s) is used in the current frame-group. If this field is set to '1', the auxiliary stream is provided in the current frame. If this field set to '0', the auxiliary stream is not carried in the current frame. This value is constant during the entire duration of current frame-group.

NUM_DP: This 6-bit field indicates the number of DPs carried within the current frame. The value of this field ranges from 1 to 64, and the number of DPs is NUM_DP+1.

DP_ID: This 6-bit field identifies uniquely a DP within a PHY profile.

DP_TYPE: This 3-bit field indicates the type of the DP. This is signaled according to the below table 13.

TABLE 13

| Value | DP Type |
|---|---|
| 000 | DP Type 1 |
| 001 | DP Type 2 |
| 010~111 | reserved |

DP_GROUP_ID: This 8-bit field identifies the DP group with which the current DP is associated. This can be used by a receiver to access the DPs of the service components associated with a particular service, which will have the same DP_GROUP_ID.

BASE_DP_ID: This 6-bit field indicates the DP carrying service signaling data (such as PSI/SI) used in the Management layer. The DP indicated by BASE_DP_ID may be either a normal DP carrying the service signaling data along with the service data or a dedicated DP carrying only the service signaling data DP_FEC_TYPE: This 2-bit field indicates the FEC type used by the associated DP. The FEC type is signaled according to the below table 14.

TABLE 14

| Value | FEC TYPE |
|---|---|
| 00 | 16K LDPC |
| 01 | 64K LDPC |
| 10~11 | Reserved |

DP_COD: This 4-bit field indicates the code rate used by the associated DP. The code rate is signaled according to the below table 15.

TABLE 15

| Value | Code rate |
|---|---|
| 0000 | 5/15 |
| 0001 | 6/15 |
| 0010 | 7/15 |
| 0011 | 8/15 |
| 0100 | 9/15 |
| 0101 | 10/15 |
| 0110 | 11/15 |
| 0111 | 12/15 |
| 1000 | 13/15 |
| 1001~1111 | Reserved |

DP_MOD: This 4-bit field indicates the modulation used by the associated DP. The modulation is signaled according to the below table 16.

TABLE 16

| Value | Modulation |
|---|---|
| 0000 | QPSK |
| 0001 | QAM-16 |
| 0010 | NUQ-64 |
| 0011 | NUQ-256 |
| 0100 | NUQ-1024 |
| 0101 | NUC-16 |
| 0110 | NUC-64 |
| 0111 | NUC-256 |
| 1000 | NUC-1024 |
| 1001~1111 | reserved |

DP_SSD_FLAG: This 1-bit field indicates whether the SSD mode is used in the associated DP. If this field is set to value '1', SSD is used. If this field is set to value '0', SSD is not used.

The following field appears only if PHY_PROFILE is equal to '010', which indicates the advanced profile:

DP_MIMO: This 3-bit field indicates which type of MIMO encoding process is applied to the associated DP. The type of MIMO encoding process is signaled according to the table 17.

TABLE 17

| Value | MIMO encoding |
|---|---|
| 000 | FR-SM |
| 001 | FRFD-SM |
| 010~111 | reserved |

DP_TI_TYPE: This 1-bit field indicates the type of time-interleaving. A value of '0' indicates that one TI group corresponds to one frame and contains one or more TI-blocks. A value of '1' indicates that one TI group is carried in more than one frame and contains only one TI-block.

DP_TI_LENGTH: The use of this 2-bit field (the allowed values are only 1, 2, 4, 8) is determined by the values set within the DP_TI_TYPE field as follows:

If the DP_TI_TYPE is set to the value '1', this field indicates PI, the number of the frames to which each TI group is mapped, and there is one TI-block per TI group (NTI=1). The allowed PI values with 2-bit field are defined in the below table 18.

If the DP_TI_TYPE is set to the value '0', this field indicates the number of TI-blocks NTI per TI group, and there is one TI group per frame (PI=1). The allowed PI values with 2-bit field are defined in the below table 18.

TABLE 18

| 2-bit field | $P_I$ | $N_{TI}$ |
|---|---|---|
| 00 | 1 | 1 |
| 01 | 2 | 2 |
| 10 | 4 | 3 |
| 11 | 8 | 4 |

DP_FRAME_INTERVAL: This 2-bit field indicates the frame interval (HUMP) within the frame-group for the associated DP and the allowed values are 1, 2, 4, 8 (the corresponding 2-bit field is '00', '01', '10', or '11', respectively). For DPs that do not appear every frame of the frame-group, the value of this field is equal to the interval between successive frames. For example, if a DP appears on the frames 1, 5, 9, 13, etc., this field is set to '4'. For DPs that appear in every frame, this field is set to '1'.

DP_TI_BYPASS: This 1-bit field determines the availability of time interleaver 5050. If time interleaving is not used for a DP, it is set to '1'. Whereas if time interleaving is used it is set to '0'.

DP_FIRST_FRAME_IDX: This 5-bit field indicates the index of the first frame of the super-frame in which the current DP occurs. The value of DP_FIRST_FRAME_IDX ranges from 0 to 31

DP_NUM_BLOCK_MAX: This 10-bit field indicates the maximum value of DP_NUM_BLOCKS for this DP. The value of this field has the same range as DP_NUM_BLOCKS.

DP_PAYLOAD_TYPE: This 2-bit field indicates the type of the payload data carried by the given DP. DP_PAYLOAD_TYPE is signaled according to the below table 19.

TABLE 19

| Value | Payload Type |
| --- | --- |
| 00 | TS. |
| 01 | IP |
| 10 | GS |
| 11 | reserved |

DP_INBAND_MODE: This 2-bit field indicates whether the current DP carries in-band signaling information. The in-band signaling type is signaled according to the below table 20.

TABLE 20

| Value | In-band mode |
| --- | --- |
| 00 | In-band signaling is not carried. |
| 01 | INBAND-PLS is carried only |
| 10 | INBAND-ISSY is carried only |
| 11 | INBAND-PLS and INBAND-ISSY are carried |

DP_PROTOCOL_TYPE: This 2-bit field indicates the protocol type of the payload carried by the given DP. It is signaled according to the below table 21 when input payload types are selected.

TABLE 21

| Value | If DP_PAYLOAD_TYPE Is TS | If DP_PAYLOAD_TYPE Is IP | If DP_PAYLOAD_TYPE Is GS |
| --- | --- | --- | --- |
| 00 | MPEG2-TS | IPv4 | (Note) |
| 01 | Reserved | IPv6 | Reserved |
| 10 | Reserved | Reserved | Reserved |
| 11 | Reserved | Reserved | Reserved |

DP_CRC_MODE: This 2-bit field indicates whether CRC encoding is used in the Input Formatting block. The CRC mode is signaled according to the below table 22.

TABLE 22

| Value | CRC mode |
| --- | --- |
| 00 | Not used |
| 01 | CRC-8 |
| 10 | CRC-16 |
| 11 | CRC-32 |

DNP_MODE: This 2-bit field indicates the null-packet deletion mode used by the associated DP when DP_PAYLOAD_TYPE is set to TS ('00'). DNP_MODE is signaled according to the below table 23. If DP_PAYLOAD_TYPE is not TS ('00'), DNP_MODE is set to the value '00'.

TABLE 23

| Value | Null-packet deletion mode |
| --- | --- |
| 00 | Not used |
| 01 | DNP-NORMAL |
| 10 | DNP-OFFSET |
| 11 | reserved |

ISSY_MODE: This 2-bit field indicates the ISSY mode used by the associated DP when DP_PAYLOAD_TYPE is set to TS ('00'). The ISSY_MODE is signaled according to the below table 24 If DP_PAYLOAD_TYPE is not TS ('00'), ISSY_MODE is set to the value '00'.

TABLE 24

| Value | ISSY mode |
| --- | --- |
| 00 | Not used |
| 01 | ISSY-UP |
| 10 | ISSY-BBF |
| 11 | reserved |

HC_MODE_TS: This 2-bit field indicates the TS header compression mode used by the associated DP when DP_PAYLOAD_TYPE is set to TS ('00'). The HC_MODE_TS is signaled according to the below table 25.

TABLE 25

| Value | Header compression mode |
| --- | --- |
| 00 | HC_MODE_TS 1 |
| 01 | HC_MODE_TS 2 |
| 10 | HC_MODE_TS 3 |
| 11 | HC_MODE_TS 4 |

HC_MODE_IP: This 2-bit field indicates the IP header compression mode when DP_PAYLOAD_TYPE is set to IP ('01'). The HC_MODE_IP is signaled according to the below table 26.

TABLE 26

| Value | Header compression mode |
| --- | --- |
| 00 | No compression |
| 01 | HC_MODE_IP 1 |
| 10~11 | reserved |

PID: This 13-bit field indicates the PID number for TS header compression when DP_PAYLOAD_TYPE is set to TS ('00') and HC_MODE_TS is set to '01' or '10'.

RESERVED: This 8-bit field is reserved for future use.

The following field appears only if FIC_FLAG is equal to '1':

FIC_VERSION: This 8-bit field indicates the version number of the FIC.

FIC_LENGTH_BYTE: This 13-bit field indicates the length, in bytes, of the FIC.

RESERVED: This 8-bit field is reserved for future use.

The following field appears only if AUX_FLAG is equal to '1':

NUM_AUX: This 4-bit field indicates the number of auxiliary streams. Zero means no auxiliary streams are used.

AUX_CONFIG_RFU: This 8-bit field is reserved for future use.

AUX_STREAM_TYPE: This 4-bit is reserved for future use for indicating the type of the current auxiliary stream.

AUX_PRIVATE_CONFIG: This 28-bit field is reserved for future use for signaling auxiliary streams.

Figures 15, 16:
FIG. 15 illustrates PLS2 data according to another embodiment of the present invention.
FIG. 16 illustrates a logical structure of a frame according to an embodiment of the present invention.

FIG. 15 illustrates PLS2 data according to another embodiment of the present invention.

FIG. 15 illustrates PLS2-DYN data of the PLS2 data. The values of the PLS2-DYN data may change during the duration of one frame-group, while the size of fields remains constant.

The details of fields of the PLS2-DYN data are as follows:

FRAME_INDEX: This 5-bit field indicates the frame index of the current frame within the super-frame. The index of the first frame of the super-frame is set to '0'.

PLS_CHANGE_COUNTER: This 4-bit field indicates the number of super-frames ahead where the configuration will change. The next super-frame with changes in the configuration is indicated by the value signaled within this field. If this field is set to the value '0000', it means that no scheduled change is foreseen: e.g., value '1' indicates that there is a change in the next super-frame.

FIC_CHANGE_COUNTER: This 4-bit field indicates the number of super-frames ahead where the configuration (i.e., the contents of the FIC) will change. The next super-frame with changes in the configuration is indicated by the value signaled within this field. If this field is set to the value '0000', it means that no scheduled change is foreseen: e.g. value '0001' indicates that there is a change in the next super-frame.

RESERVED: This 16-bit field is reserved for future use.

The following fields appear in the loop over NUM_DP, which describe the parameters associated with the DP carried in the current frame.

DP_ID: This 6-bit field indicates uniquely the DP within a PHY profile.

DP_START: This 15-bit (or 13-bit) field indicates the start position of the first of the DPs using the DPU addressing scheme. The DP_START field has differing length according to the PHY profile and FFT size as shown in the below table 27.

TABLE 27

| PHY profile | DP_START field size | |
|---|---|---|
| | 64K | 16K |
| Base | 13 bit | 15 bit |
| Handheld | — | 13 bit |
| Advanced | 13 bit | 15 bit |

DP_NUM_BLOCK: This 10-bit field indicates the number of FEC blocks in the current TI group for the current DP. The value of DP_NUM_BLOCK ranges from 0 to 1023

RESERVED: This 8-bit field is reserved for future use.

The following fields indicate the FIC parameters associated with the EAC.

EAC_FLAG: This 1-bit field indicates the existence of the EAC in the current frame. This bit is the same value as the EAC_FLAG in the preamble.

EAS_WAKE_UP_VERSION_NUM: This 8-bit field indicates the version number of a wake-up indication.

If the EAC_FLAG field is equal to '1', the following 12 bits are allocated for EAC_LENGTH_BYTE field. If the EAC_FLAG field is equal to '0', the following 12 bits are allocated for EAC_COUNTER.

EAC_LENGTH_BYTE: This 12-bit field indicates the length, in byte, of the EAC.

EAC_COUNTER: This 12-bit field indicates the number of the frames before the frame where the EAC arrives.

The following field appears only if the AUX_FLAG field is equal to '1':

AUX_PRIVATE_DYN: This 48-bit field is reserved for future use for signaling auxiliary streams. The meaning of this field depends on the value of AUX_STREAM_TYPE in the configurable PLS2-STAT.

CRC_32: A 32-bit error detection code, which is applied to the entire PLS2.

FIG. 16 illustrates a logical structure of a frame according to an embodiment of the present invention.

As above mentioned, the PLS, EAC, FIC, DPs, auxiliary streams and dummy cells are mapped into the active carriers of the OFDM symbols in the frame. The PLS1 and PLS2 are first mapped into one or more FSS(s). After that, EAC cells, if any, are mapped immediately following the PLS field, followed next by FIC cells, if any. The DPs are mapped next after the PLS or EAC, FIC, if any. Type 1 DPs follows first, and Type 2 DPs next. The details of a type of the DP will be described later. In some case, DPs may carry some special data for EAS or service signaling data. The auxiliary stream or streams, if any, follow the DPs, which in turn are followed by dummy cells. Mapping them all together in the above mentioned order, i.e. PLS, EAC, FIC, DPs, auxiliary streams and dummy data cells exactly fill the cell capacity in the frame.

Figure 17:
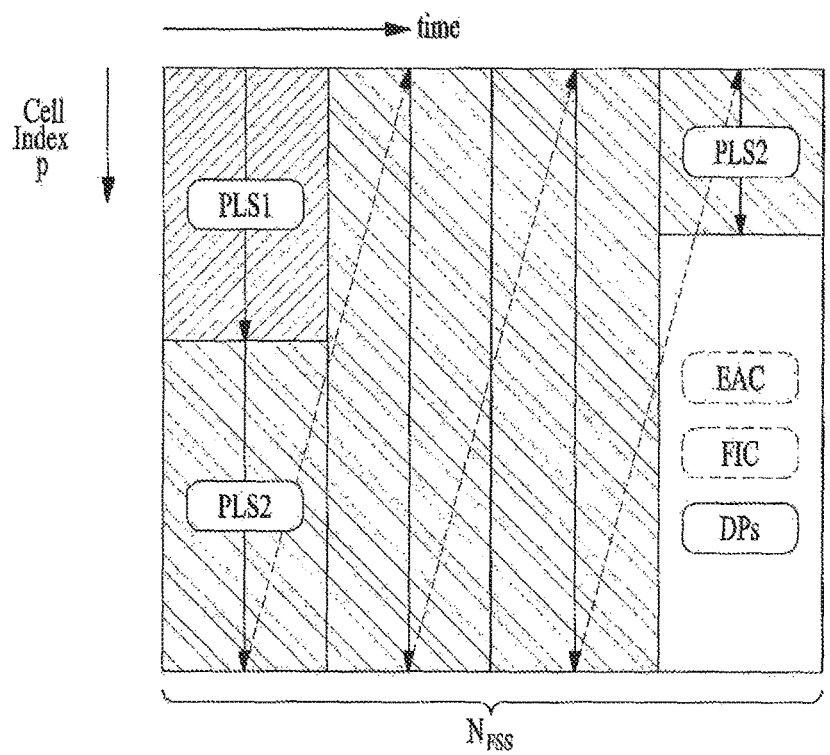
FIG. 17 illustrates PLS mapping according to an embodiment of the present invention.

FIG. 17 illustrates PLS mapping according to an embodiment of the present invention.

PLS cells are mapped to the active carriers of FSS(s). Depending on the number of cells occupied by PLS, one or more symbols are designated as FSS(s), and the number of FSS(s) NFSS is signaled by NUM_FSS in PLS1. The FSS is a special symbol for carrying PLS cells. Since robustness and latency are critical issues in the PLS, the FSS(s) has higher density of pilots allowing fast synchronization and frequency-only interpolation within the FSS.

PLS cells are mapped to active carriers of the NFSS FSS(s) in a top-down manner as shown in an example in FIG. 17. The PLS1 cells are mapped first from the first cell of the first FSS in an increasing order of the cell index. The PLS2 cells follow immediately after the last cell of the PLS1 and mapping continues downward until the last cell index of the first FSS. If the total number of required PLS cells exceeds the number of active carriers of one FSS, mapping proceeds to the next FSS and continues in exactly the same manner as the first FSS.

After PLS mapping is completed, DPs are carried next. If EAC, FIC or both are present in the current frame, they are placed between PLS and "normal" DPs.

Figure 18:
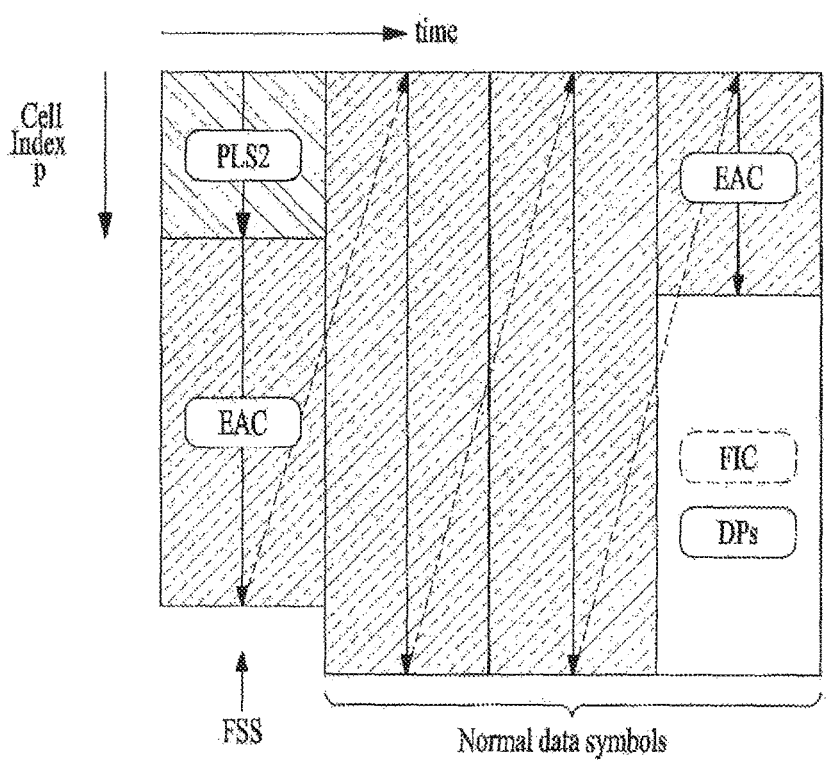
FIG. 18 illustrates EAC mapping according to an embodiment of the present invention.

FIG. 18 illustrates EAC mapping according to an embodiment of the present invention.

EAC is a dedicated channel for carrying EAS messages and links to the DPs for EAS. EAS support is provided but EAC itself may or may not be present in every frame. EAC, if any, is mapped immediately after the PLS2 cells. EAC is not preceded by any of the FIC, DPs, auxiliary streams or dummy cells other than the PLS cells. The procedure of mapping the EAC cells is exactly the same as that of the PLS.

The EAC cells are mapped from the next cell of the PLS2 in increasing order of the cell index as shown in the example in FIG. 18. Depending on the EAS message size, EAC cells may occupy a few symbols, as shown in FIG. 18.

EAC cells follow immediately after the last cell of the PLS2, and mapping continues downward until the last cell index of the last FSS. If the total number of required EAC cells exceeds the number of remaining active carriers of the last FSS mapping proceeds to the next symbol and continues in exactly the same manner as FSS(s). The next symbol for mapping in this case is the normal data symbol, which has more active carriers than a FSS.

After EAC mapping is completed, the FIC is carried next, if any exists. If FIC is not transmitted (as signaled in the PLS2 field), DPs follow immediately after the last cell of the EAC.

Figure 19A:
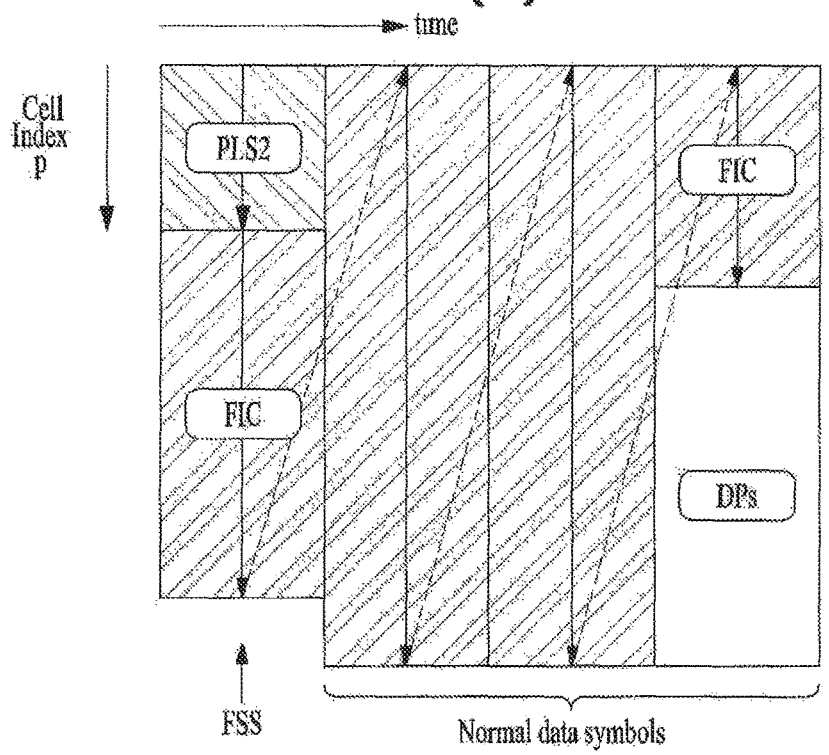
FIG. 19(a) and FIG. 19(b) illustrate FIC mapping according to an embodiment of the present invention.
Figure 19B:
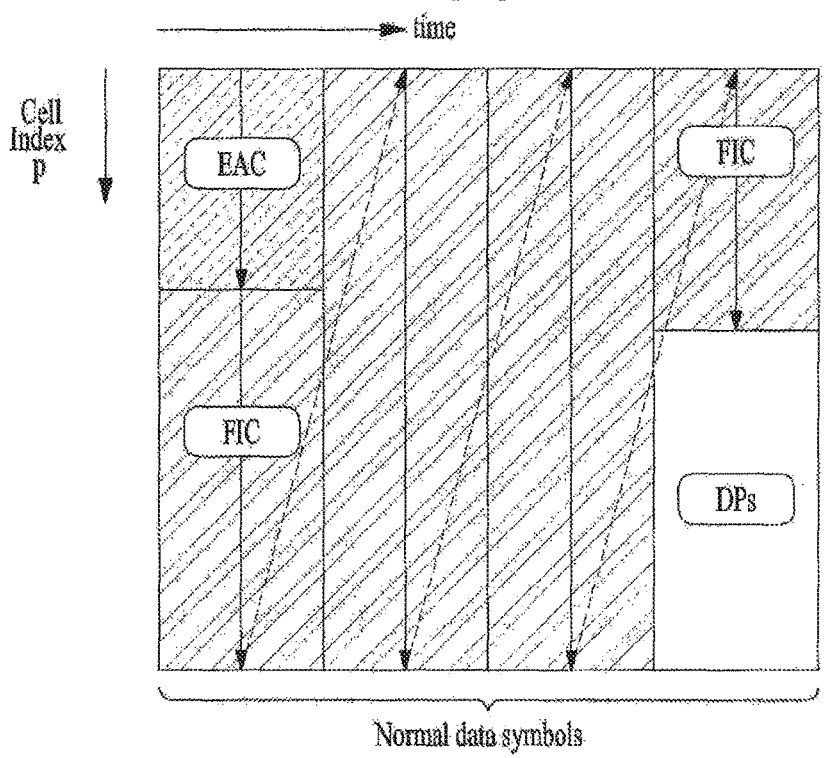

FIG. 19 illustrates FIC mapping according to an embodiment of the present invention.

shows an example mapping of FIC cell without EAC and (b) shows an example mapping of FIC cell with EAC.

FIC is a dedicated channel for carrying cross-layer information to enable fast service acquisition and channel scanning. This information primarily includes channel binding information between DPs and the services of each broadcaster. For fast scan, a receiver can decode FIC and obtain information such as broadcaster ID, number of services, and BASE_DP_ID. For fast service acquisition, in addition to FIC, base DP can be decoded using BASE_DP_ID. Other than the content it carries, a base DP is encoded and mapped to a frame in exactly the same way as a normal DP. Therefore, no additional description is required for a base DP. The FIC data is generated and consumed in the Management Layer. The content of FIC data is as described in the Management Layer specification.

The FIC data is optional and the use of FIC is signaled by the FIC_FLAG parameter in the static part of the PLS2. If FIC is used, FIC_FLAG is set to '1' and the signaling field for FIC is defined in the static part of PLS2. Signaled in this field are FIC_VERSION, and FIC_LENGTH_BYTE. FIC uses the same modulation, coding and time interleaving parameters as PLS2. FIC shares the same signaling parameters such as PLS2_MOD and PLS2_FEC. FIC data, if any, is mapped immediately after PLS2 or EAC if any. FIC is not preceded by any normal DPs, auxiliary streams or dummy cells. The method of mapping FIC cells is exactly the same as that of EAC which is again the same as PLS.

Without EAC after PLS, FIC cells are mapped from the next cell of the PLS2 in an increasing order of the cell index as shown in an example in (a). Depending on the FIC data size, FIC cells may be mapped over a few symbols, as shown in (b).

FIC cells follow immediately after the last cell of the PLS2, and mapping continues downward until the last cell index of the last FSS. If the total number of required FIC cells exceeds the number of remaining active carriers of the last FSS, mapping proceeds to the next symbol and continues in exactly the same manner as FSS(s). The next symbol for mapping in this case is the normal data symbol which has more active carriers than a FSS.

If EAS messages are transmitted in the current frame, EAC precedes FIC, and FIC cells are mapped from the next cell of the EAC in an increasing order of the cell index as shown in (b).

After FIC mapping is completed, one or more DPs are mapped, followed by auxiliary streams, if any, and dummy cells.

Figure 20A:
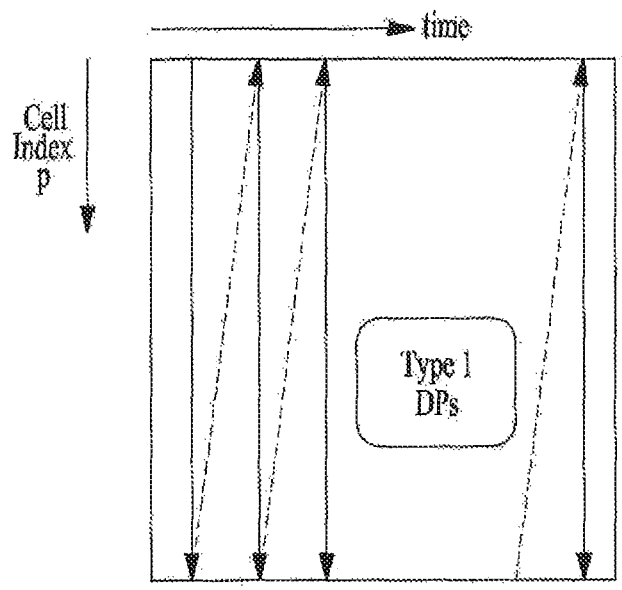
FIG. 20(a) and FIG. 20(b) illustrate a type of DP according to an embodiment of the present invention.
Figure 20B:
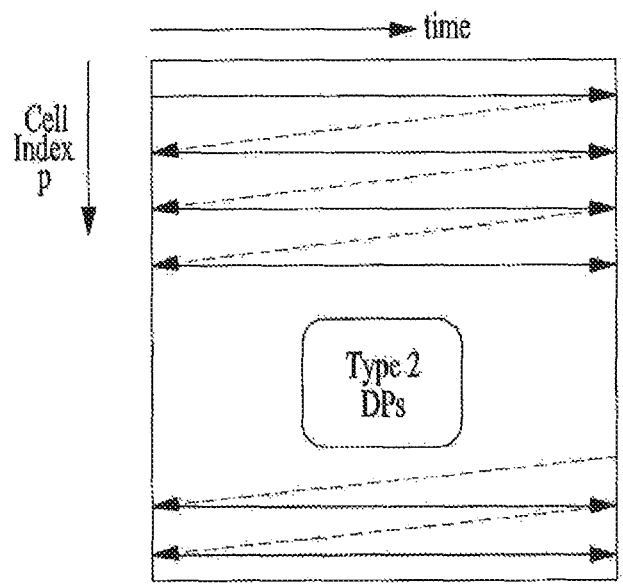

FIG. 20 illustrates a type of DP according to an embodiment of the present invention.

shows type 1 DP and (b) shows type 2 DP.

After the preceding channels, i.e., PLS, EAC and FIC, are mapped, cells of the DPs are mapped. A DP is categorized into one of two types according to mapping method:

Type 1 DP: DP is mapped by TDM
Type 2 DP: DP is mapped by FDM

The type of DP is indicated by DP_TYPE field in the static part of PLS2. FIG. 20 illustrates the mapping orders of Type 1 DPs and Type 2 DPs. Type 1 DPs are first mapped in the increasing order of cell index, and then after reaching the last cell index, the symbol index is increased by one. Within the next symbol, the DP continues to be mapped in the increasing order of cell index starting from p=0. With a number of DPs mapped together in one frame, each of the Type 1 DPs are grouped in time, similar to TDM multiplexing of DPs.

Type 2 DPs are first mapped in the increasing order of symbol index, and then after reaching the last OFDM symbol of the frame, the cell index increases by one and the symbol index rolls back to the first available symbol and then increases from that symbol index. After mapping a number of DPs together in one frame, each of the Type 2 DPs are grouped in frequency together, similar to FDM multiplexing of DPs.

Type 1 DPs and Type 2 DPs can coexist in a frame if needed with one restriction; Type 1 DPs always precede Type 2 DPs. The total number of OFDM cells carrying Type 1 and Type 2 DPs cannot exceed the total number of OFDM cells available for transmission of DPs:

$$D_{DP1}+D_{DP2} \leq D_{DP}$$ [Expression 2]

where DDP1 is the number of OFDM cells occupied by Type 1 DPs, DDP2 is the number of cells occupied by Type 2 DPs. Since PLS, EAC, FIC are all mapped in the same way as Type 1 DP, they all follow "Type 1 mapping rule". Hence, overall, Type 1 mapping always precedes Type 2 mapping.

Figure 21A:
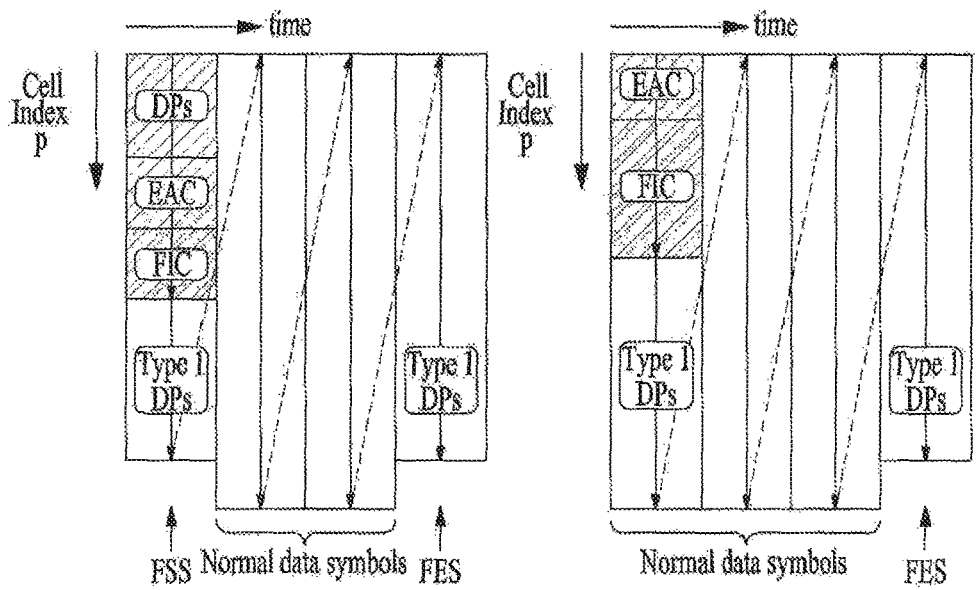
FIG. 21(a) and FIG. 21(b) illustrate DP mapping according to an embodiment of the present invention.
Figure 21B:
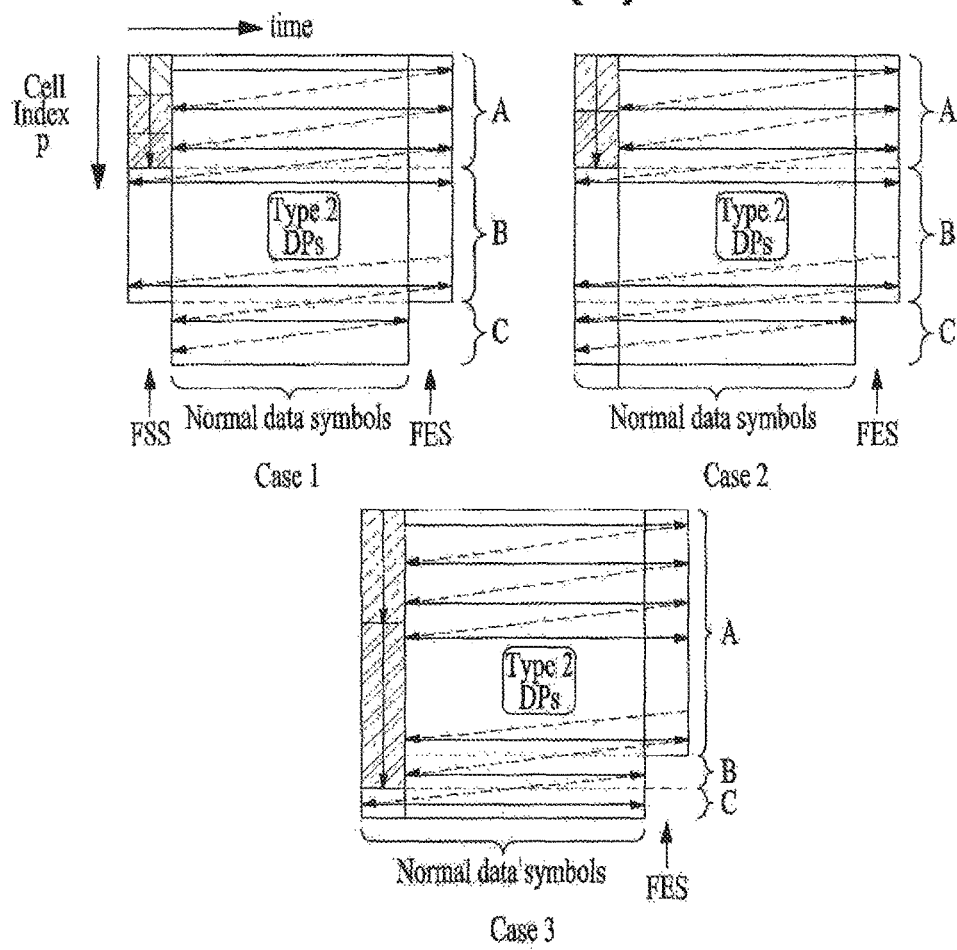

FIG. 21 illustrates DP mapping according to an embodiment of the present invention.

shows an addressing of OFDM cells for mapping type 1 DPs and (b) shows an an addressing of OFDM cells for mapping for type 2 DPs.

Addressing of OFDM cells for mapping Type 1 DPs (0, . . . , DDP1-1) is defined for the active data cells of Type 1 DPs. The addressing scheme defines the order in which the cells from the TIs for each of the Type 1 DPs are allocated to the active data cells. It is also used to signal the locations of the DPs in the dynamic part of the PLS2.

Without EAC and FIC, address 0 refers to the cell immediately following the last cell carrying PLS in the last FSS. If EAC is transmitted and FIC is not in the corresponding frame, address 0 refers to the cell immediately following the last cell carrying EAC. If FIC is transmitted in the corresponding frame, address 0 refers to the cell immediately following the last cell carrying FIC. Address 0 for Type 1 DPs can be calculated considering two different cases as shown in (a). In the example in (a), PLS, EAC and FIC are assumed to be all transmitted. Extension to the cases where either or both of EAC and FIC are omitted is straightforward. If there are remaining cells in the FSS after mapping all the cells up to FIC as shown on the left side of (a).

Addressing of OFDM cells for mapping Type 2 DPs (0, . . . , DDP2-1) is defined for the active data cells of Type 2 DPs. The addressing scheme defines the order in which the cells from the TIs for each of the Type 2 DPs are allocated to the active data cells. It is also used to signal the locations of the DPs in the dynamic part of the PLS2.

Three slightly different cases are possible as shown in (b). For the first case shown on the left side of (b), cells in the last FSS are available for Type 2 DP mapping. For the second case shown in the middle, FIC occupies cells of a normal symbol, but the number of FIC cells on that symbol is not larger than CFSS. The third case, shown on the right side in (b), is the same as the second case except that the number of FIC cells mapped on that symbol exceeds CFSS.

The extension to the case where Type 1 DP(s) precede Type 2 DP(s) is straightforward since PLS, EAC and FIC follow the same "Type 1 mapping rule" as the Type 1 DP(s).

A data pipe unit (DPU) is a basic unit for allocating data cells to a DP in a frame.

A DPU is defined as a signaling unit for locating DPs in a frame. A Cell Mapper 7010 may map the cells produced by the TIs for each of the DPs. A Time interleaver 5050 outputs a series of TI-blocks and each TI-block comprises a variable number of XFECBLOCKs which is in turn composed of a set of cells. The number of cells in an XFECBLOCK, Ncells, is dependent on the FECBLOCK size, Nldpc, and the number of transmitted bits per constellation symbol. A DPU is defined as the greatest common divisor of all possible values of the number of cells in a XFECBLOCK, Ncells, supported in a given PHY profile. The length of a DPU in cells is defined as LDPU. Since each PHY profile supports different combinations of FECBLOCK size and a different number of bits per constellation symbol, LDPU is defined on a PHY profile basis.

Figure 22:
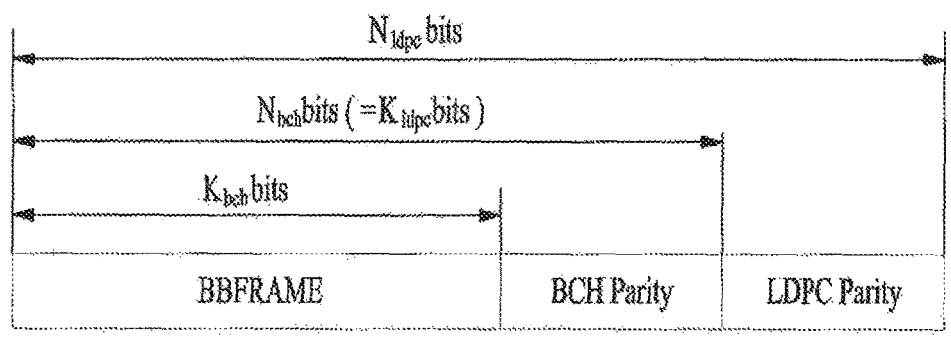
FIG. 22 illustrates an FEC structure according to an embodiment of the present invention.

FIG. 22 illustrates an FEC structure according to an embodiment of the present invention.

FIG. 22 illustrates an FEC structure according to an embodiment of the present invention before bit interleaving. As above mentioned, Data FEC encoder may perform the FEC encoding on the input BBF to generate FECBLOCK procedure using outer coding (BCH), and inner coding (LDPC). The illustrated FEC structure corresponds to the FECBLOCK. Also, the FECBLOCK and the FEC structure have same value corresponding to a length of LDPC codeword.

The BCH encoding is applied to each BBF (Kbch bits), and then LDPC encoding is applied to BCH-encoded BBF (Kldpc bits=Nbch bits) as illustrated in FIG. 22.

The value of Nldpc is either 64800 bits (long FECBLOCK) or 16200 bits (short FECBLOCK).

The below table 28 and table 29 show FEC encoding parameters for a long FECBLOCK and a short FECBLOCK, respectively.

TABLE 28

| LDPC Rate | $N_{ldpc}$ | $K_{ldpc}$ | $K_{bch}$ | BCH error correction capability | $N_{bch}$-$K_{bch}$ |
|---|---|---|---|---|---|
| 5/15 | 64800 | 21600 | 21408 | 12 | 192 |
| 6/15 | | 25920 | 25728 | | |
| 7/15 | | 30240 | 30048 | | |
| 8/15 | | 34560 | 34368 | | |
| 9/15 | | 38880 | 38688 | | |
| 10/15 | | 43200 | 43008 | | |
| 11/15 | | 47520 | 47328 | | |
| 12/15 | | 51840 | 51648 | | |
| 13/15 | | 56160 | 55968 | | |

TABLE 29

| LDPC Rate | $N_{ldpc}$ | $K_{ldpc}$ | $K_{bch}$ | BCH error correction capability | $N_{bch}$-$K_{bch}$ |
|---|---|---|---|---|---|
| 5/15 | 16200 | 5400 | 5232 | 12 | 168 |
| 6/15 | | 6480 | 6312 | | |
| 7/15 | | 7560 | 7392 | | |
| 8/15 | | 8640 | 8472 | | |
| 9/15 | | 9720 | 9552 | | |
| 10/15 | | 10800 | 10632 | | |

TABLE 29-continued

| LDPC Rate | $N_{ldpc}$ | $K_{ldpc}$ | $K_{bch}$ | BCH error correction capability | $N_{bch}$-$K_{bch}$ |
|---|---|---|---|---|---|
| 11/15 | | 11880 | 11712 | | |
| 12/15 | | 12960 | 12792 | | |
| 13/15 | | 14040 | 13872 | | |

The details of operations of the BCH encoding and LDPC encoding are as follows:

A 12-error correcting BCH code is used for outer encoding of the BBF. The BCH generator polynomial for short FECBLOCK and long FECBLOCK are obtained by multiplying together all polynomials.

LDPC code is used to encode the output of the outer BCH encoding. To generate a completed Bldpc (FECBLOCK), Pldpc (parity bits) is encoded systematically from each Ildpc (BCH-encoded BBF), and appended to Ildpc. The completed Bldpc (FECBLOCK) are expressed as follow expression.

$$B_{ldpc}=[I_{ldpc}\ P_{ldpc}]=[i_0,i_1,\ldots,i_{K_{ldpc}-1},p_0,p_1,\ldots,p_{N_{ldpc}-K_{ldpc}-1}] \qquad \text{[expression 3]}$$

The parameters for long FECBLOCK and short FECBLOCK are given in the above table 28 and 29, respectively.

The detailed procedure to calculate Nldpc−Kldpc parity bits for long FECBLOCK, is as follows:

1) Initialize the parity bits, $$p_0=p_1=p_2=\ldots=p_{N_{ldpc}-K_{ldpc}-1}=0 \qquad \text{[expression 4]}$$

2) Accumulate the first information bit−i0, at parity bit addresses specified in the first row of an addresses of parity check matrix. The details of addresses of parity check matrix will be described later. For example, for rate 13/15:

$$p_{983}=p_{983}\oplus i_0\ p_{2815}=p_{2815}\oplus i_0$$

$$p_{4837}=p_{4837}\oplus i_0\ p_{4989}=p_{4989}\oplus i_0$$

$$p_{6138}=p_{6138}\oplus i_0\ p_{6458}=p_{6458}\oplus i_0$$

$$p_{6921}=p_{6921}\oplus i_0\ p_{6974}=p_{6974}\oplus i_0$$

$$p_{7572}=p_{7572}\oplus i_0\ p_{8260}=p_{8260}\oplus i_0$$

$$p_{8496}=p_{8496}\oplus i_0 \qquad \text{[expression 5]}$$

3) For the next 359 information bits, is, s=1, 2, . . . , 359 accumulate is at parity bit addresses using following expression.

$$\{x+(s\ \text{mod}\ 360)\times Q_{ldpc}\}\ \text{mod}(N_{ldpc}-K_{ldpc}) \qquad \text{[expression 6]}$$

where x denotes the address of the parity bit accumulator corresponding to the first bit i0, and Qldpc is a code rate dependent constant specified in the addresses of parity check matrix. Continuing with the example, Qldpc=24 for rate 13/15, so for information bit i1, the following operations are performed:

$$p_{1007}=p_{1007}\oplus i_1\ p_{2839}=p_{2839}\oplus i_1$$

$$p_{4861}=p_{4861}\oplus i_1\ p_{5013}=p_{5013}\oplus i_1$$

$$p_{6162}=p_{6162}\oplus i_1\ p_{6482}=p_{6482}\oplus i_1$$

$$p_{6945}=p_{6945}\oplus i_1\ p_{6998}=p_{6998}\oplus i_1$$

$$p_{7596}=p_{7596}\oplus i_1\ p_{8284}=p_{8284}\oplus i_1$$

$$p_{8520}=p_{8520}\oplus i_1 \qquad \text{[expression 7]}$$

4) For the 361st information bit i360, the addresses of the parity bit accumulators are given in the second row of the addresses of parity check matrix. In a similar manner the addresses of the parity bit accumulators for the following 359 information bits is, s=361, 362, . . . , 719 are obtained using the expression 6, where x denotes the address of the parity bit accumulator corresponding to the information bit i360, i.e., the entries in the second row of the addresses of parity check matrix.

5) In a similar manner, for every group of 360 new information bits, a new row from addresses of parity check matrixes used to find the addresses of the parity bit accumulators.

After all of the information bits are exhausted, the final parity bits are obtained as follows:

6) Sequentially perform the following operations starting with i=1

$$p_i = p_i \oplus p_{i-1}, i=1,2, \ldots, N_{ldpc} - K_{ldpc} - 1 \quad \text{[Math figure 8]}$$

where final content of pi, i=0, 1, . . . Nldpc−Kldpc−1 is equal to the parity bit pi.

TABLE 30

| Code Rate | $Q_{ldpc}$ |
|---|---|
| 5/15 | 120 |
| 6/15 | 108 |
| 7/15 | 96 |
| 8/15 | 84 |
| 9/15 | 72 |
| 10/15 | 60 |
| 11/15 | 48 |
| 12/15 | 36 |
| 13/15 | 24 |

This LDPC encoding procedure for a short FECBLOCK is in accordance with t LDPC encoding procedure for the long FECBLOCK, except replacing the table 30 with table 31, and replacing the addresses of parity check matrix for the long FECBLOCK with the addresses of parity check matrix for the short FECBLOCK.

TABLE 31

| Code Rate | $Q_{ldpc}$ |
|---|---|
| 5/15 | 30 |
| 6/15 | 27 |
| 7/15 | 24 |
| 8/15 | 21 |
| 9/15 | 18 |
| 10/15 | 15 |
| 11/15 | 12 |
| 12/15 | 9 |
| 13/15 | 6 |

Figure 23:
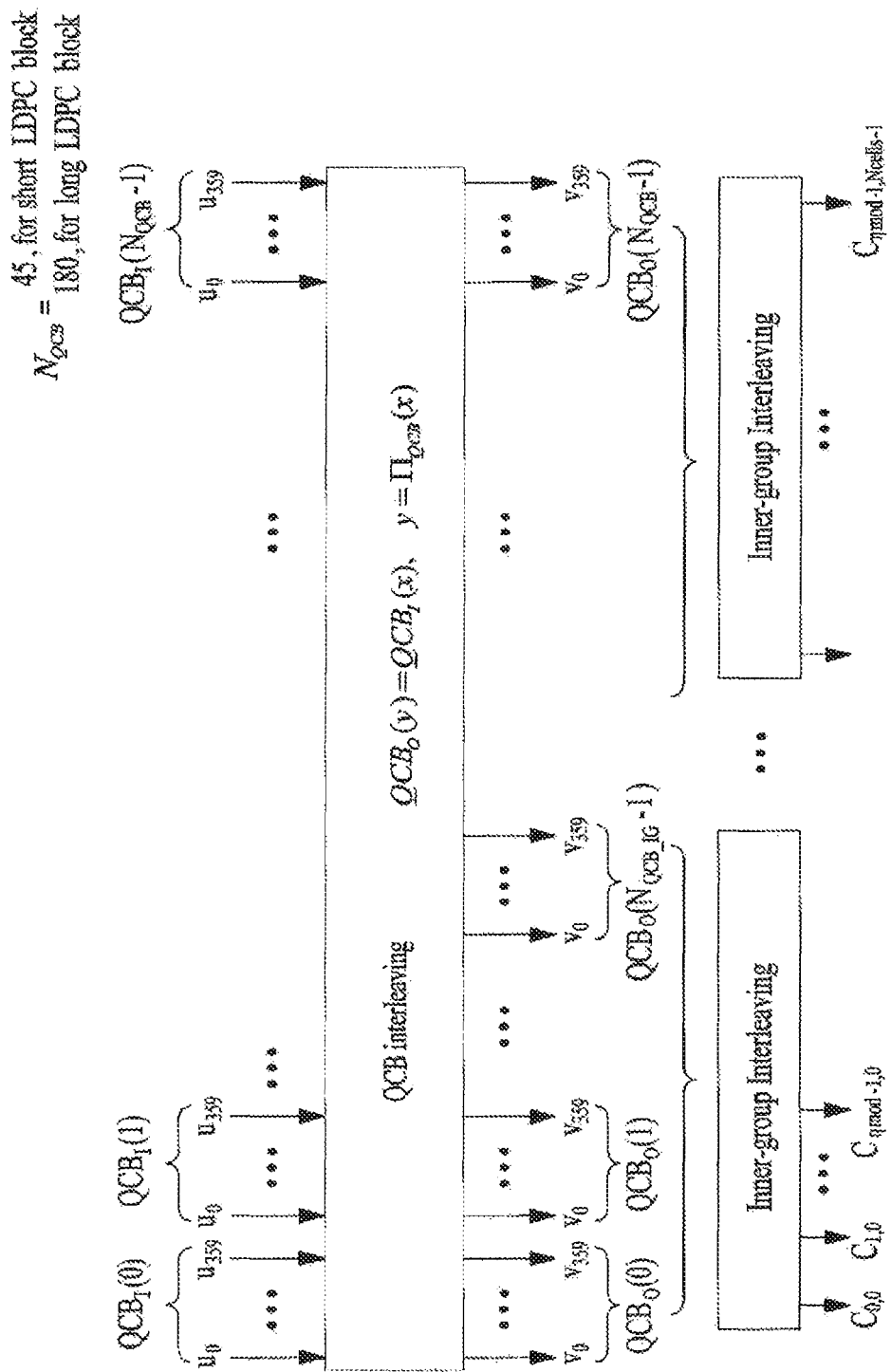
FIG. 23 illustrates a bit interleaving according to an embodiment of the present invention.

FIG. 23 illustrates a bit interleaving according to an embodiment of the present invention.

The outputs of the LDPC encoder are bit-interleaved, which consists of parity interleaving followed by Quasi-Cyclic Block (QCB) interleaving and inner-group interleaving.

shows Quasi-Cyclic Block (QCB) interleaving and (b) shows inner-group interleaving.

The FECBLOCK may be parity interleaved. At the output of the parity interleaving, the LDPC codeword consists of 180 adjacent QC blocks in a long FECBLOCK and 45 adjacent QC blocks in a short FECBLOCK. Each QC block in either a long or short FECBLOCK consists of 360 bits. The parity interleaved LDPC codeword is interleaved by QCB interleaving. The unit of QCB interleaving is a QC block. The QC blocks at the output of parity interleaving are permutated by QCB interleaving as illustrated in FIG. 23, where Ncells=64800/η mod or 16200/η mod according to the FECBLOCK length. The QCB interleaving pattern is unique to each combination of modulation type and LDPC code rate.

After QCB interleaving, inner-group interleaving is performed according to modulation type and order (η mod) which is defined in the below table 32. The number of QC blocks for one inner-group, NQCB_IG, is also defined.

TABLE 32

| Modulation type | $\eta_{mod}$ | $N_{QCB\_IG}$ |
|---|---|---|
| QAM-16 | 4 | 2 |
| NUC-16 | 4 | 4 |
| NUQ-64 | 6 | 3 |
| NUC-64 | 6 | 6 |
| NUQ-256 | 8 | 4 |
| NUC-256 | 8 | 8 |
| NUQ-1024 | 10 | 5 |
| NUC-1024 | 10 | 10 |

The inner-group interleaving process is performed with NQCB_IG QC blocks of the QCB interleaving output. Inner-group interleaving has a process of writing and reading the bits of the inner-group using 360 columns and NQCB_IG rows. In the write operation, the bits from the QCB interleaving output are written row-wise. The read operation is performed column-wise to read out m bits from each row, where m is equal to 1 for NUC and 2 for NUQ.

FIG. 24 illustrates a cell-word demultiplexing according to an embodiment of the present invention.

FIG. 24 shows a cell-word demultiplexing for 8 and 12 bpcu MIMO and (b) shows a cell-word demultiplexing for 10 bpcu MIMO.

Each cell word (c0,1, c1,1, . . . , cη mod-1,1) of the bit interleaving output is demultiplexed into (d1,0,m, d1,1,m . . . , d1,η mod-1,m) and (d2,0,m, d2,1,m . . . , d2,η mod-1,m) as shown in (a), which describes the cell-word demultiplexing process for one XFECBLOCK.

For the 10 bpcu MIMO case using different types of NUQ for MIMO encoding, the Bit Interleaver for NUQ-1024 is re-used. Each cell word (c0,1, c1,1, . . . c9,1) of the Bit Interleaver output is demultiplexed into (d1,0,m, d1,1, m . . . , d1,3,m) and (d2,0,m, d2,1,m . . . , d2,5,m), as shown in (b).

Figure 25A:
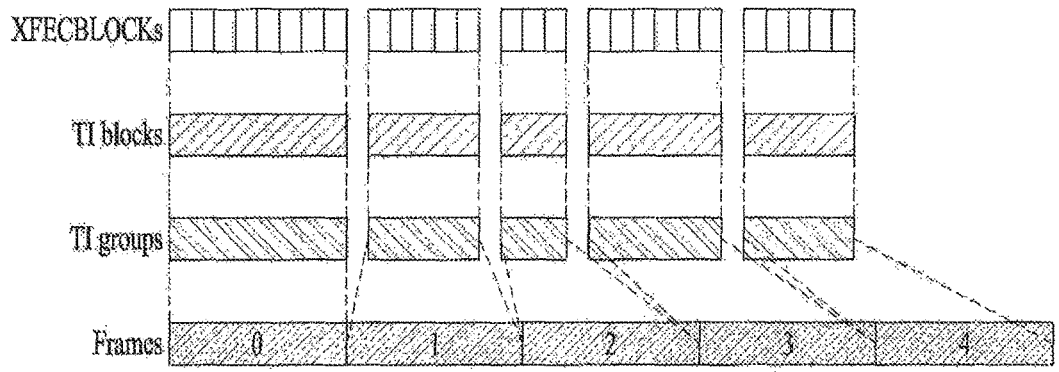
FIG. 25(a), FIG. 25(b) and FIG. 25(c) illustrate a time interleaving according to an embodiment of the present invention.
Figure 25B:
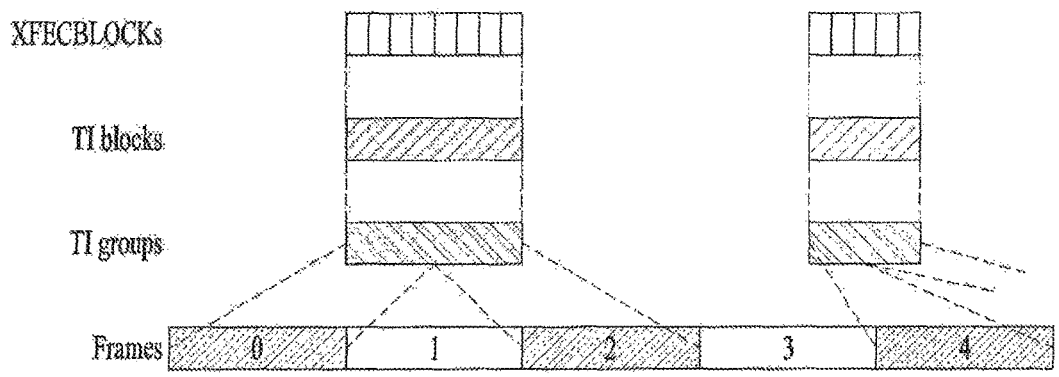
Figure 25C:
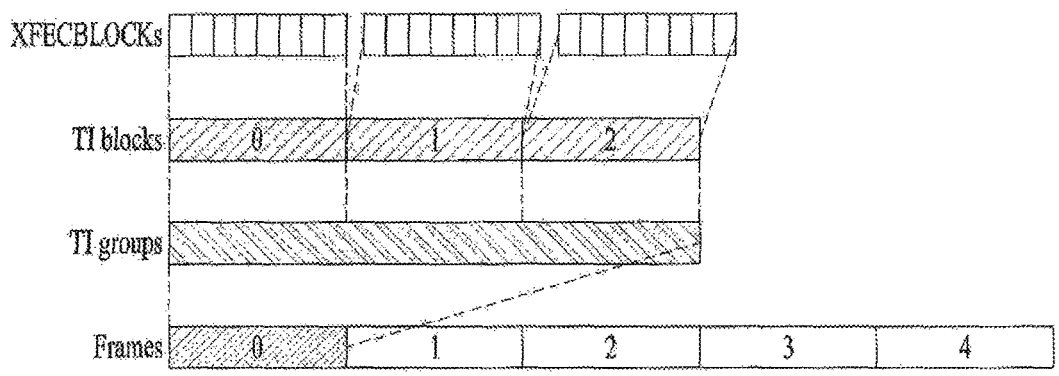

FIG. 25 illustrates a time interleaving according to an embodiment of the present invention.

to (c) show examples of TI mode.

The time interleaver operates at the DP level. The parameters of time interleaving (TI) may be set differently for each DP.

The following parameters, which appear in part of the PLS2-STAT data, configure the TI:

DP_TI_TYPE (allowed values: 0 or 1): Represents the TI mode; '0' indicates the mode with multiple TI blocks (more than one TI block) per TI group. In this case, one TI group is directly mapped to one frame (no inter-frame interleaving). '1' indicates the mode with only one TI block per TI group. In this case, the TI block may be spread over more than one frame (inter-frame interleaving).

DP_TI_LENGTH: If DP_TI_TYPE='0', this parameter is the number of TI blocks NTI per TI group. For DP_TI_TYPE='1', this parameter is the number of frames PI spread from one TI group.

DP_NUM_BLOCK_MAX (allowed values: 0 to 1023): Represents the maximum number of XFECBLOCKs per TI group.

DP_FRAME_INTERVAL (allowed values: 1, 2, 4, 8): Represents the number of the frames DUMP between two successive frames carrying the same DP of a given PHY profile.

DP_TI_BYPASS (allowed values: 0 or 1): If time interleaving is not used for a DP, this parameter is set to '1'. It is set to '0' if time interleaving is used.

Additionally, the parameter DP_NUM_BLOCK from the PLS2-DYN data is used to represent the number of XFECBLOCKs carried by one TI group of the DP.

When time interleaving is not used for a DP, the following TI group, time interleaving operation, and TI mode are not considered. However, the Delay Compensation block for the dynamic configuration information from the scheduler will still be required. In each DP, the XFECBLOCKs received from the SSD/MIMO encoding are grouped into TI groups. That is, each TI group is a set of an integer number of XFECBLOCKs and will contain a dynamically variable number of XFECBLOCKs. The number of XFECBLOCKs in the TI group of index n is denoted by NxBLOCK_Group (n) and is signaled as DP_NUM_BLOCK in the PLS2-DYN data. Note that NxBLOCK_Group(n) may vary from the minimum value of 0 to the maximum value NxBLOCK_Group_MAX (corresponding to DP_NUM_BLOCK_MAX) of which the largest value is 1023.

Each TI group is either mapped directly onto one frame or spread over PI frames. Each TI group is also divided into more than one TI blocks(NTI), where each TI block corresponds to one usage of time interleaver memory. The TI blocks within the TI group may contain slightly different numbers of XFECBLOCKs. If the TI group is divided into multiple TI blocks, it is directly mapped to only one frame. There are three options for time interleaving (except the extra option of skipping the time interleaving) as shown in the below table 33.

TABLE 33

| Modes | Descriptions |
|---|---|
| Option-1 | Each TI group contains one TI block and is mapped directly to one frame as shown in (a). This option is signaled in the PLS2-STAT by DP_TI_TYPE = '0' and DP_TI_LENGTH = '1' ($N_{TI}$ = 1). |
| Option-2 | Each TI group contains one TI block and is mapped to more than one frame. (b) shows an example, where one TI group is mapped to two frames, i.e., DP_TI_LENGTH = '2' ($P_I$ = 2) and DP_FRAME_INTERVAL ($I_{JUMP}$ = 2). This provides greater time diversity for low data-rate services. This option is signaled in the PLS2-STAT by DP_TI_TYPE = '1'. |
| Option-3 | Each TI group is divided into multiple TI blocks and is mapped directly to one frame as shown in (c). Each TI block may use full TI memory, so as to provide the maximum bit-rate for a DR This option is signaled in the PLS2-STAT signaling by DP_TI_TYPE = '0' and DP_TI_LENGTH = $N_{TI}$, while $P_I$ = 1. |

In each DP, the TI memory stores the input XFECBLOCKs (output XFECBLOCKs from the SSD/MIMO encoding block). Assume that input XFECBLOCKs are defined as $(d_{n,s,0,0}d_{n,s,0,1}, \ldots, d_{n,s,0,N_{cells}-1}, d_{n,s,1,0}, \ldots,$
$d_{n,s,1,N_{cells}-1}, \ldots, d_{n,s,N_{xBLOCK\_TI}(n,s)-1,0}, \ldots,$
$d_{n,s,N_{xBLOCK\_TI}(n,s)-1,N_{cells}-1})$, where $d_{n,s,r,q}$ is the qth cell of the rth XFECBLOCK in the sth TI block of the nth TI group and represents the outputs of SSD and MIMO encodings as follows $$d_{n,s,r,q} = \begin{cases} f_{n,s,r,q}, & \text{the output of } SSD \ldots \text{ encoding} \\ g_{n,s,r,q}, & \text{the output of } MIMO \text{ encoding} \end{cases}.$$

In addition, assume that output XFECBLOCKs from the time interleaver 5050 are defined as $(h_{n,s,0}, h_{n,s,1}, \ldots, h_{n,s,i}, \ldots, h_{n,s,N_{xBLOCK\_TI}(n,s) \times N_{cells}-1})$, where $h_{n,s,i}$ is the ith output cell (for i=0, ..., $N_{xBLOCK\_TI}(n,s) \times N_{cells}-1$) in the sth TI block of the nth TI group.

Typically, the time interleaver will also act as a buffer for DP data prior to the process of frame building. This is achieved by means of two memory banks for each DP. The first TI-block is written to the first bank. The second TI-block is written to the second bank while the first bank is being read from and so on.

The TI is a twisted row-column block interleaver. For the sth TI block of the nth TI group, the number of rows $N_r$ of a TI memory is equal to the number of cells $N_{cells}$, i.e., $N_r = N_{cells}$ while the number of columns $N_c$ is equal to the number $N_{xBLOCK\_TI}(n,s)$ FIG. 26 illustrates the basic operation of a twisted row-column block interleaver according to an embodiment of the present invention.

Figure 26A:
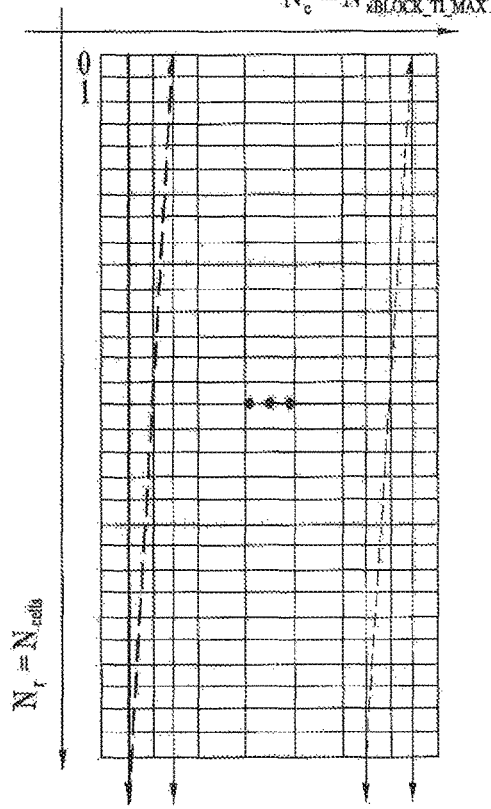
FIG. 26(a) and FIG. 26(b) illustrate the basic operation of a twisted row-column block interleaver according to an embodiment of the present invention.
Figure 26B:
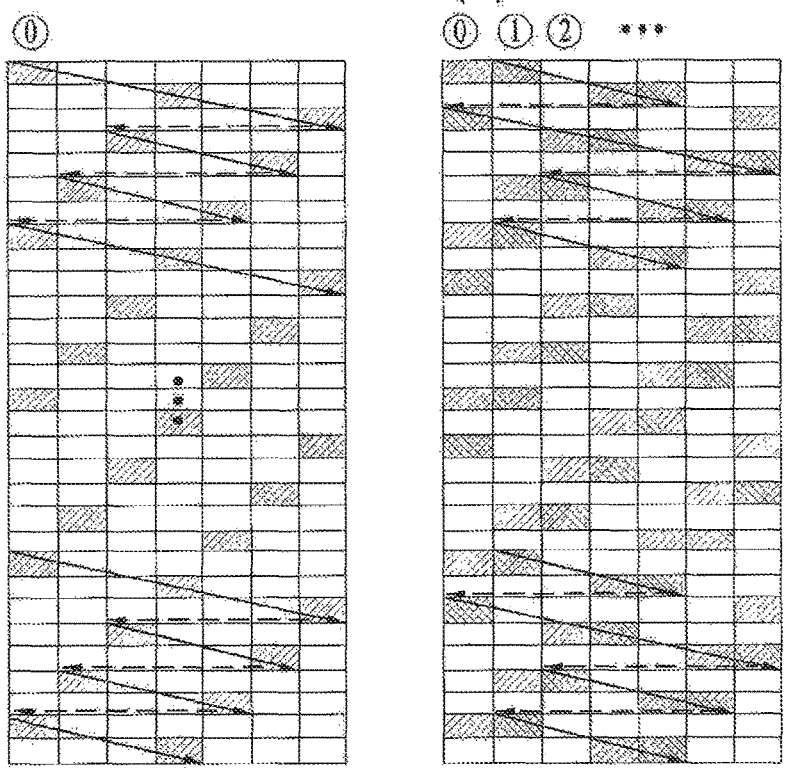

FIG. 26 (a) shows a writing operation in the time interleaver and FIG. 26(b) shows a reading operation in the time interleaver The first XFECBLOCK is written column-wise into the first column of the TI memory, and the second XFECBLOCK is written into the next column, and so on as shown in (a). Then, in the interleaving array, cells are read out diagonal-wise. During diagonal-wise reading from the first row (rightwards along the row beginning with the left-most column) to the last row, $N_r$ cells are read out as shown in (b). In detail, assuming $z_{n,s,i}$(i=0, ..., $N_rN_c$) as the TI memory cell position to be read sequentially, the reading process in such an interleaving array is performed by calculating the row index $R_{n,s,i}$, the column index $C_{n,s,i}$, and the associated twisting parameter $T_{n,s,i}$ as follows expression.

$$\text{GENERATE}(R_{n,s,i}, C_{n,s,i}) = \qquad \text{[expression 9]}$$
$$\{$$
$$R_{n,s,i} = \mod(i, N_r),$$
$$T_{n,s,i} = \mod(S_{shift} \times R_{n,s,i}, N_c),$$
$$C_{n,s,i} = \mod\left(T_{n,s,i} + \left\lfloor \frac{i}{N_r} \right\rfloor, N_c\right)$$
$$\}$$

where $S_{shift}$ is a common shift value for the diagonal-wise reading process regardless of $N_{xBLOCK\_TI}(n,s)$ and it is determined by $N_{xBLOCK\_TI\_MAX}$ given in the PLS2-STAT as follows expression.

[expression 10]

for
$$\begin{cases} N'_{xBLOCK\_TI\_MAX} = N_{xBLOC\_TI\_MAX} + 1, & \text{if } N_{xBLOCK\_TI\_MAX} \mod 2 = 0 \\ N'_{xBLOCK\_TI\_MAX} = N_{xBLOCK\_TI\_MAX}, & \text{if } N_{xBLOCK\_TI\_MAX} \mod 2 = 1 \end{cases},$$

$$S_{shift} = \frac{N'_{xBLOCK\_TI\_MAX} - 1}{2}$$

As a result, the cell positions to be read are calculated by a coordinate as $z_{n,s,i} = N_r C_{n,s,i} + R_{n,s,i}$.

Figure 27:
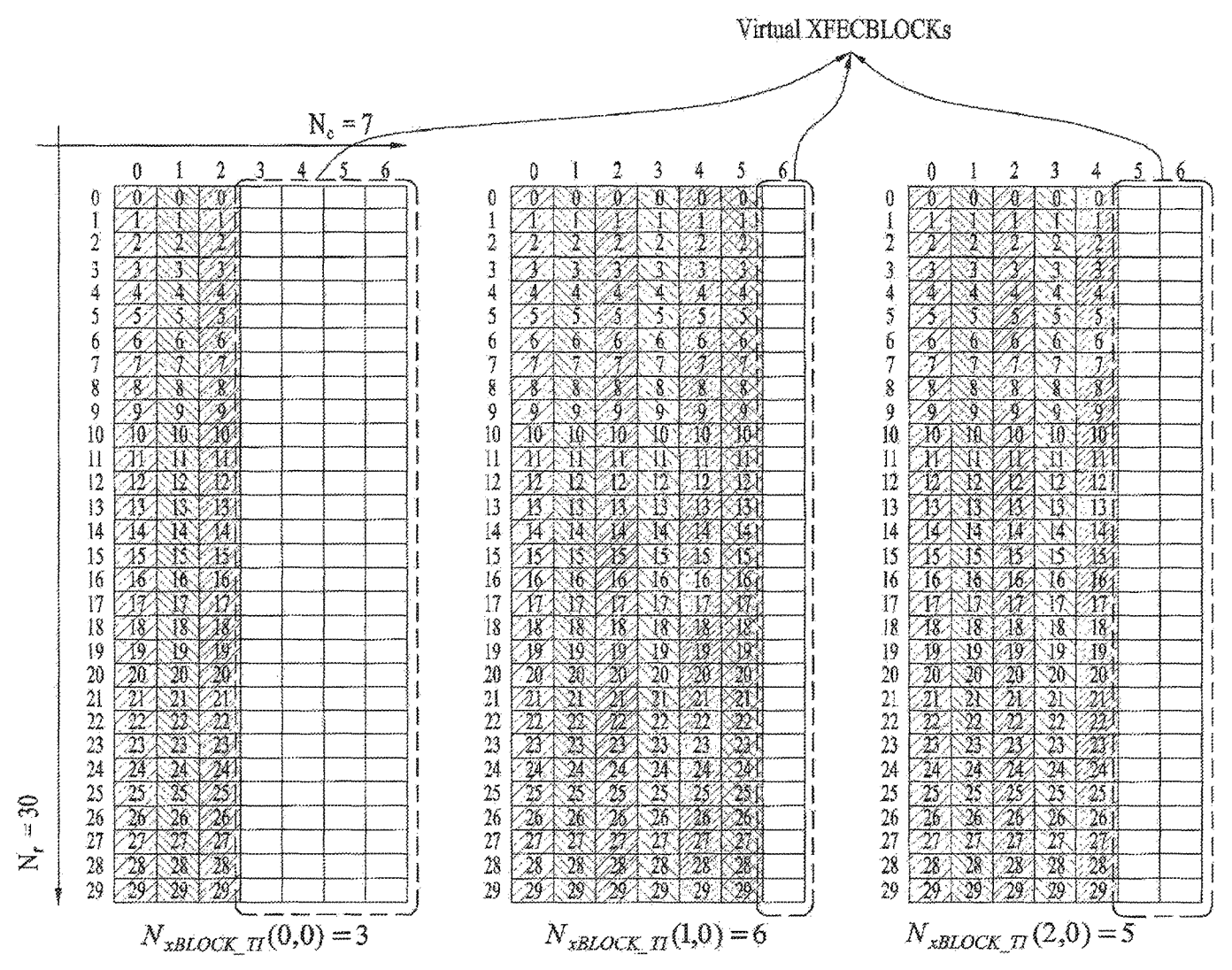

FIG. 27 illustrates an operation of a twisted row-column block interleaver according to another embodiment of the present invention.

More specifically, FIG. 27 illustrates the interleaving array in the TI memory for each TI group, including virtual XFECBLOCKs when $N_{xBLOCK\_TI}(0,0)=3$, $N_{xBLOCK\_TI}(1,0)=6$, $N_{xBLOCK\_TI}(2,0)=5$.

The variable number $N_{xBLOCK\_TI}(n,s)=N$, will be less than or equal to $N'_{xBLOCK\_TI\_MAX}$. Thus, in order to achieve a single-memory deinterleaving at the receiver side, regardless of $N_{xBLOCK\_TI}(n,s)$, the interleaving array for use in a twisted row-column block interleaver is set to the size of $N_r \times N_c = N_{cells} \times N'_{xBLOCK\_TI\_MAX}$ by inserting the virtual XFECBLOCKs into the TI memory and the reading process is accomplished as follow expression.

$p=0;$ for $i=0; i<N_{cells}N'_{xBLOCK\_TI\_MAX}; i=i+1$ $\{GENERATE(R_{n,s,i}, C_{n,s,i});$ $V_i = N_r C_{n,s,i} + R_{n,s,i}$ if $V_i \geq N_{cells} N_{xBLOCK\_TI}(n,s)$ $\}$ $Z_{n,s,p} = V_i; p=p+1;$ $\}$ $\}$ [expression 11]

The number of TI groups is set to 3. The option of time interleaver is signaled in the PLS2-STAT data by DP_TI_TYPE='0', DP_FRAME_INTERVAL='1', and DP_TI_LENGTH='1', i.e., NTI=1, IJUMP=1, and PI=1. The number of XFECBLOCKs, each of which has Ncells=30 cells, per TI group is signaled in the PLS2-DYN data by NxBLOCK_TI(0,0)=3, NxBLOCK_TI(1,0)=6, and NxBLOCK_TI(2,0)=5, respectively. The maximum number of XFECBLOCK is signaled in the PLS2-STAT data by NxBLOCK_Group_MAX, which leads to $\lfloor N_{xBLOCK\_Group\_MAX}/N_{TI} \rfloor = N_{xBLOCK\_TI\_MAX} = 6$.

Figure 28:
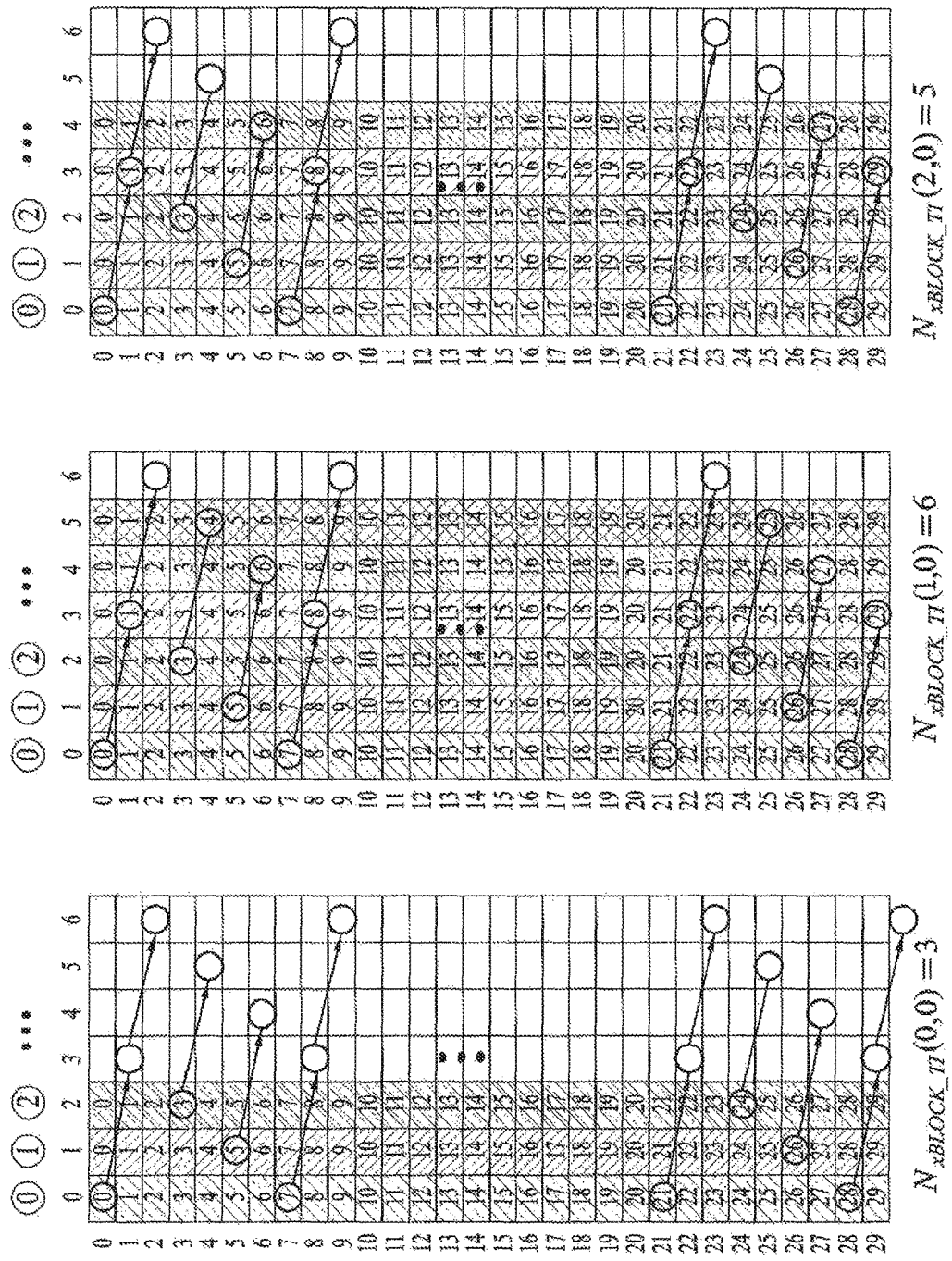
FIG. 28 illustrates a diagonal-wise reading pattern of a twisted row-column block interleaver according to an embodiment of the present invention.

FIG. 28 illustrates a diagonal-wise reading pattern of a twisted row-column block interleaver according to an embodiment of the present invention.

More specifically FIG. 28 shows a diagonal-wise reading pattern from each interleaving array with parameters of $N'_{xBLOCK\_TI\_MAX}=7$ and Sshift=(7−1)/2=3. Note that in the reading process shown as pseudocode above, if $V_i \geq N_{cells} N_{xBLOCK\_TI}(n,s)$ the value of Vi is skipped and the next calculated value of Vi is used.

Figure 29:
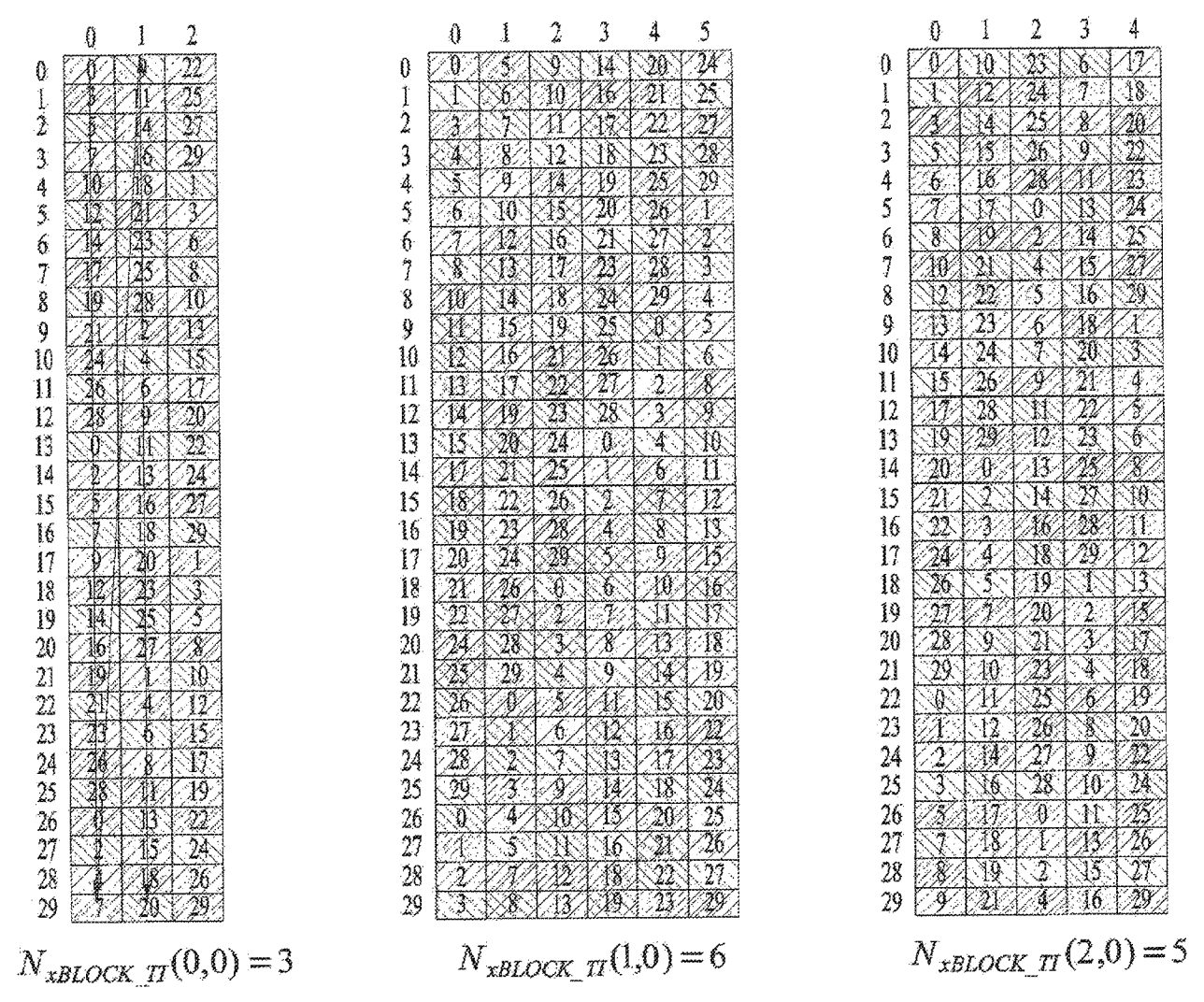

FIG. 29 illustrates interleaved XFECBLOCKs from each interleaving array according to an embodiment of the present invention.

FIG. 29 illustrates the interleaved XFECBLOCKs from each interleaving array with parameters of $N_{xBLOCK\_TI\_MAX}=7$ and Sshift=3.

A description is now given of a frequency interleaving process according to an embodiment of the present invention.

The frequency interleaver 7020 according to an embodiment of the present invention is used to apply a different interleaving sequence per cells corresponding to an every OFDM symbol to improve the performance of frequency diversity in an OFDM symbol structure including a plurality of cells.

In the present invention, the above-described frequency interleaving method may be called random frequency interleaving or random FI, and the name thereof may vary depending on the intention of a designer.

As described above, the broadcast signal transmission apparatus or the frequency interleaver 7020 included in the broadcast signal transmission apparatus according to an embodiment of the present invention performs frequency interleaving by applying a different interleaving sequence per cells of one or more OFDM symbols, i.e., each OFDM symbol or paired two OFDM symbols (pair-wise OFDM symbols or each OFDM symbol pair), and thus may achieve frequency diversity. The frequency interleaver according to an embodiment of the present invention may perform frequency interleaving on input OFDM symbols using frequency interleaving addresses generated based on a main interleaving sequence (or a basic interleaving sequence) and a symbol offset. A detailed description thereof will be given below.

Therefore, the broadcast signal transmission apparatus or the frequency interleaver according to an embodiment of the present invention may have a ping-pong frequency interleaver structure for performing frequency interleaving in units of a pair of consecutive OFDM symbols using two memory banks. The name thereof may vary depending on the intention of a designer.

Data cells corresponding to even pair-wise OFDM symbols and data cells corresponding to odd pair-wise OFDM symbols may be independently interleaved using different H memory banks. In addition, the frequency interleaver according to an embodiment of the present invention may simultaneously perform write operation and read operation on data cells corresponding to a pair of consecutive OFDM symbols input to each memory bank, using a single arbitrary interleaving sequence. A detailed description thereof will be given below.

Figure 30:
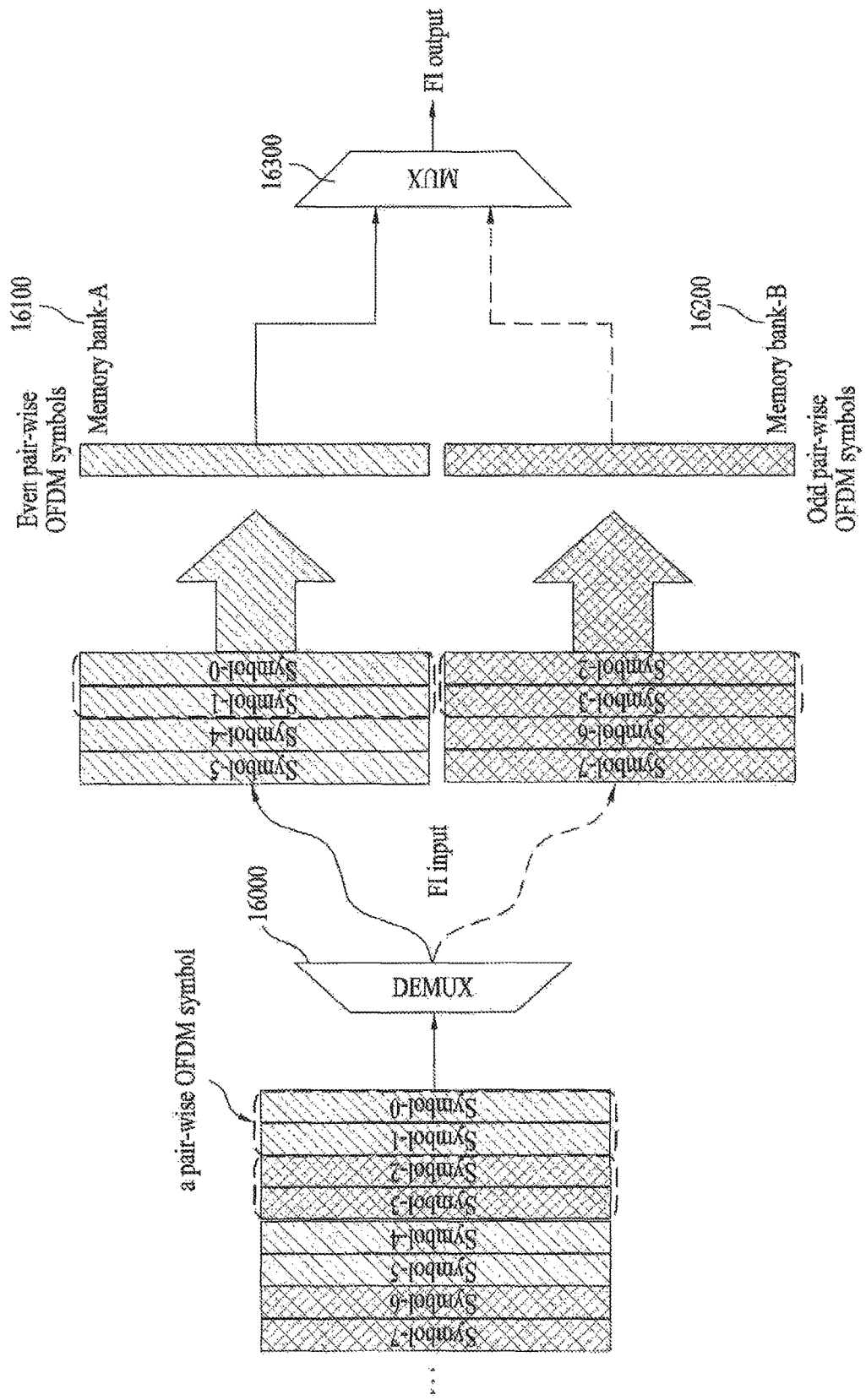
FIG. 30 illustrates operation of the frequency interleaver according to an embodiment of the present invention.

FIG. 30 illustrates operation of the frequency interleaver according to an embodiment of the present invention.

Specifically, FIG. 30 illustrates basic operation of the frequency interleaver using two memory banks at the transmitter side. Frequency interleaving according to an embodiment of the present invention may enable frequency deinterleaving using a single memory at the receiver side.

As described above, the frequency interleaver according to an embodiment of the present invention may perform ping-pong interleaving operation.

In general, the ping-pong interleaving operation is performed using two memory banks.

As described above, data cells corresponding to even pair-wise OFDM symbols and data cells corresponding to odd pair-wise OFDM symbols may be independently interleaved using different FI memory banks. For example, data cells corresponding to the first (even pair-wise) OFDM symbols may be frequency-interleaved in the first memory bank based on an interleaving sequence according to an embodiment of the present invention, and data cells corresponding to the second (odd pair-wise) OFDM symbols may be frequency-interleaved in the second memory bank based on an interleaving sequence according to an embodiment of the present invention.

As illustrated in the figure, the frequency interleaver may include a demux 16000, memory bank A 16100, memory bank B 16200, and a mux 16300.

Initially, the frequency interleaver according to an embodiment of the present invention may perform demultiplexing to pair data cells corresponding to consecutively input OFDM symbols. Subsequently, the frequency interleaver according to an embodiment of the present invention may perform frequency interleaving including write operation and read operation using each memory bank A or B.

Then, the frequency interleaver according to an embodiment of the present invention may perform multiplexing to consecutively transmit the data cells corresponding to the OFDM symbols.

Figure 31:
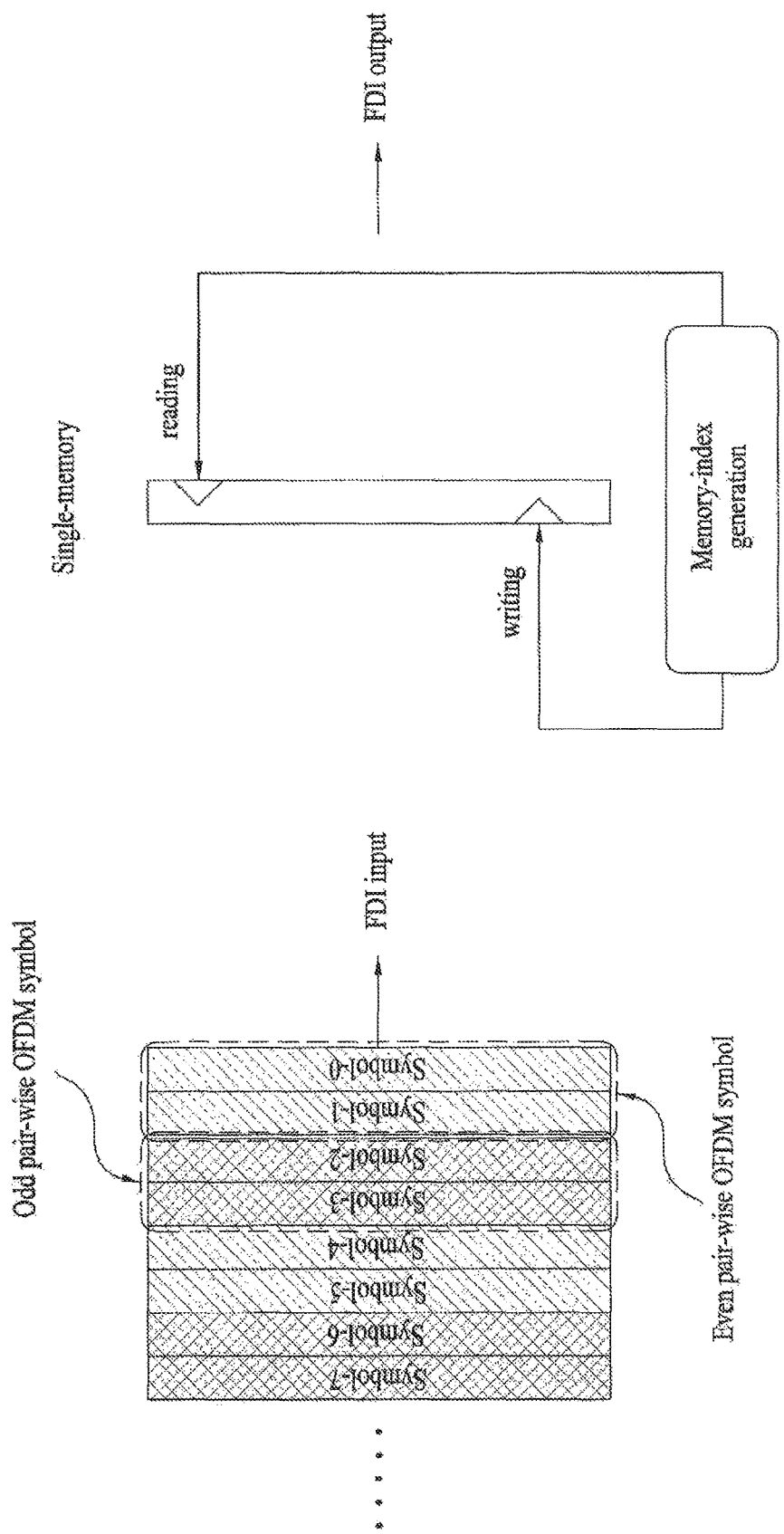
FIG. 31 illustrates a frequency deinterleaving process according to an embodiment of the present invention.

FIG. 31 illustrates a frequency deinterleaving process according to an embodiment of the present invention.

The broadcast signal reception apparatus according to an embodiment of the present invention may perform an inverse process of the above-described frequency interleaving process using a single memory. This figure illustrates a frequency deinterleaving process of data cells corresponding to consecutively input OFDM symbols using a single memory.

Frequency deinterleaving according to an embodiment of the present invention may be basically performed as an inverse process of the above-described frequency interleaving process.

That is, as illustrated in a left part of the figure, the broadcast signal reception apparatus according to an embodiment of the present invention may perform inverse operations of the write operation and the read operation of the above-described frequency interleaving process of the data cells corresponding to the consecutively input OFDM symbols using a single memory. In this case, since only a single memory is used, memory use efficiency may be increased. This effect is generated due to the ping-pong interleaving operation performed at the transmitter side.

Figure 32:
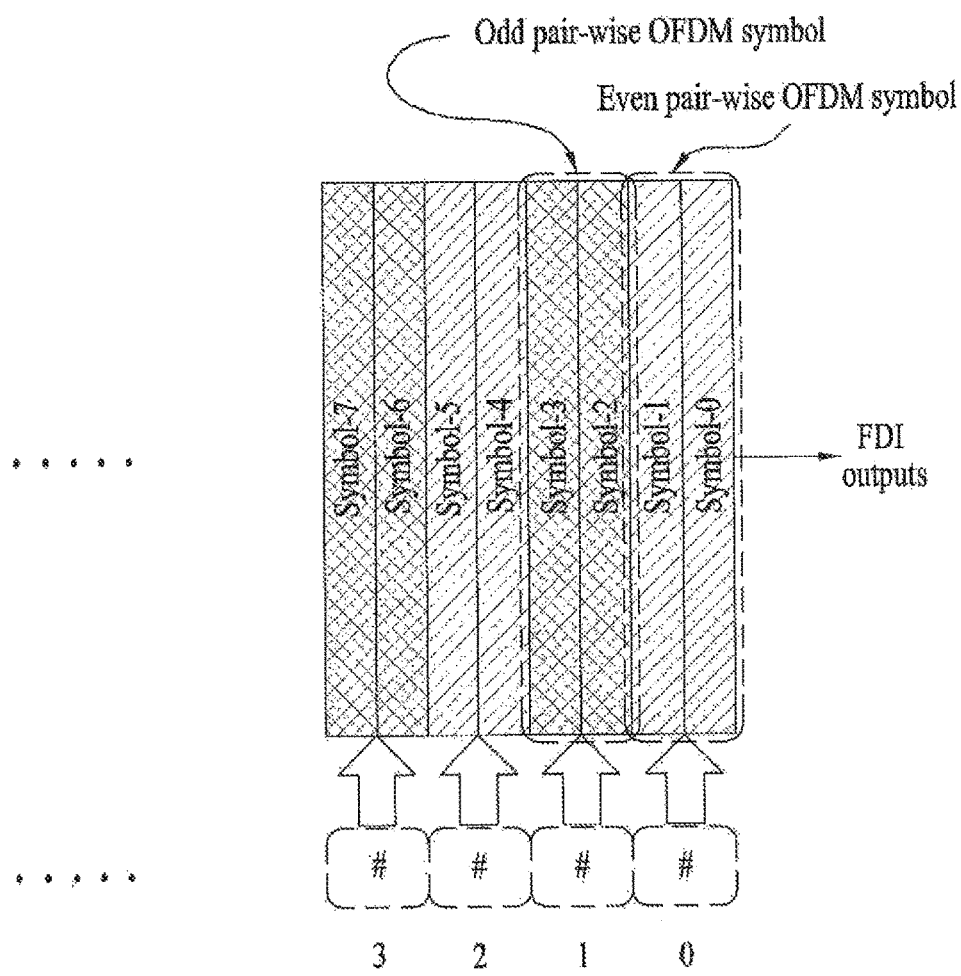
FIG. 32 is a view illustrating single-memory deinterleaving for input sequential OFDM symbols.

FIG. 32 is a view illustrating single-memory deinterleaving for input sequential OFDM symbols.

FIG. 32 is a view illustrating concept of a broadcast signal receiving apparatus or a frequency deinterleaver thereof, for applying interleaving sequence used in a broadcast signal transmitting apparatus (or a frequency interleaver 7020) to each pair-wise OFDM symbol to perform deinterleaving.

As described above, the broadcast signal receiving apparatus according to an embodiment of the present invention may perform an inverse procedure of the aforementioned frequency interleaving procedure using a single memory. FIG. 32 illustrates an operation of the broadcast signal receiving apparatus for processing single-memory frequency deinterleaving (FDI) for input sequential OFDM symbols.

The broadcast signal receiving apparatus according to an embodiment of the present invention may perform an inverse procedure of the aforementioned operation of a frequency interleaver 7020. Thus, deinterleaving sequences correspond to the aforementioned interleaving sequences.

FIG. 33 illustrates equations for describing a process for changing an interleaving sequence within each memory bank, according to an embodiment of the present invention.

As described above, the frequency interleaver according to an embodiment of the present invention may perform frequency interleaving using frequency interleaving addresses calculated by generating a symbol offset based on a basic interleaving sequence.

A block of an upper part of the figure illustrates an equation showing a frequency interleaving process of data cells corresponding to the first OFDM symbol of an $i^{th}$ OFDM symbol pair, and a block of a lower part of the figure illustrates an equation showing a frequency interleaving process of data cells corresponding to the second OFDM symbol of the $i^{th}$ OFDM symbol pair.

A random sequence may be generated by a basic interleaving sequence generator. A detailed description thereof will be given below.

The symbol offset may be generated by a symbol offset generator to be described below. A detailed description thereof will be given below.

Available data cells (cells output from the cell mapper 7010) may be interleaved within one OFDM symbol. According to an embodiment of the present invention, $N_{data}$ denotes the number of data cells, and the maximum value of $N_{data}$ may be denoted by $N_{max}$ or $M_{max}$. The value of $N_{max}$ may vary depending on FFT mode, and the name or value thereof may vary depending on the intention of a designer.

Hj(k) denotes an interleaving address or interleaving sequence for each FFT mode. As described above, the frequency interleaver 7020 according to an embodiment of the present invention randomly interleaves data cells corresponding to one OFDM symbol and uses the same to achieve frequency diversity. Therefore, to achieve the maximum interleaving gain in one signal frame, the frequency interleaver 7020 according to an embodiment of the present invention may apply an interleaving sequence in units of data cells corresponding to an OFDM symbol pair including two consecutive OFDM symbols.

In addition, as described above, the OFDM generation block 1030 according to an embodiment of the present invention may perform IFFT on input data.

A description is now given of operation of the frequency interleaver 7020 for generating a random interleaving sequence.

A random interleaving sequence generator may refer to the frequency interleaver itself, or may be understood as a block or a module included in the frequency interleaver.

The random interleaving sequence generator may be called an interleaving address generator or an interleaving sequence generator, and the name thereof may vary depending on the intention of a designer. The interleaving sequence generator according to an embodiment of the present invention may include a basic interleaving sequence generator, a symbol offset generator, a modulo operator, and an address check block. The basic interleaving sequence generator according to an embodiment of the present invention may be called a random main sequence generator, and the address check block may be called a memory index check block. The name, location, and function of each block may vary depending on the intention of a designer.

As described above, the FFT mode or FFT size according to an embodiment of the present invention may be, for example, 8K, 16K, or 32K. The FFT mode or size may vary depending on the intention of a designer.

A description is now given of the random interleaving sequence generator.

The frequency interleaver according to an embodiment of the present invention may perform interleaving by applying a different interleaving sequence or interleaving address per OFDM symbol as described above, thereby achieving frequency diversity. The logical composition of the random interleaving sequence generator according to an embodiment of the present invention may include a random main sequence generator $C_j(K)$ for interleaving data cells included in every single OFDM symbol, and a random symbol offset generator $S\lfloor j/2 \rfloor$ for generating and changing a symbol offset. In addition, the random interleaving sequence generator according to an embodiment of the present invention may generate the above-described interleaving sequence or interleaving address.

As described above, the random main sequence generator according to an embodiment of the present invention may be called a basic interleaving sequence generator, and the name thereof may vary depending on the intention of a designer. The random main sequence generator according to an embodiment of the present invention uses a binary sequence of a specific size determined per FFT mode, and may generate a main sequence.

The random main sequence generator according to an embodiment of the present invention may include a spreader and a randomizer, and may perform rendering for full randomness in the frequency domain.

The random symbol offset generator according to an embodiment of the present invention may be called the above-described symbol offset generator, and the name thereof may vary depending on the intention of a designer.

The symbol offset generator according to an embodiment of the present invention may include a k-bit spreader and an (X−k)-bit randomizer, and may perform rendering for spreading by 2k in the time domain.

The above-described spreader and the randomizer may be used to generate a spreading effect and a randomization effect when an interleaving sequence is generated.

A description is now given of the frequency interleaver in a case when the FFT size is 8K.

The frequency interleaver according to an embodiment of the present invention may include the following logical structure in 8K FFT mode.

The basic interleaving sequence generator may include a 1-bit spreader and a 12-bit randomizer, and the symbol offset generator may include a k-bit spreader and a (13-k)-bit randomizer. The sizes of the spreader and the randomizer may vary depending on the intention of a designer.

FIG. 34 illustrates a symbol offset generator of 8K FFT mode and equations showing operation of the symbol offset generator, according to an embodiment of the present invention.

In this figure, (a) illustrates a symbol offset generator including a 0-bit spreader and a 13-bit randomizer, and (b) illustrates equations showing operation of the symbol offset generator of 8K FFT mode.

The symbol offset generator illustrated in (a) may operate in units of an OFDM symbol pair.

The equation illustrated in an upper part of (b) shows an initial value and a primitive polynomial (PP) of the randomizer. In this case, the PP may be a $13^{th}$ PP and the initial value may be changed to arbitrary values.

The equation illustrated in a lower part of (b) shows a process for calculating and outputting a symbol offset for output signals of the spreader and the randomizer. As shown in the equation, the symbol offset generator may operate in units of an OFDM symbol pair, and a total length of output offsets corresponds to half of a total length of OFDM symbols.

Figure 35A:
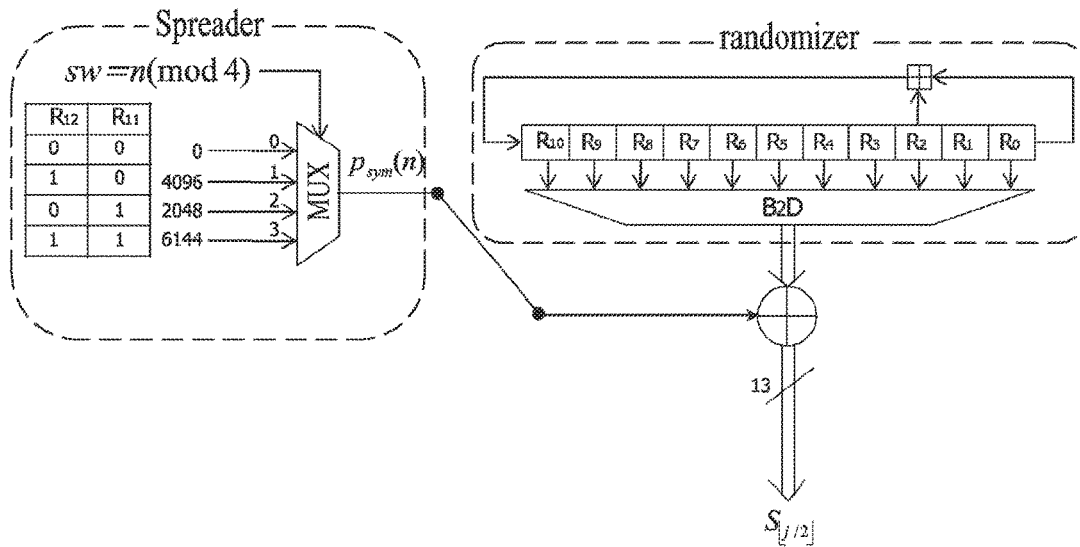
FIGS. 35(a) and 35(b) illustrate a symbol offset generator of 8K FFT mode and equations showing operation of the symbol offset generator, according to another embodiment of the present invention.
Figure 35B:
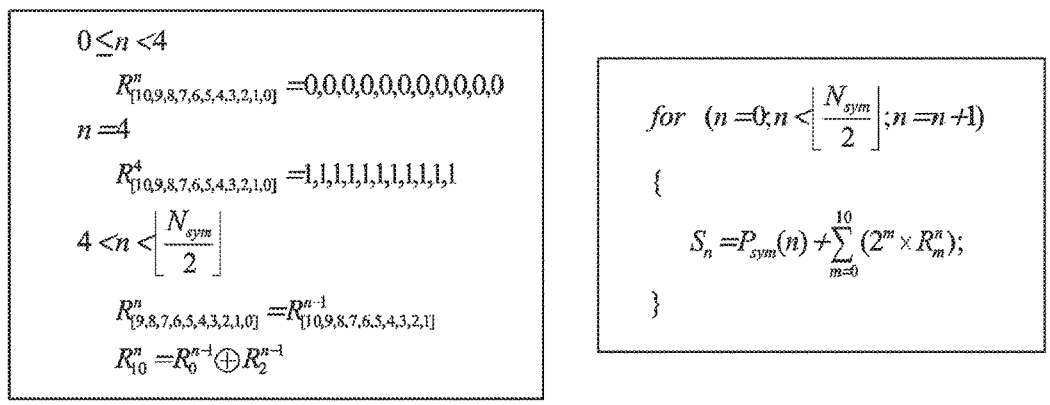

FIG. 35 illustrates a symbol offset generator of 8K FFT mode and equations showing operation of the symbol offset generator, according to another embodiment of the present invention.

In this figure, (a) illustrates a symbol offset generator including a 2-bit spreader and an 11-bit randomizer, and (b) illustrates equations showing operation of the symbol offset generator of 8K FFT mode.

The symbol offset generator illustrated in (a) may operate for data cells corresponding to every OFDM symbol pair.

The equation illustrated in an upper part of (b) shows an initial value and a PP of the randomizer. In this case, the PP may be an $11^{th}$ PP and the initial value may be changed to arbitrary values.

The equation illustrated in a lower part of (b) shows a process for calculating and outputting a symbol offset for output signals of the spreader and the randomizer. As shown in the equation, the symbol offset generator may operate for data cells corresponding to every OFDM symbol pair. Therefore, a total length of output offsets corresponds to half of a total length of OFDM symbols.

Figure 36:
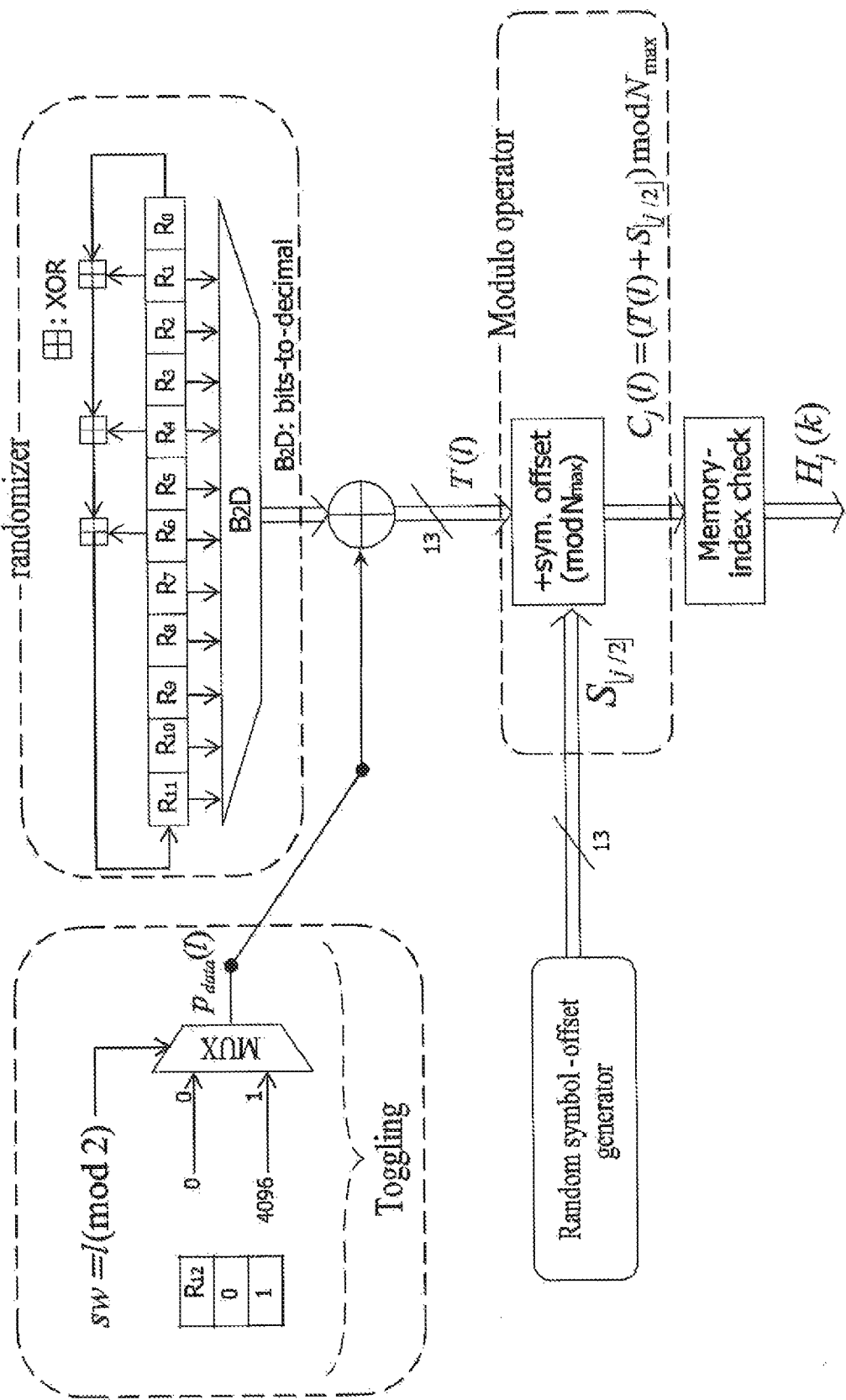
FIG. 36 illustrates a frequency interleaver of 8K FFT mode according to an embodiment of the present invention.

FIG. 36 illustrates a frequency interleaver of 8K FFT mode according to an embodiment of the present invention.

The frequency interleaver of 8K FFT mode according to an embodiment of the present invention may include a spreader (or a 1-bit toggle switch), a randomizer, a random symbol offset generator (or a symbol offset generator), a modulo operator, and a memory index check block to generate the above-described interleaving sequence or interleaving address. The spreader and the randomizer may be included in the above-described basic interleaving sequence generator, and the memory index check block may be called an address check block. The locations of the spreader and the randomizer and the name of the memory index check block may vary depending on the intention of a designer.

As illustrated in the figure, the frequency interleaver according to an embodiment of the present invention may perform modulo operation and verify a memory index of the generated interleaving sequence (or verify an address of the generated interleaving sequence). This serves to increase the performance of frequency deinterleaving to be performed using a single memory at the receiver side. As described above, according to an embodiment of the present invention, a signal frame (or a frame) may include normal data symbols (or data symbols), frame edge symbols, and frame signaling symbols. In this case, since the lengths of the frame edge symbols and the frame signaling symbols are less than the length of the normal data symbols, the deinterleaving performance of a frequency deinterleaver having a single memory may be lowered. Therefore, the present invention proposes frequency interleaving for checking an address (or a memory index) of an interleaving sequence after modulo operation to increase the performance of frequency deinterleaving.

A description is now given of operation of each block.

The spreader may operate using upper n bits among a total of 13 bits, and may serve as a multiplexer based on a look-up table. In 8K FFT mode, the spreader may be a 1-bit multiplexer (or toggle switch).

The randomizer operates using a PN (or pseudo random bit stream (PRBS)) generator and may provide a full randomness effect in interleaving. As described above, in 8K FFT mode, a PN (or PRBS) generator considering 12 bits may be used. The size of the PN (or PRBS) generator may vary depending on the intention of a designer.

The symbol offset generator may generate a symbol offset to be applied to data cells corresponding to every OFDM symbol pair. As illustrated in the figure, in the case of 8K, the symbol offset may be determined based on a bit sequence of 13 bits. As a result, the generated symbol offset may have a constant value for two consecutive symbols included in an OFDM symbol pair. A detailed description thereof has been given above and thus is omitted herein.

The modulo operator may operate if an input value exceeds $N_{data}$ or $N_{max}$. In 8K FFT mode, the maximum value of $N_{max}$ may be 8192.

If a currently generated value exceeds $N_{data}$ or the maximum value $N_{max}$ of $N_{data}$, the memory index check block does not use an output value of the modulo operator, and may repeatedly operate the spreader and the randomizer to control the output memory index (or interleaving address) value not to exceed $N_{data}$ or the maximum value $N_{max}$ of $N_{data}$.

FIG. 37 illustrates equations showing operation of the frequency interleaver of 8K FFT mode according to an embodiment of the present invention.

The equation illustrated in an upper part of the figure illustrates an initial value and a PP of the randomizer included in the above-described basic interleaving sequence generator. In this case, the PP may be a $12^{th}$ PP and the initial value may be changed to arbitrary values. That is, the equation illustrated in the upper part of the figure illustrates a binary word sequence which can be used to define the above-described basic interleaving sequence.

The equation illustrated in a lower part of the figure illustrates a process for calculating an interleaving sequence (or an interleaving address) by the frequency interleaver using an output signal of the basic interleaving sequence generator. As shown in the equation, a generated symbol offset may be used to output the interleaving sequence, and modulo operation and address check operation are performed. As described above, one symbol offset may be equally applied to data cells corresponding to every OFDM symbol pair.

As described above, the symbol offset generator according to an embodiment of the present invention may include a k-bit spreader and an (X–k)-bit randomizer.

The k-bit spreader operates using a $2^k$ multiplexer, and may be optimally designed to minimize spreading (or to minimize correlation) between symbols.

The randomizer operates using an N-bit PN generator (or an N-bit PRBS generator), and may be designed to provide randomness.

The symbol offset generator of 8K FFT mode may include a 0/1/2-bit spreader and a 13/12/11-bit random number generator (or PN generator). The sizes of the spreader and the random number generator may vary depending on the intention of a designer.

Figure 38:
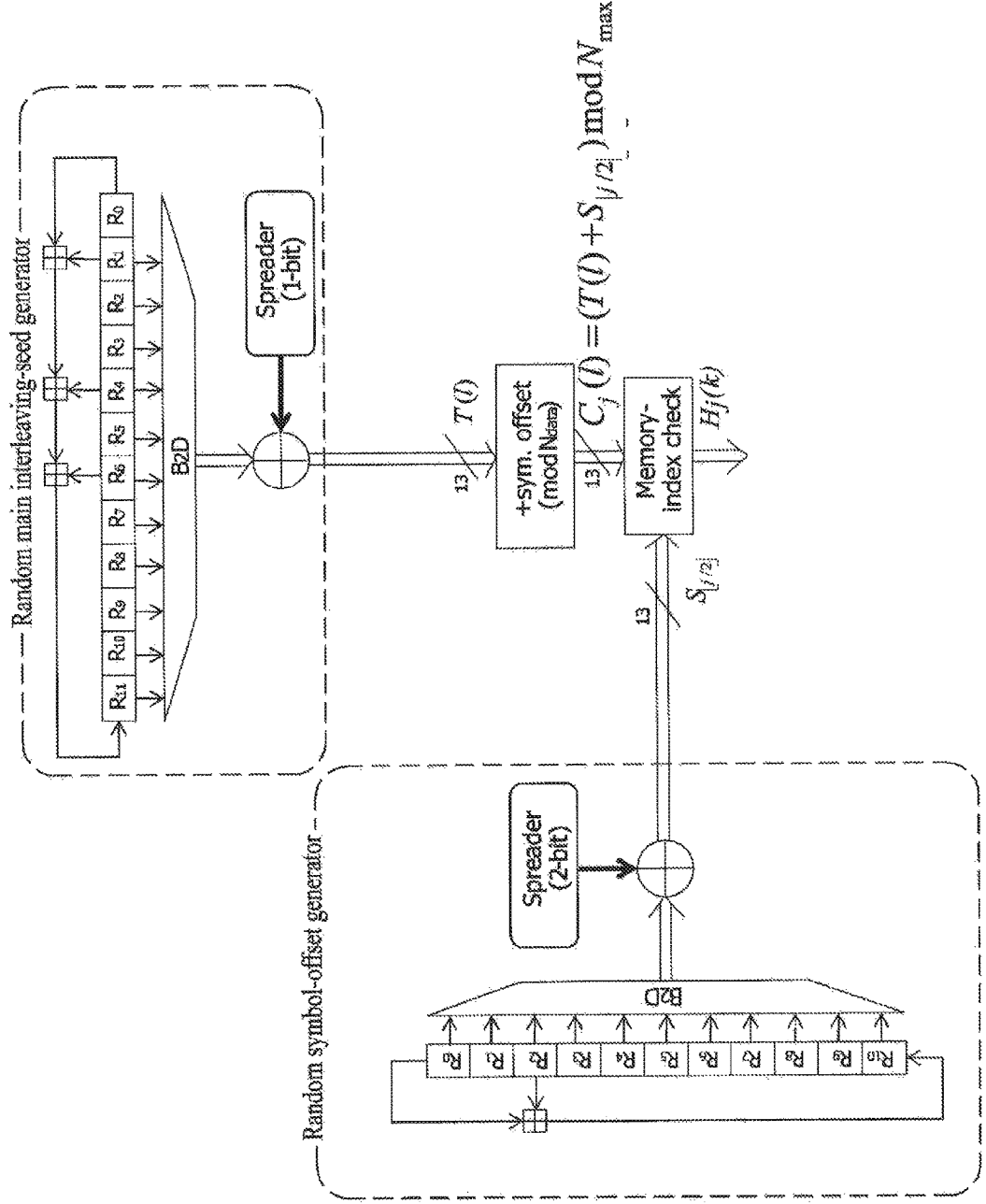
FIG. 38 illustrates the logical structure of the frequency interleaver of 8K FFT mode according to an embodiment of the present invention.

FIG. 38 illustrates the logical structure of the frequency interleaver of 8K FFT mode according to an embodiment of the present invention.

As described above, the frequency interleaver of 8K FFT mode according to an embodiment of the present invention may include a basic interleaving sequence generator, a symbol offset generator, a modulo operator, and a memory index check block.

Detailed descriptions thereof have been given above and thus are omitted herein.

A description is now given of a frequency interleaver of 8K FFT mode according to another embodiment of the present invention. The frequency interleaver of 8K FFT mode according to another embodiment of the present invention is different from the above-described frequency interleaver in that a randomizer of a basic interleaving sequence further performs bit shuffling.

Figure 39:
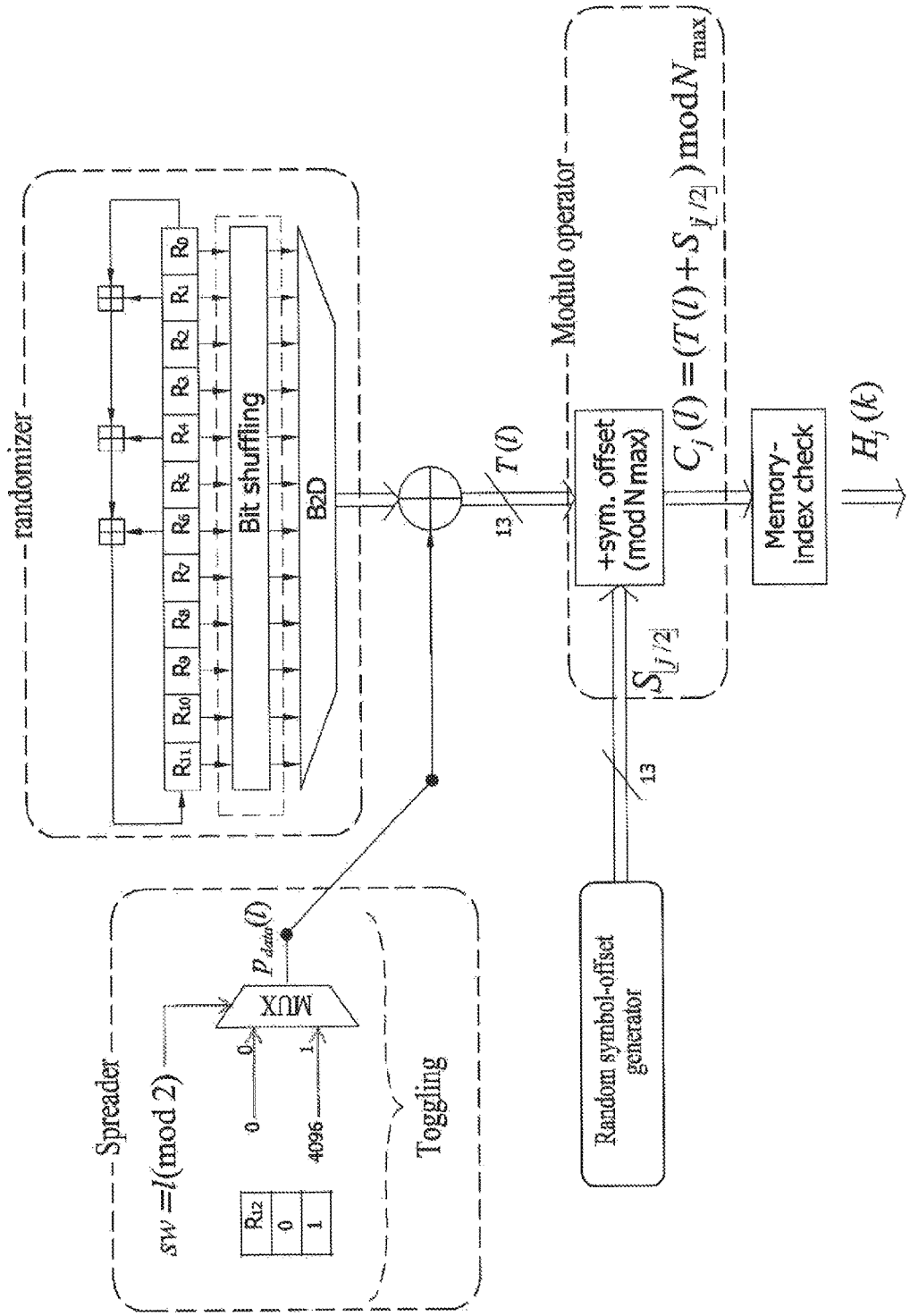
FIG. 39 illustrates a frequency interleaver of 8K FFT mode according to another embodiment of the present invention.

FIG. 39 illustrates a frequency interleaver of 8K FFT mode according to another embodiment of the present invention.

The frequency interleaver of 8K FFT mode according to another embodiment of the present invention may include a basic interleaving sequence generator, a symbol offset generator, a modulo operator, and a memory index check block to generate the above-described interleaving sequence or interleaving address, and the basic interleaving sequence generator performs bit shuffling. Detailed descriptions of operations other than bit shuffling have been given above and thus are omitted herein.

Bit shuffling is performed to optimize spreading or randomness, and is designed in consideration of $N_{data}$. In 8K FFT mode, the randomizer may use a 12-bit PN generator, and the size of the PN generator may vary.

FIG. 40 illustrates bit shuffling of the frequency interleaver of 8K FFT mode and equations showing operation of the frequency interleaver, according to an embodiment of the present invention.

In this figure, (a) illustrates the above-described bit shuffling of 8K FFT mode, and (b) illustrates equations showing operation of the frequency interleaver of 8K FFT mode.

As illustrated in (a), bit shuffling of 8K FFT mode may be used to shuffle bits of registers of a PN generator when a memory index is calculated. An upper part of (a) illustrates operation of bit shuffling, and a lower part of (a) illustrates an example of bit shuffling in the case of 12 bits.

As illustrated in the figure, as a result of bit shuffling, a 12-bit binary word sequence used as a basic interleaving sequence of the frequency interleaver of 8K FFT mode may be changed to R or R'. The changed binary word sequence may be equally applied to data cells corresponding to every OFDM symbol pair, or applied differently per data cells corresponding to each of two OFDM symbols included in an OFDM symbol pair.

The equation illustrated in an upper part of (b) shows an initial value and a PP of the randomizer included in the above-described basic interleaving sequence generator. In this case, the PP may be a $12^{th}$ PP and the initial value may be changed to arbitrary values. That is, the equation illustrated in the upper part of the figure illustrates a binary word sequence which can be used to define the above-described basic interleaving sequence. The equation illustrated in a lower part of (b) shows a process for calculating an interleaving sequence (or an interleaving address) by the frequency interleaver using an output signal of the basic interleaving sequence generator. As shown in the equation, a symbol offset may be used to output the interleaving sequence, and modulo operation and address check operation are performed. As described above, one symbol offset may be equally applied to data cells corresponding to every OFDM symbol pair.

A description is now given of the frequency interleaver in a case when the FFT size is 16K.

The frequency interleaver according to an embodiment of the present invention may include the following logical structure in 16K FFT mode. The basic interleaving sequence generator may include a 1-bit spreader and a 13-bit randomizer, and the symbol offset generator may include a k-bit spreader and a (14-k)-bit randomizer. The sizes of the spreader and the randomizer may vary depending on the intention of a designer.

FIG. 41 illustrates a symbol offset generator of 16K FFT mode and equations showing operation of the symbol offset generator, according to an embodiment of the present invention.

In this figure, (a) illustrates a symbol offset generator including a 0-bit spreader and a 14-bit randomizer, and (b) illustrates equations showing operation of the symbol offset generator of 16K FFT mode.

The symbol offset generator illustrated in (a) may operate in units of data cells corresponding to every OFDM symbol pair.

The equation illustrated in an upper part of (b) shows an initial value and a PP of the randomizer. In this case, the PP may be a $14^{th}$ PP and the initial value may be changed to arbitrary values.

The equation illustrated in a lower part of (b) shows a process for calculating and outputting a symbol offset for output signals of the spreader and the randomizer. As shown in the equation, the symbol offset generator may operate in units of data cells corresponding to every OFDM symbol pair, and a total length of output offsets corresponds to half of a total length of OFDM symbols.

Figure 42A:
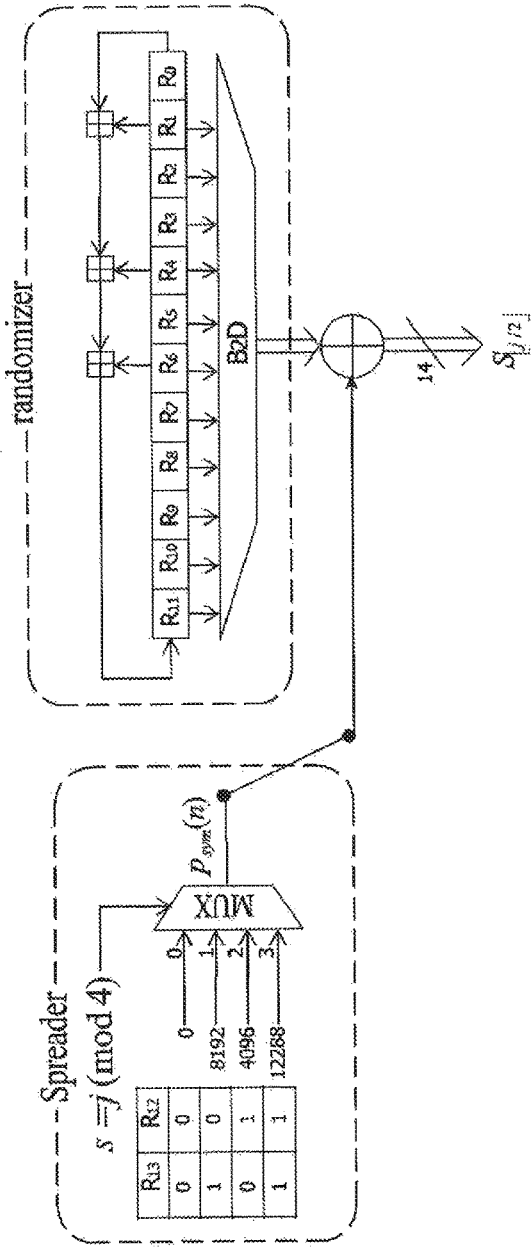
FIG. 42(a) and FIG. 42(b) illustrate a symbol offset generator of 16K FFT mode and equations showing operation of the symbol offset generator, according to another embodiment of the present invention.
Figure 42B:
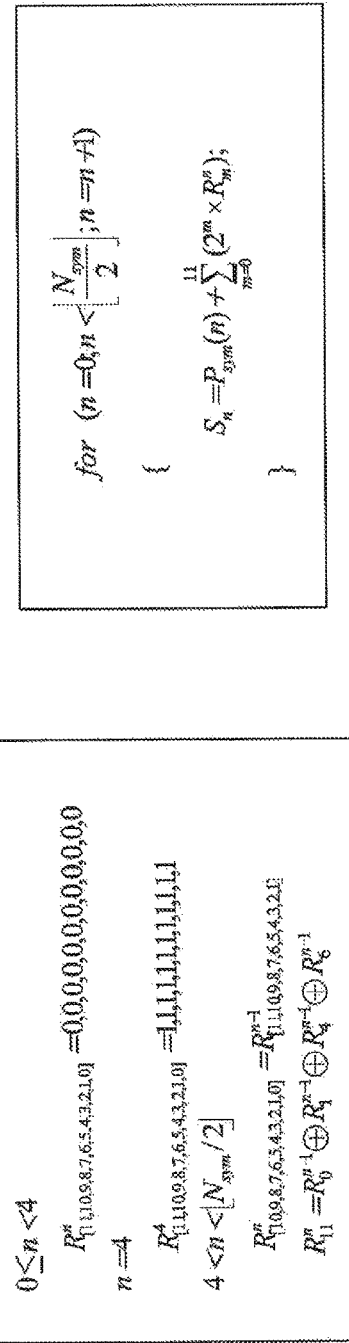

FIG. 42 illustrates a symbol offset generator of 16K FFT mode and equations showing operation of the symbol offset generator, according to another embodiment of the present invention.

In this figure, (a) illustrates a symbol offset generator including a 2-bit spreader and a 12-bit randomizer, and (b) illustrates equations showing operation of the symbol offset generator of 16K FFT mode.

The symbol offset generator illustrated in (a) may operate in units of data cells corresponding to every OFDM symbol pair.

The equation illustrated in an upper part of (b) shows an initial value and a PP of the randomizer. In this case, the PP may be a $12^{th}$ PP and the initial value may be changed to arbitrary values.

The equation illustrated in a lower part of (b) shows a process for calculating and outputting a symbol offset for output signals of the spreader and the randomizer. As shown in the equation, the symbol offset generator may operate in units of data cells corresponding to every OFDM symbol pair. Therefore, a total length of output offsets corresponds to half of a total length of data symbols corresponding to OFDM symbols.

Figure 43:
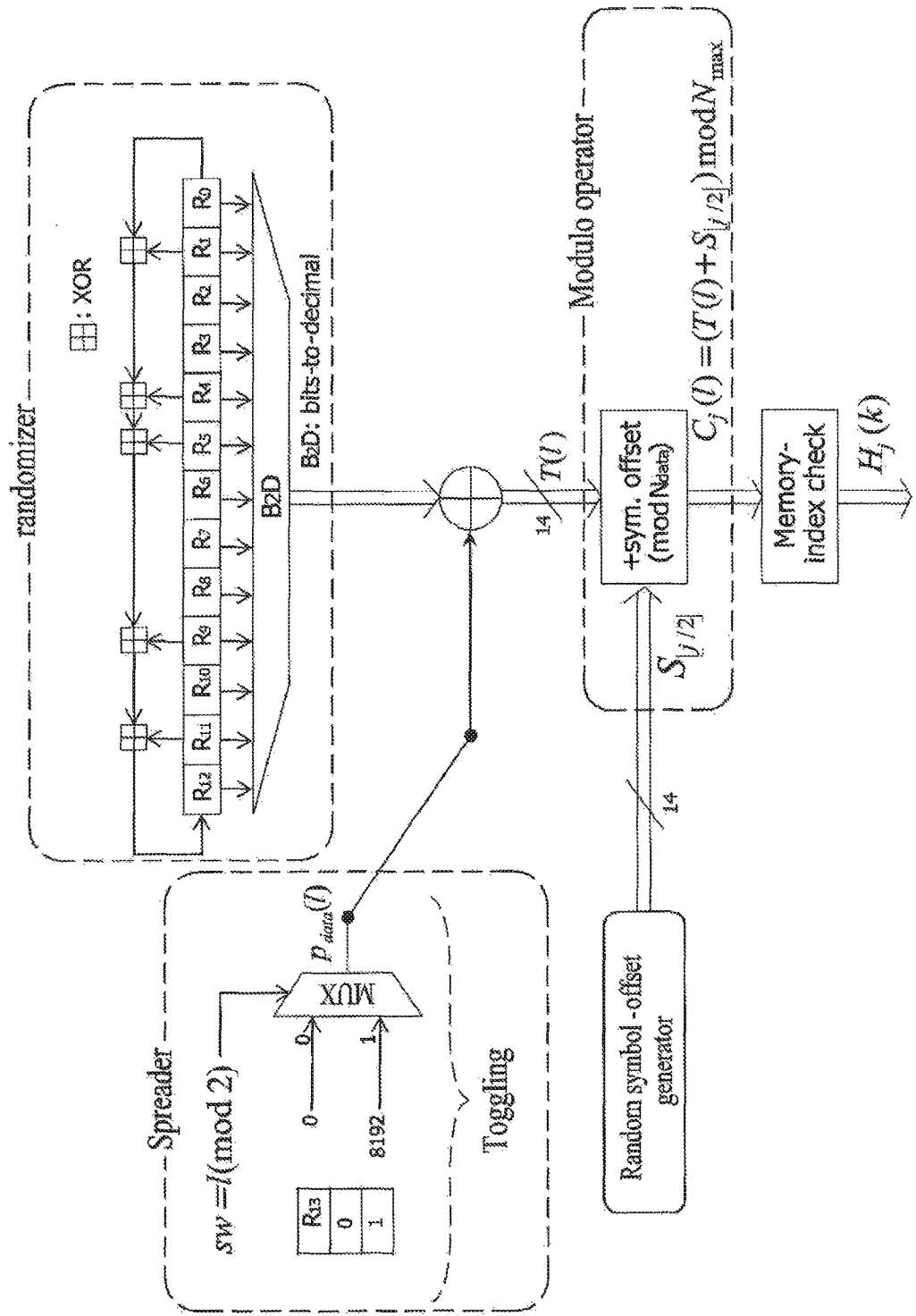
FIG. 43 illustrates a frequency interleaver of 16K FFT mode according to an embodiment of the present invention.

FIG. 43 illustrates a frequency interleaver of 16K FFT mode according to an embodiment of the present invention.

The frequency interleaver of 16K FFT mode according to an embodiment of the present invention may include a spreader (or a 1-bit toggle switch), a randomizer, a random symbol offset generator (or a symbol offset generator), a modulo operator, and a memory index check block to generate the above-described interleaving sequence or interleaving address. The spreader and the randomizer may be included in the above-described basic interleaving sequence generator, and the memory index check block may be called an address check block. The locations of the spreader and the randomizer and the name of the memory index check block may vary depending on the intention of a designer. A description is now given of operation of each block.

The spreader may operate using upper n bits among a total of 14 bits, and may serve as a multiplexer based on a look-up table. In 16K FFT mode, the spreader may be a 1-bit multiplexer (or toggle switch).

The randomizer operates using a PN (or pseudo random bit stream (PRBS)) generator and may provide a full randomness effect in interleaving. As described above, in 16K FFT mode, a PN (or PRBS) generator considering 13 bits may be used. The size of the PN (or PRBS) generator may vary depending on the intention of a designer.

The symbol offset generator may generate a symbol offset to be applied to data cells corresponding to every OFDM symbol pair. As illustrated in the figure, in the case of 16K, the symbol offset may be determined based on a bit sequence of 14 bits. The value of the symbol offset is constant for data cells corresponding to two consecutive symbols included in an OFDM symbol pair.

The modulo operator may operate if an input value exceeds $N_{data}$ or $N_{max}$. In 16K FFT mode, the maximum value of $N_{max}$ may be 16384.

If a currently generated value exceeds $N_{data}$ or the maximum value $N_{max}$ of $N_{data}$, the memory index check block may not use an output value of the modulo operator, and may repeatedly operate the spreader and the randomizer to control the output memory index value (or interleaving address) not to exceed $N_{data}$ or the maximum value $N_{max}$ of $N_{data}$.

FIG. 44 illustrates equations showing operation of the frequency interleaver of 16K FFT mode according to an embodiment of the present invention.

The equation illustrated in an upper part of the figure illustrates an initial value and a PP of the randomizer included in the above-described basic interleaving sequence generator. In this case, the PP may be a $13^{th}$ PP and the initial value may be changed to arbitrary values. That is, the equation illustrated in the upper part of the figure illustrates a binary word sequence which can be used to define the above-described basic interleaving sequence.

The equation illustrated in a lower part of the figure illustrates a process for calculating an interleaving sequence (or an interleaving address) by the frequency interleaver using an output signal of the basic interleaving sequence generator. As shown in the equation, a symbol offset may be used to output the interleaving sequence, and modulo operation and address check operation are performed. As described above, one symbol offset may be equally applied to data cells corresponding to every OFDM symbol pair.

As described above, the symbol offset generator according to an embodiment of the present invention may include a k-bit spreader and an (X−k)-bit randomizer.

The k-bit spreader operates using a $2^k$ multiplexer, and may be optimally designed to minimize spreading (or to minimize correlation) between symbols.

The randomizer operates using an N-bit PN generator (or an N-bit PRBS generator), and may be designed to provide randomness.

The symbol offset generator of 16K FFT mode may include a 0/1/2-bit spreader and a 14/13/12-bit random number generator (or PN generator). The sizes of the spreader and the random number generator may vary depending on the intention of a designer.

Figure 45:
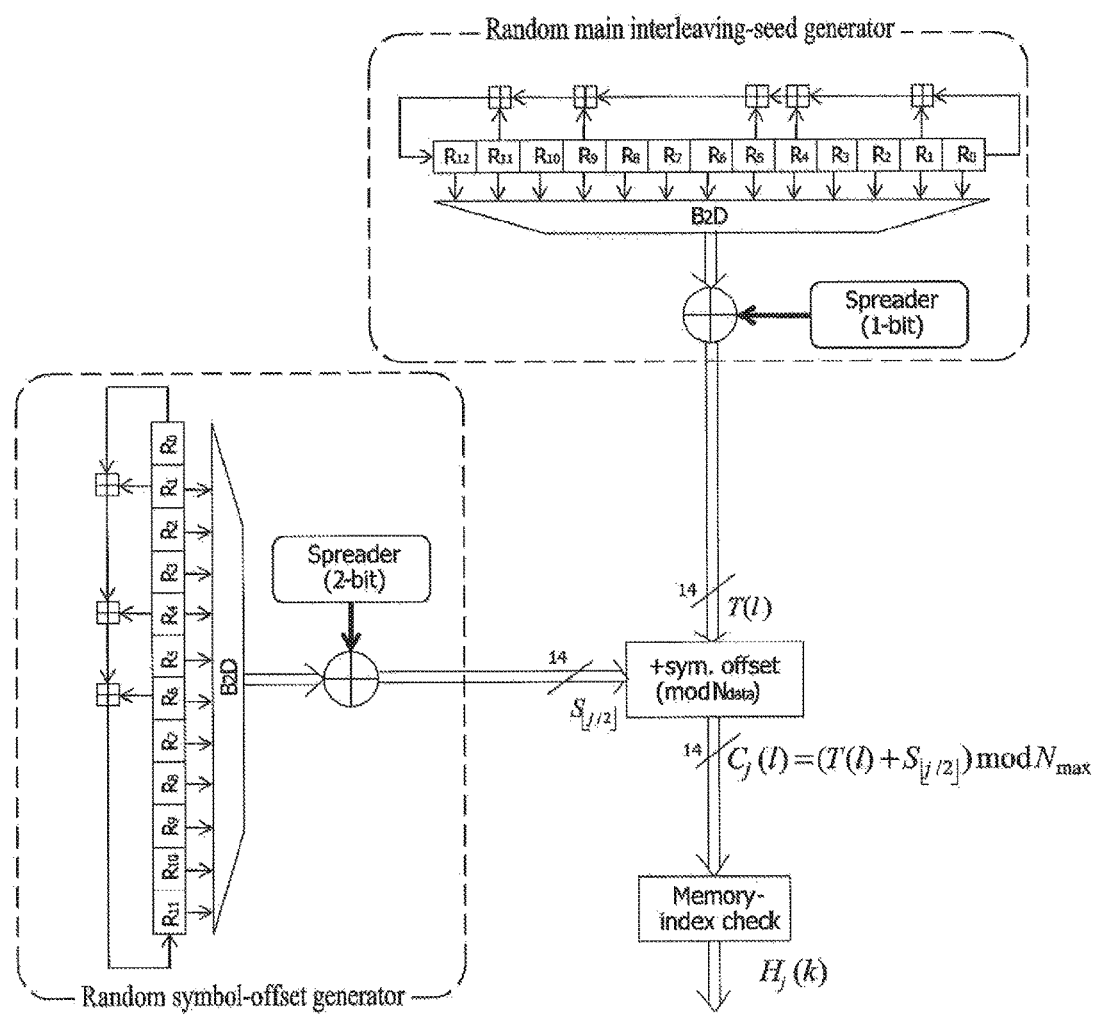
FIG. 45 illustrates the logical structure of the frequency interleaver of 16K FFT mode according to an embodiment of the present invention.

FIG. 45 illustrates the logical structure of the frequency interleaver of 16K FFT mode according to an embodiment of the present invention.

As described above, the frequency interleaver of 16K FFT mode according to an embodiment of the present invention may include a basic interleaving sequence generator, a symbol offset generator, a modulo operator, and a memory index check block.

Detailed descriptions thereof have been given above and thus are omitted herein.

A description is now given of a frequency interleaver of 16K FFT mode according to another embodiment of the present invention. The frequency interleaver of 16K FFT mode according to another embodiment of the present invention is different from the above-described frequency interleaver in that a randomizer of a basic interleaving sequence further performs bit shuffling.

Figure 46:
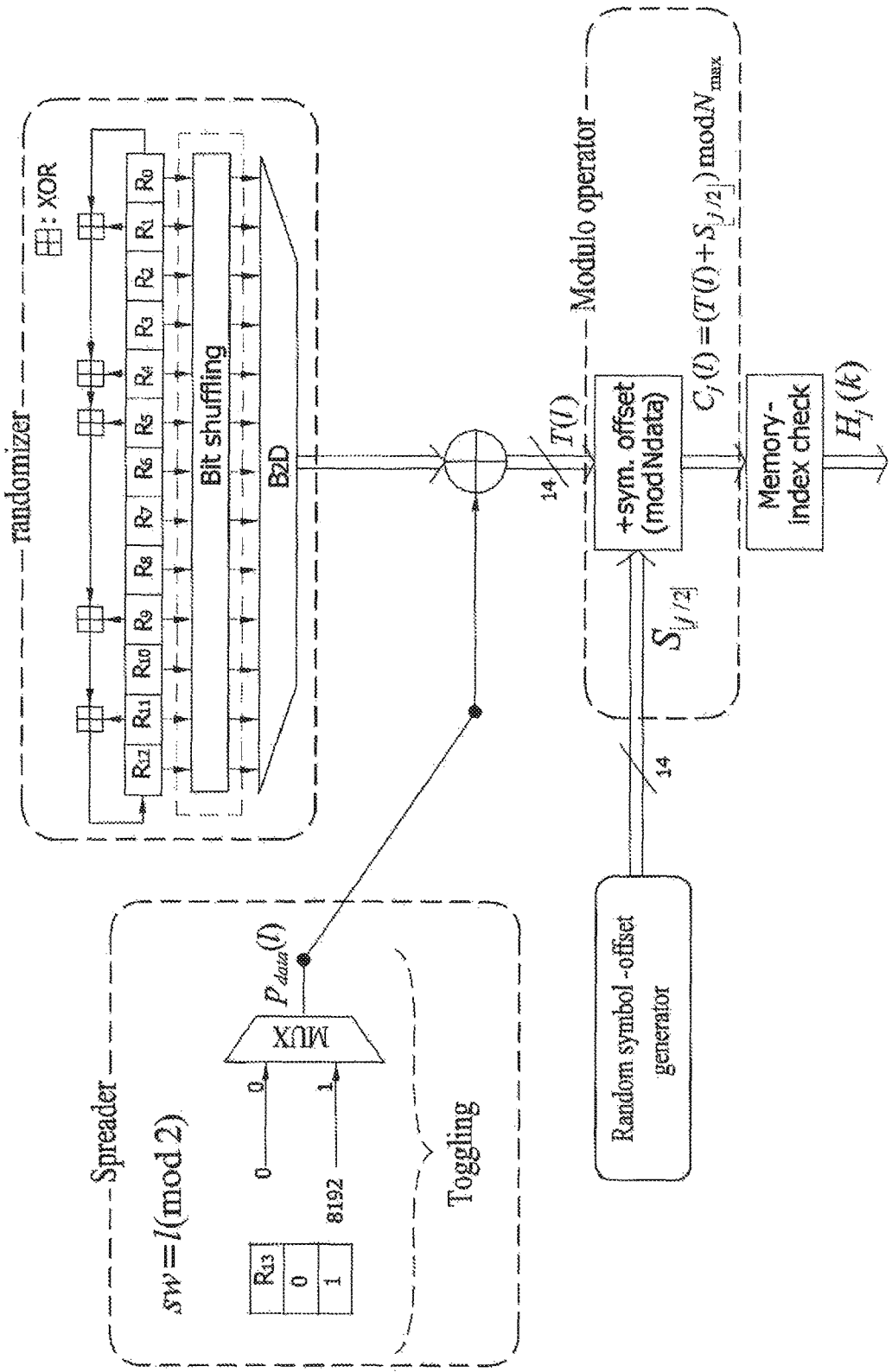
FIG. 46 illustrates a frequency interleaver of 16K FFT mode according to another embodiment of the present invention.

FIG. 46 illustrates a frequency interleaver of 16K FFT mode according to another embodiment of the present invention.

The frequency interleaver of 16K FFT mode according to another embodiment of the present invention may include a basic interleaving sequence generator, a symbol offset generator, a modulo operator, and a memory index check block to generate the above-described interleaving sequence or interleaving address, and the basic interleaving sequence generator performs bit shuffling. Detailed descriptions of operations other than bit shuffling have been given above and thus are omitted herein.

Bit shuffling is performed to optimize spreading or randomness, and is designed in consideration of $N_{data}$. In 16K FFT mode, the randomizer may use a 13-bit PN generator, and the size of the PN generator may vary.

Figure 47A:
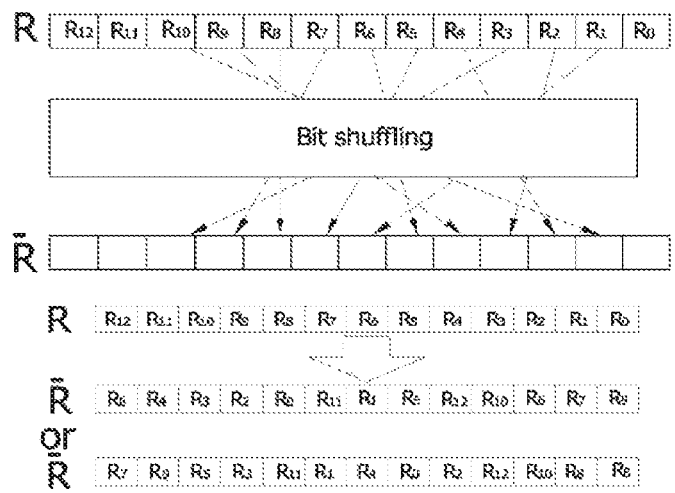
FIG. 47(a) and FIG. 47(b) illustrate bit shuffling of the frequency interleaver of 16K FFT mode and equations showing operation of the frequency interleaver, according to an embodiment of the present invention.
Figure 47B:
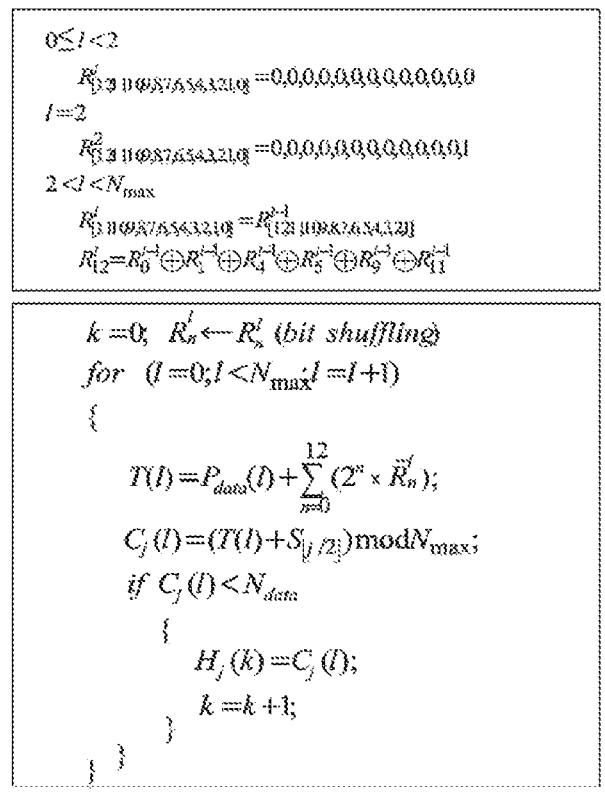

FIG. 47 illustrates bit shuffling of the frequency interleaver of 16K FFT mode and equations showing operation of the frequency interleaver, according to an embodiment of the present invention.

In this figure, (a) illustrates the above-described bit shuffling of 16K FFT mode, and (b) illustrates equations showing operation of the frequency interleaver of 16K FFT mode.

As illustrated in (a), bit shuffling of 16K FFT mode may be used to shuffle bits of registers of a PN generator when a memory index is calculated. An upper part of (a) illustrates operation of bit shuffling, and a lower part of (a) illustrates an example of bit shuffling in the case of 13 bits.

As illustrated in the figure, as a result of bit shuffling, a 13-bit binary word sequence used as a basic interleaving sequence of the frequency interleaver of 16K FFT mode may be changed to R or R'. The changed binary word sequence may be equally applied to data cells corresponding to every OFDM symbol pair, or applied differently per data cells corresponding to each of two OFDM symbols included in an OFDM symbol pair.

The equation illustrated in an upper part of (b) shows an initial value and a PP of the randomizer included in the above-described basic interleaving sequence generator. In this case, the PP may be a $13^{th}$ PP and the initial value may be changed to arbitrary values. That is, the equation illustrated in the upper part of the figure illustrates a binary word sequence which can be used to define the above-described basic interleaving sequence. The equation illustrated in a lower part of (b) shows a process for calculating an interleaving sequence (or an interleaving address) by the frequency interleaver using an output signal of the basic interleaving sequence generator. As shown in the equation, a symbol offset may be used to output the interleaving sequence, and modulo operation and address check operation are performed. As described above, one symbol offset may be equally applied to data cells corresponding to every OFDM symbol pair.

A description is now given of the frequency interleaver in a case when the FFT size is 32K.

The frequency interleaver according to an embodiment of the present invention may include the following logical structure in 32K FFT mode.

The basic interleaving sequence generator may include a 1-bit spreader and a 14-bit randomizer, and the symbol offset generator may include a k-bit spreader and a (15-k)-bit randomizer. The sizes of the spreader and the randomizer may vary depending on the intention of a designer.

Figures 48A, 48B:
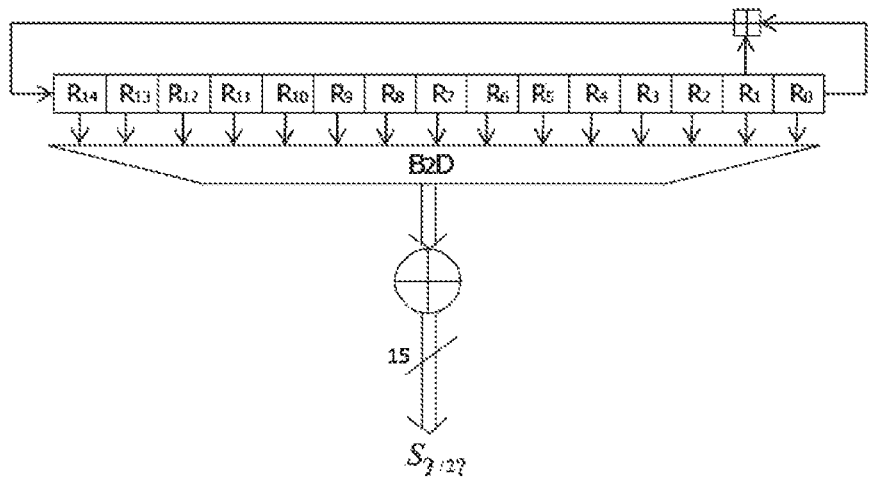
FIG. 48(a) and FIG. 48(b) illustrate a symbol offset generator of 32K FFT mode and equations showing operation of the symbol offset generator, according to an embodiment of the present invention.

FIG. 48 illustrates a symbol offset generator of 32K FFT mode and equations showing operation of the symbol offset generator, according to an embodiment of the present invention.

In this figure, (a) illustrates a symbol offset generator including a 0-bit spreader and a 15-bit randomizer, and (b) illustrates equations showing operation of the symbol offset generator of 32K FFT mode.

The symbol offset generator illustrated in (a) may operate in units of data cells corresponding to every OFDM symbol pair.

The equation illustrated in an upper part of (b) shows an initial value and a PP of the randomizer. In this case, the PP may be a $15^{th}$ PP and the initial value may be changed to arbitrary values.

The equation illustrated in a lower part of (b) shows a process for calculating and outputting a symbol offset for output signals of the spreader and the randomizer. As shown in the equation, the symbol offset generator may operate in units of data cells corresponding to every OFDM symbol pair. Therefore, a total length of output offsets corresponds to half of a total length of data symbols corresponding to OFDM symbols.

Figure 49A:
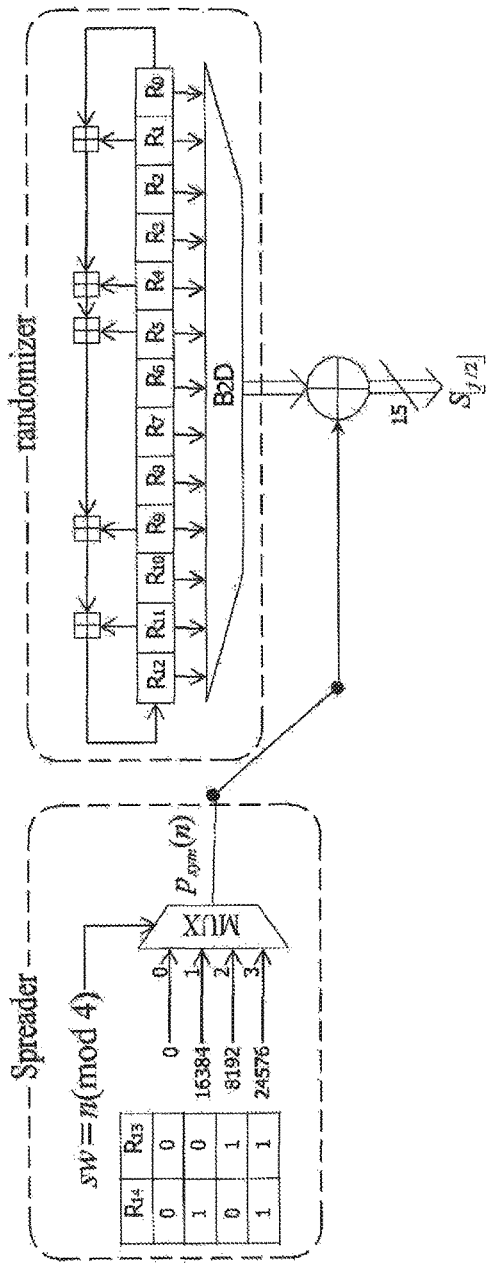
FIG. 49(a) and FIG. 49(b) illustrate a symbol offset generator of 32K FFT mode and equations showing operation of the symbol offset generator, according to another embodiment of the present invention.
Figure 49B:
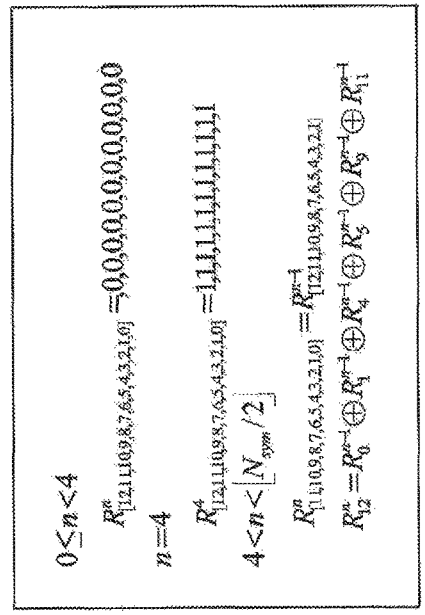

FIG. 49 illustrates a symbol offset generator of 32K FFT mode and equations showing operation of the symbol offset generator, according to another embodiment of the present invention.

In this figure, (a) illustrates a symbol offset generator including a 2-bit spreader and a 13-bit randomizer, and (b) illustrates equations showing operation of the symbol offset generator of 32K FFT mode.

The symbol offset generator illustrated in (a) may operate in units of an OFDM symbol pair.

The equation illustrated in an upper part of (b) shows an initial value and a PP of the randomizer. In this case, the PP may be a $13^1$ PP and the initial value may be changed to arbitrary values.

The equation illustrated in a lower part of (b) shows a process for calculating and outputting a symbol offset for output signals of the spreader and the randomizer. As shown in the equation, the symbol offset generator may operate in units of data cells corresponding to every OFDM symbol pair. Therefore, a total length of output offsets corresponds to half of a total length of data symbols corresponding to OFDM symbols.

Figure 50:
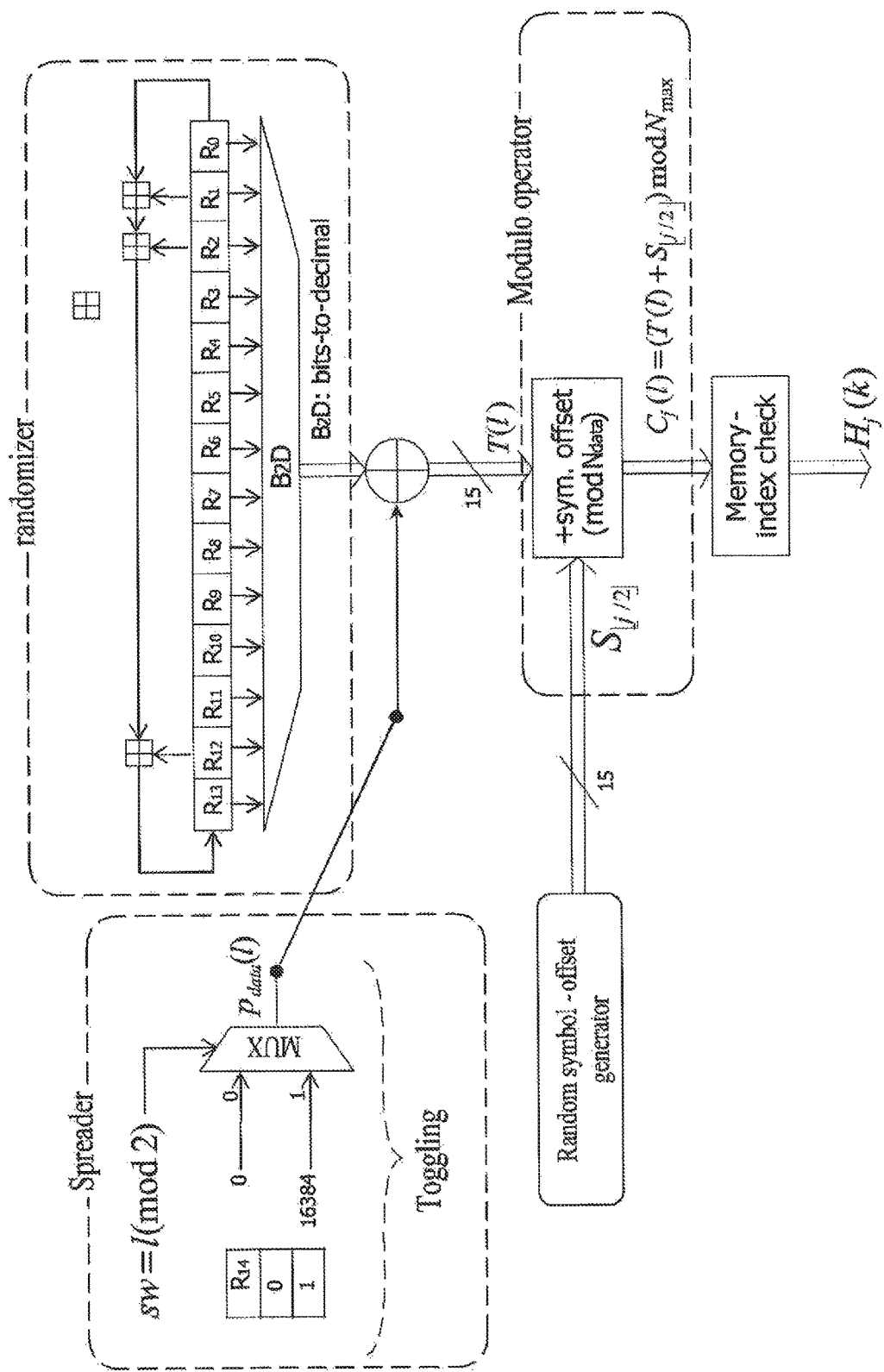
FIG. 50 illustrates a frequency interleaver of 32K FFT mode according to an embodiment of the present invention.

FIG. 50 illustrates a frequency interleaver of 32K FFT mode according to an embodiment of the present invention.

The frequency interleaver of 32K FFT mode according to an embodiment of the present invention may include a spreader (or a 1-bit toggle switch), a randomizer, a random symbol offset generator (or a symbol offset generator), a modulo operator, and a memory index check block to generate the above-described interleaving sequence or interleaving address. The spreader and the randomizer may be included in the above-described basic interleaving sequence generator, and the memory index check block may be called an address check block. The locations of the spreader and the randomizer and the name of the memory index check block may vary depending on the intention of a designer.

A description is now given of operation of each block.

The spreader may operate using upper n bits among a total of 15 bits, and may serve as a multiplexer based on a look-up table. In 32K FFT mode, the spreader may be a 1-bit multiplexer (or toggle switch). The randomizer operates using a PN (or pseudo random bit stream (PRBS)) generator and may provide a full randomness effect in interleaving. As described above, in 32K FFT mode, a PN (or PRBS) generator considering 14 bits may be used. The size of the PN (or PRBS) generator may vary depending on the intention of a designer.

The symbol offset generator may generate a symbol offset to be applied to every OFDM symbol pair. As illustrated in the figure, in the case of 32K, the symbol offset may be determined based on a bit sequence of 15 bits. The value of the symbol offset is constant for data cells corresponding to two consecutive symbols included in an OFDM symbol pair. A detailed description thereof has been given above and thus is omitted herein.

The modulo operator may operate if an input value exceeds $N_{data}$ or $N_{max}$. In 32K FFT mode, the maximum value of $N_{max}$ may be 32768.

If a currently generated value exceeds $N_{data}$ or the maximum value $N_{max}$ of $N_{data}$, the memory index check block may not use an output value of the modulo operator, and may repeatedly operate the spreader and the randomizer to control the output memory index value (or interleaving address) not to exceed $N_{data}$ or the maximum value $N_{max}$ of $N_{data}$.

FIG. 51 illustrates equations showing operation of the frequency interleaver of 32K FFT mode according to an embodiment of the present invention.

The equation illustrated in an upper part of the figure illustrates an initial value and a PP of the randomizer included in the above-described basic interleaving sequence generator. In this case, the PP may be a $14^{th}$ PP and the initial value may be changed to arbitrary values.

That is, the equation illustrated in the upper part of the figure illustrates a binary word sequence which can be used to define the above-described basic interleaving sequence.

The equation illustrated in a lower part of the figure illustrates a process for calculating an interleaving sequence (or an interleaving address) by the frequency interleaver using an output signal of the basic interleaving sequence generator. As shown in the equation, a symbol offset may be used to output the interleaving sequence, and modulo operation and address check operation are performed. As described above, one symbol offset may be equally applied to data cells corresponding to every OFDM symbol pair.

As described above, the symbol offset generator according to an embodiment of the present invention may include a k-bit spreader and an (X–k)-bit randomizer. The k-bit spreader operates using a $2^k$ multiplexer, and may be optimally designed to minimize spreading (or to minimize correlation) between symbols.

The randomizer operates using an N-bit PN generator (or an N-bit PRBS generator), and may be designed to provide randomness. The symbol offset generator of 32K FFT mode may include a 0/1/2-bit spreader and a 15/14/13-bit random number generator (or PN generator). The sizes of the spreader and the random number generator may vary depending on the intention of a designer.

Figure 52:
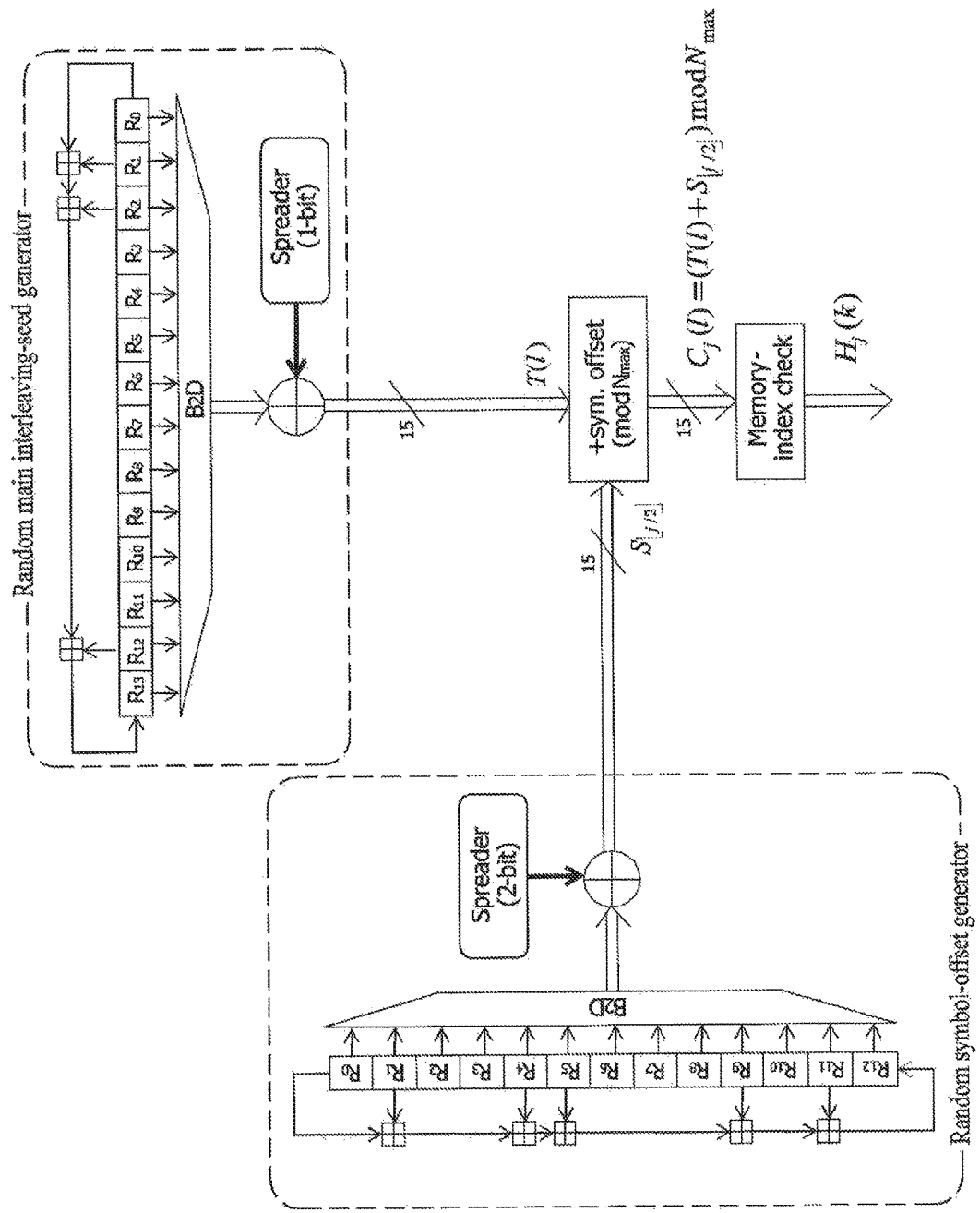
FIG. 52 illustrates the logical structure of the frequency interleaver of 32K FFT mode according to an embodiment of the present invention.

FIG. 52 illustrates the logical structure of the frequency interleaver of 32K FFT mode according to an embodiment of the present invention.

As described above, the frequency interleaver of 32K FFT mode according to an embodiment of the present invention may include a basic interleaving sequence generator, a symbol offset generator, a modulo operator, and a memory index check block.

Detailed descriptions thereof have been given above and thus are omitted herein.

A description is now given of a frequency interleaver of 32K FFT mode according to another embodiment of the present invention. The frequency interleaver of 32K FFT mode according to another embodiment of the present invention is different from the above-described frequency interleaver in that a randomizer of a basic interleaving sequence further performs bit shuffling.

Figure 53:
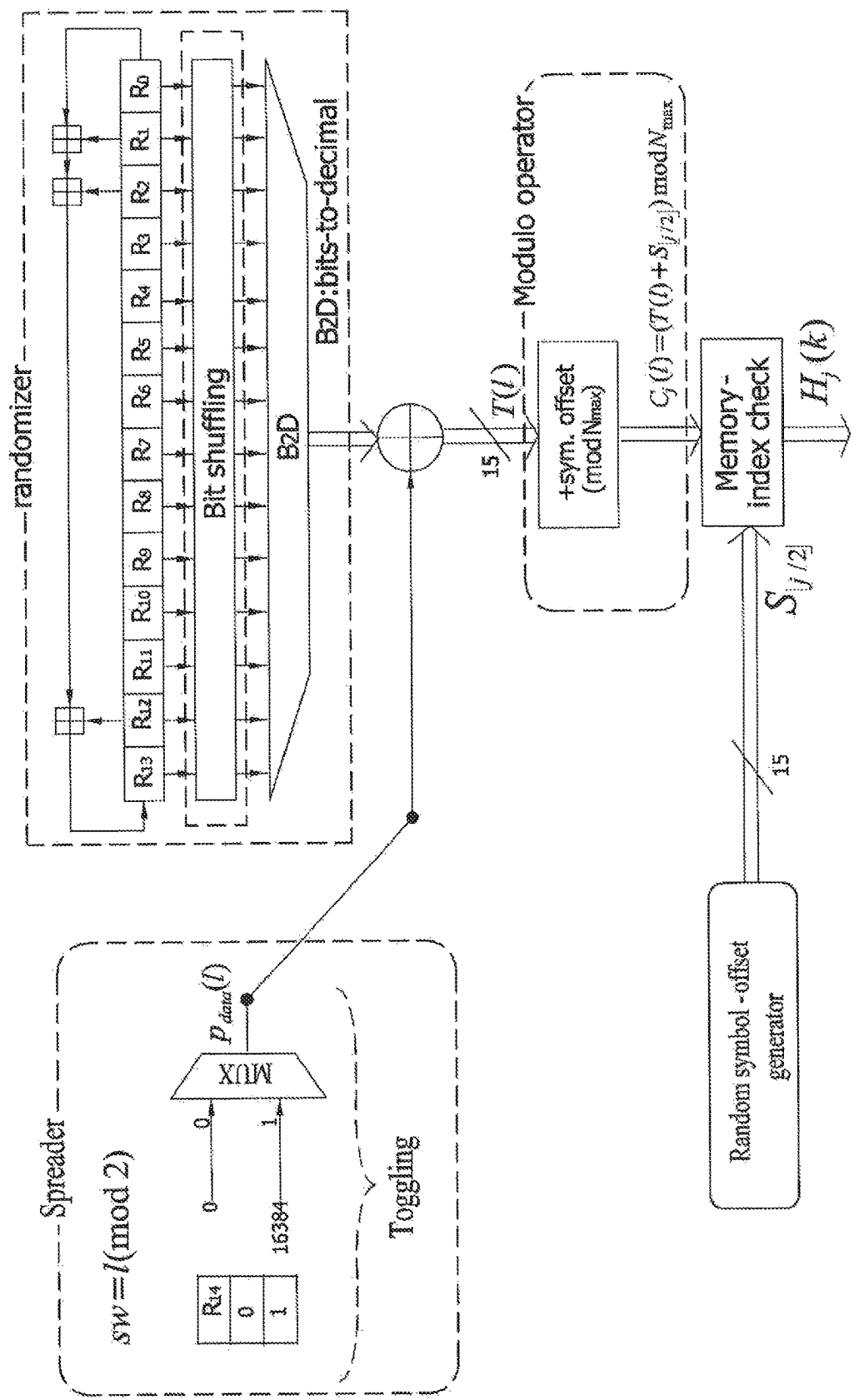
FIG. 53 illustrates a frequency interleaver of 32K FFT mode according to another embodiment of the present invention.

FIG. 53 illustrates a frequency interleaver of 32K FFT mode according to another embodiment of the present invention.

The frequency interleaver of 32K FFT mode according to another embodiment of the present invention may include a basic interleaving sequence generator, a symbol offset generator, a modulo operator, and a memory index check block to generate the above-described interleaving sequence or interleaving address, and the basic interleaving sequence generator performs bit shuffling. Detailed descriptions of operations other than bit shuffling have been given above and thus are omitted herein.

Bit shuffling is performed to optimize spreading or randomness, and is designed in consideration of $N_{data}$. In 32K FFT mode, the randomizer may use a 14-bit PN generator, and the size of the PN generator may vary.

FIG. 54 illustrates bit shuffling of the frequency interleaver of 32K FFT mode and equations showing operation of the frequency interleaver, according to an embodiment of the present invention.

In this figure, (a) illustrates the above-described bit shuffling of 32K FFT mode, and (b) illustrates equations showing operation of the frequency interleaver of 32K FFT mode.

As illustrated in (a), bit shuffling of 32K FFT mode may be used to shuffle bits of registers of a PN generator when a memory index is calculated. An upper part of (a) illustrates operation of bit shuffling, and a lower part of (a) illustrates an example of bit shuffling in the case of 14 bits.

As illustrated in the figure, as a result of bit shuffling, a 14-bit binary word sequence used as a basic interleaving sequence of the frequency interleaver of 32K FFT mode may be changed to R or R'. The changed binary word sequence may be equally applied to data cells corresponding to every OFDM symbol pair, or applied differently to data cells corresponding to each of two OFDM symbols included in an OFDM symbol pair.

The equation illustrated in an upper part of (b) shows an initial value and a PP of the randomizer included in the above-described basic interleaving sequence generator. In this case, the PP may be a $14^{th}$ PP and the initial value may be changed to arbitrary values. That is, the equation illustrated in the upper part of the figure illustrates a binary word sequence which can be used to define the above-described basic interleaving sequence. The equation illustrated in a lower part of (b) shows a process for calculating an interleaving sequence (or an interleaving address) by the frequency interleaver using an output signal of the basic interleaving sequence generator. As shown in the equation, a symbol offset may be used to output the interleaving sequence, and modulo operation and address check operation are performed. As described above, one symbol offset may be equally applied to data cells corresponding to every OFDM symbol pair.

A description is now given of a frequency interleaver of 32K FFT mode according to another embodiment of the present invention.

As described above, the frequency interleaver of 32K FFT mode according to the present invention may apply the same interleaving sequence or interleaving address to data (or data cells) corresponding to an OFDM symbol pair. In this case, the frequency interleaver of 32K FFT mode according to an embodiment of the present invention may write data cells corresponding to an even symbol of the OFDM symbol pair, to memory using the interleaving sequence, and read data cells corresponding to an odd symbol of the OFDM symbol pair, from the memory using the interleaving sequence. In addition, the write operation and the read operation of the frequency interleaver according to an embodiment of the present invention are consecutively performed on input data cells and may be performed simultaneously. That is, if data cells corresponding to an odd symbol are input after data cells corresponding to an even symbol are randomly written to memory, the frequency interleaver according to an embodiment of the present invention may linearly read the written data cells corresponding to the even symbol and, at the same time, linearly write the input data cells corresponding to the odd symbol to the memory. After that, the data cells corresponding to the odd symbol which are written to the memory may be randomly read. In addition, since the frequency interleaver according to an embodiment of the present invention operates for data cells corresponding to an OFDM symbol pair, the number of symbols corresponding to OFDM symbols in a signal frame is always an even number.

The frequency interleaver of 32K FFT mode according to the present invention may use a different interleaving sequence per data cells corresponding to every OFDM symbol pair, thereby improving randomness and maximizing diversity performance. Specifically, the frequency interleaver of 32K FFT mode according to the present invention may generate a different interleaving sequence per data cells corresponding to every OFDM symbol pair by rotating a basic interleaving sequence by a symbol offset. In this case, the symbol offset may be generated differently per data cells corresponding to every OFDM symbol pair. Accordingly, since the transmitter linearly reads data cells corresponding to an even symbol of an OFDM symbol pair and linearly writes data cells corresponding to an odd symbol of the OFDM symbol pair in a frequency interleaving process, the broadcast signal reception apparatus or the frequency deinterleaver included in the broadcast signal reception apparatus according to an embodiment of the present invention may perform frequency deinterleaving using a single memory. The maximum memory size required in this case may be 32K.

FIG. 55 illustrates an equation showing operation of the frequency interleaver of 32K FFT mode according to the present invention.

A block of an upper part of the figure illustrates an equation showing frequency interleaving input and output for data cells corresponding to an even symbol and data cells corresponding to an odd symbol of an OFDM symbol pair.

A left part shows output data obtained by performing frequency interleaving (interleaved vector) and a right part shows input data cells for frequency interleaving (interleaver input vector). In the figure, $X_{m,l,p}$ may indicate a cell index p to be mapped to an $l^{th}$ OFDM symbol of an $m^{th}$ frame, and $X_{m,l,H(p)}$ indicates that the cell index p to be mapped to the $l^{th}$ OFDM symbol of the $m^{th}$ frame is read based on an interleaving address (or interleaving sequence).

That is, the equation illustrated in the figure illustrates that data cells corresponding to an even symbol of an OFDM symbol pair are written to memory using an interleaving sequence, and data cells corresponding to an odd symbol are read based on the interleaving sequence.

A block of a lower part of the figure illustrates an interleaving sequence applied per OFDM symbol pair. As illustrated in the figure, the interleaving sequence may be calculated using a symbol offset and the value of Nmax. The size of Nmax is as described above.

A description is now given of a frequency interleaver of 16K FFT mode according to another embodiment of the present invention.

The frequency interleaver of 16K FFT mode according to the present invention may apply the same interleaving sequence to cells corresponding to an OFDM symbol pair. In this case, like the frequency interleaver of 32K FFT mode, the frequency interleaver of 16K FFT mode according to an embodiment of the present invention may write data cells corresponding to an even symbol of the OFDM symbol pair, to memory using the interleaving sequence, and read data cells corresponding to an odd symbol of the OFDM symbol pair, from the memory using the interleaving sequence. Operation of the frequency interleaver of 16K FFT mode is the same as the operation of the frequency interleaver of 32K FFT mode, and thus a detailed description thereof is omitted herein. As a result, the frequency interleaver of 16K FFT mode according to the present invention may enable frequency deinterleaving using a single memory at the receiver side, and the maximum memory size required in this case may be 16K.

In addition, the frequency interleaver of 16K FFT mode according to an embodiment of the present invention may perform frequency interleaving by applying a different interleaving sequence per data cells corresponding to each OFDM symbol. In this case, the frequency interleaver of 16K FFT mode according to an embodiment of the present invention may apply the interleaving sequence to randomly read data cells corresponding to an input symbol from memory, and there is no restriction on the number of OFDM symbols in a frame. In addition, even when a different interleaving sequence is applied per data cells corresponding to each OFDM symbol, the frequency interleaver of 16K FFT mode according to the present invention may generate the different interleaving sequence per data cells corresponding to each OFDM symbol by rotating a basic interleaving sequence by a symbol offset. In this case, the symbol offset may be generated differently per data cells corresponding to every OFDM symbol pair.

In this case, the receiver side may perform frequency deinterleaving using double memories. The maximum memory size required in this case may be 32K.

FIG. 56 illustrates equations showing operation of the frequency interleaver of 16K FFT mode according to the present invention.

In this figure, (a) illustrates an equation showing operation in a case when the frequency interleaver of 16K FFT mode according to the present invention applies the same interleaving sequence to data cells corresponding to an OFDM symbol pair, and showing frequency interleaving input and output for data cells corresponding to an even symbol and data cells corresponding to an odd symbol of an OFDM symbol pair.

In this figure, (b) illustrates an equation showing frequency interleaving input and output in a case when the frequency interleaver of 16K FFT mode according to the present invention performs read operation by applying a different interleaving sequence per data cells corresponding to each OFDM symbol.

Specifically, a left part of the equation shows output data obtained by performing frequency interleaving (interleaved vector) and a right part shows input data cells for frequency interleaving (interleaver input vector).

In the figure, $X_{m,l,p}$ may indicate a cell index p to be mapped to an $l^{th}$ OFDM symbol of an $m^{th}$ frame, and $X_{m,l,H(p)}$ indicates that the cell index p to be mapped to the $l^{th}$ OFDM symbol of the $m^{th}$ frame is read based on an interleaving address (or interleaving sequence).

Accordingly, the equation illustrated in (a) shows that data cells corresponding to an even symbol of an OFDM symbol pair are written to memory using an interleaving sequence, and data cells corresponding to an odd symbol are read based on the interleaving sequence.

In addition, the equation illustrated in (b) shows a process for reading data cells corresponding to each OFDM symbol using an interleaving sequence.

A block of a lower part of (a) or (b) shows an interleaving sequence applied per OFDM symbol pair. As illustrated in the figure, the interleaving sequence may be calculated using a symbol offset and the value of Nmax. The size of Nmax is as described above.

A description is now given of a frequency interleaver of 8K FFT mode according to another embodiment of the present invention.

The frequency interleaver of 8K FFT mode according to the present invention may apply a different interleaving sequence per data cells corresponding to each OFDM symbol. In this case, the frequency interleaver of 8K FFT mode according to an embodiment of the present invention may apply the interleaving sequence to randomly read data cells corresponding to an input symbol from memory, and there is no restriction on the number of OFDM symbols in a frame. In addition, even when a different interleaving sequence is applied per data cells corresponding to each OFDM symbol, the frequency interleaver of 8K FFT mode according to the present invention may generate the different interleaving sequence per data cells corresponding to each OFDM symbol by rotating a basic interleaving sequence by a symbol offset. In this case, the symbol offset may be generated differently per data cells corresponding to every OFDM symbol pair.

In addition, the receiver side may perform frequency deinterleaving using double memories. The maximum memory size required in this case may be 16K.

FIG. 57 illustrates an equation showing operation of the frequency interleaver of 8K FFT mode according to the present invention.

The equation illustrated in an upper part of the figure illustrates frequency interleaving input and output in a case when the frequency interleaver of 8K FFT mode according to the present invention performs read operation by applying a different interleaving sequence per data cells corresponding to each OFDM symbol.

Specifically, a left part of the equation shows output data obtained by performing frequency interleaving (interleaved vector) and a right part shows input data cells for frequency interleaving (interleaver input vector).

In the figure, $X_{m,l,H(p)}$ indicates that a cell index p to be mapped to an $l^{th}$ OFDM symbol of an $m^{th}$ frame is read based on an interleaving address (or interleaving sequence).

Accordingly, the equation illustrated in the upper part of the figure illustrates a process for reading data cells corresponding to each OFDM symbol using an interleaving sequence.

A block of a lower part of the figure illustrates an interleaving sequence applied per OFDM symbol pair. As illustrated in the figure, the interleaving sequence may be calculated using a symbol offset and the value of Nmax. The size of Nmax is as described above.

FIG. 58 illustrates equations showing input and output of a frequency interleaver based on each FFT mode.

The equation illustrated in a block of an upper part of the figure illustrates the relationship between input and output of the frequency interleaver of 32K FFT mode and 16K FFT mode, and shows a case in which one interleaving sequence is applied to data cells corresponding to one OFDM symbol pair.

The equation illustrated in a block of a lower part of the figure illustrates the relationship between input and output of the frequency interleaver of 16K FFT mode and 8K FFT mode, and shows a case in which one interleaving sequence is applied to data cells corresponding to one OFDM symbol.

As described above, a left part shows an interleaved vector output from the frequency interleaver and a right part shows an input data vector (or an input vector) input to the frequency interleaver.

Figure 59:
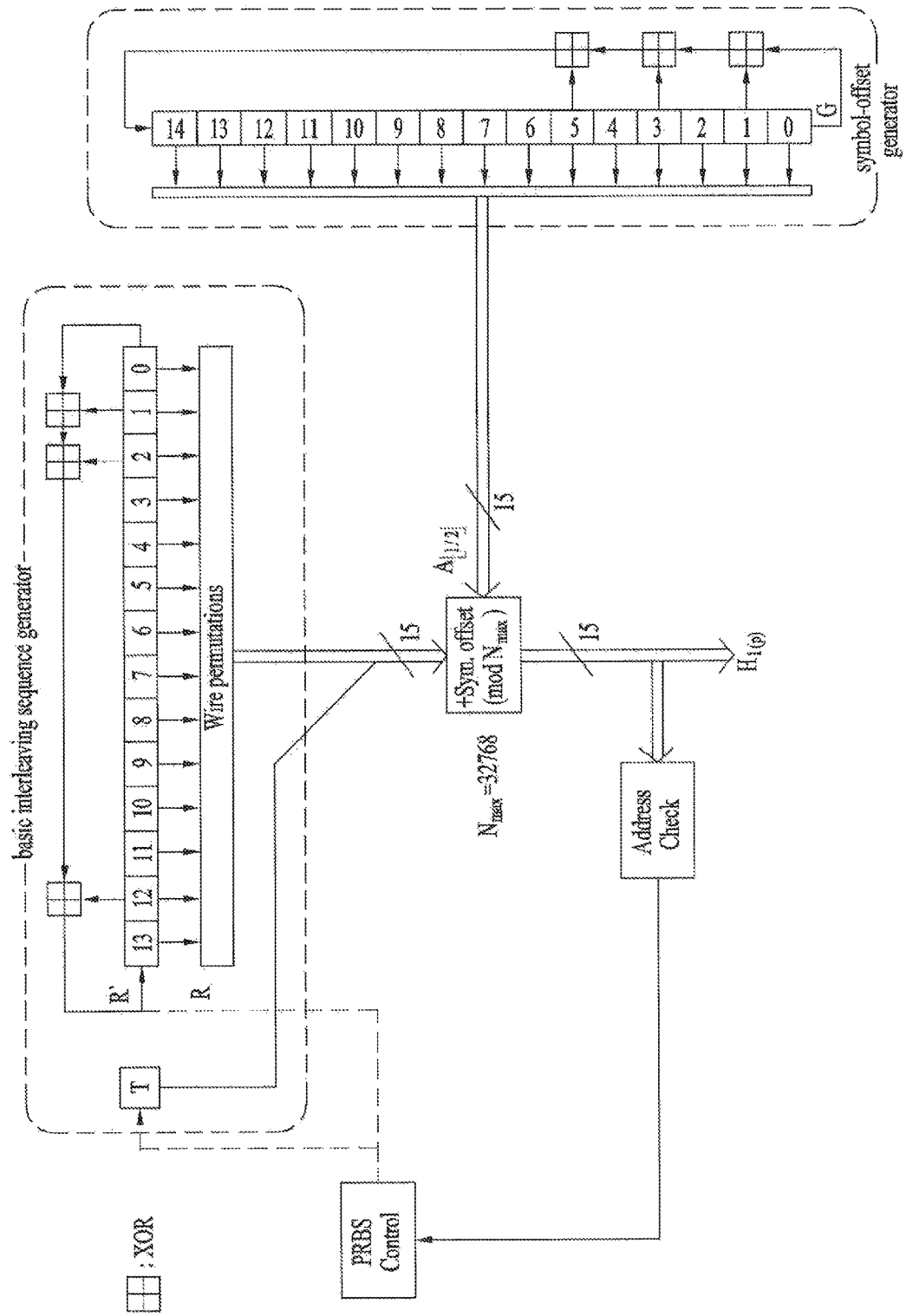
FIG. 59 illustrates a frequency interleaver of 32K FFT mode according to another embodiment of the present invention.

FIG. 59 illustrates a frequency interleaver of 32K FFT mode according to another embodiment of the present invention.

As described above, the frequency interleaver of 32K FFT mode may interleave an input OFDM symbol pair using an interleaving sequence or interleaving address. The frequency interleaver of 32K FFT mode illustrated in FIG. 59 may include a basic interleaving sequence generator, a symbol offset generator, a modulo operator, and an address check block to generate the above-described interleaving sequence or interleaving address. FIG. 59 corresponds to another embodiment of the frequency interleaver described above in relation to FIGS. 50, 52, and 53. A description is now given of each block.

The basic interleaving sequence generator may include a basic random address generator and a wire permutation block. The basic random address generator may include a 1-bit toggle switch and a 14-bit PN generator and may operate to generate quasi-randomness in interleaving. The wire permutation block may change the order of bits when a decimal address is generated using the value of a PRBS register. In this case, the wire permutation block may change the order of bits using a preset wire permutation table. In 32K FFT mode, the same wire permutation table may be used for data cells corresponding to symbols included in an OFDM symbol pair. A detailed description thereof will be given below.

The symbol offset generator operates in units of an OFDM symbol pair and may generate a symbol offset for cyclically shifting a basic interleaving sequence output from the basic interleaving sequence generator.

The modulo operator operates if output data exceeds Nmax, and the value of Nmax in the case of 32K may be 32768.

The address check block and a PRBS controller do not use but ignore an output value $H_l(p)$, i.e., an interleaving sequence (or interleaving address), of 15 bits if the output value is greater than an input data vector size Ndata, and may repeatedly control operation of the basic interleaving sequence generator to allow the interleaving address value not to exceed Nmax.

As described above, the modulo operator may operate prior to the address check block. This serves to allow the receiver to perform deinterleaving using a single memory even when the OFDM symbol pair has different sizes of data vectors (or data cells).

Figure 60:
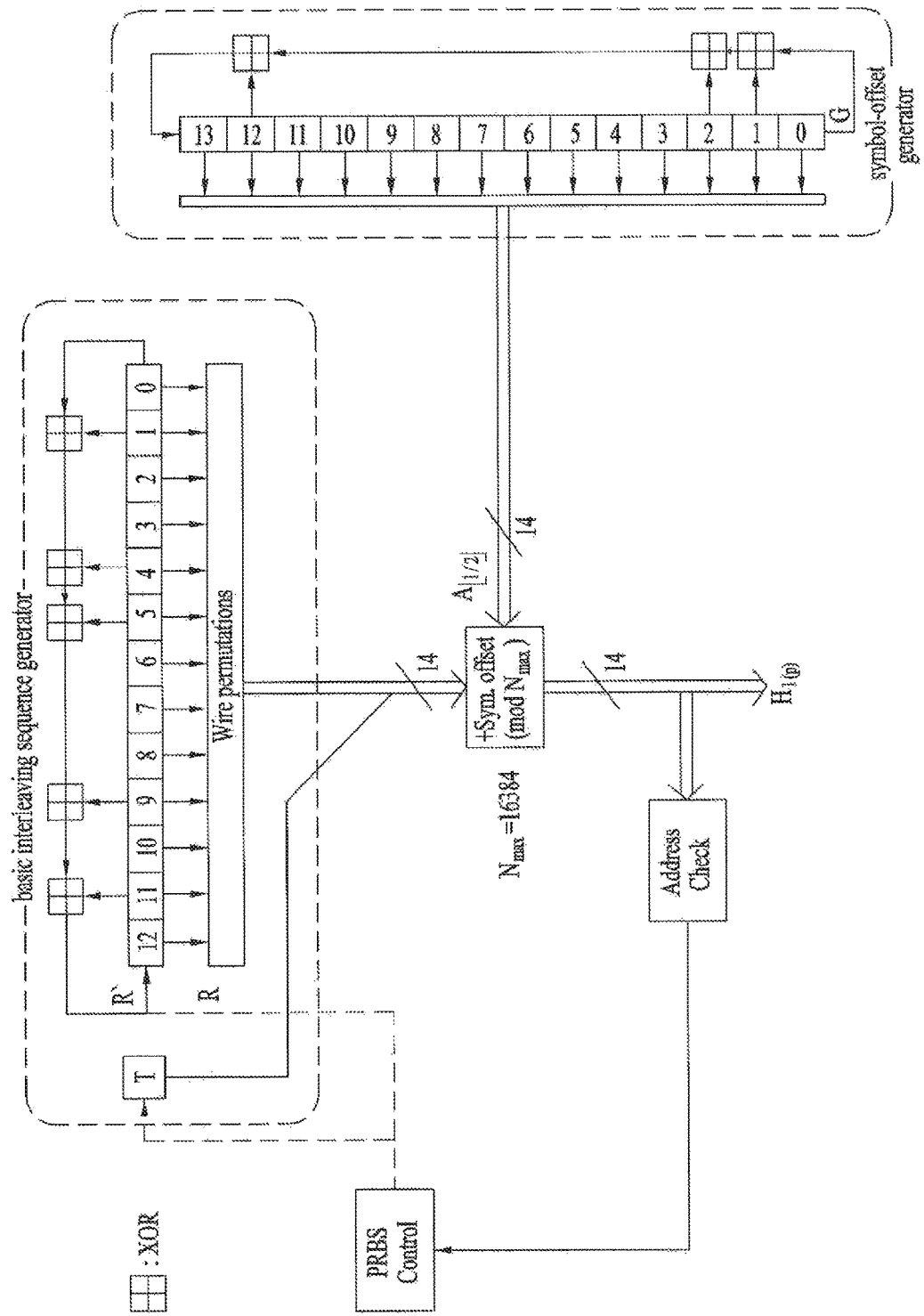
FIG. 60 illustrates a frequency interleaver of 16K FFT mode according to another embodiment of the present invention.

FIG. 60 illustrates a frequency interleaver of 16K FFT mode according to another embodiment of the present invention.

As described above, the frequency interleaver of 16K FFT mode may interleave an input OFDM symbol pair or data cells corresponding to an input OFDM symbol using an interleaving sequence or interleaving address. The frequency interleaver of 16K FFT mode illustrated in FIG. 60 may include a basic interleaving sequence generator, a symbol offset generator, a modulo operator, and an address check block to generate the above-described interleaving sequence or interleaving address. FIG. 60 corresponds to another embodiment of the frequency interleaver described above in relation to FIGS. 43, 45, and 46. A description is now given of each block.

The basic interleaving sequence generator may include a basic random address generator and a wire permutation block. The basic random address generator may include a 1-bit toggle switch and a 13-bit PN generator and may operate to generate quasi-randomness in interleaving. The wire permutation block may change the order of bits when a decimal address is generated using the value of a PRBS register. In this case, the wire permutation block may change the order of bits using a preset wire permutation table. In 16K FFT mode, the same wire permutation table may be used for data cells corresponding to symbols included in an OFDM symbol pair, or a different wire permutation table may be used per data cells corresponding to each symbol included in an OFDM symbol pair. A detailed description thereof will be given below.

The symbol offset generator operates in units of an OFDM symbol pair and may generate a symbol offset for cyclically shifting a basic interleaving sequence output from the basic interleaving sequence generator.

The modulo operator operates if output data exceeds Nmax, and the value of Nmax in the case of 16K may be 16384.

The address check block and a PRBS controller do not use but ignore an output value $H_j(p)$, i.e., an interleaving sequence (or interleaving address), of 14 bits if the output value is greater than an input data vector size Ndata, and may repeatedly control operation of the basic interleaving sequence generator to allow the interleaving address value not to exceed Nmax.

As described above, the modulo operator may operate prior to the address check block. This serves to allow the receiver to perform deinterleaving using a single memory even when the OFDM symbol pair has different sizes of data vectors (data cells).

Figure 61:
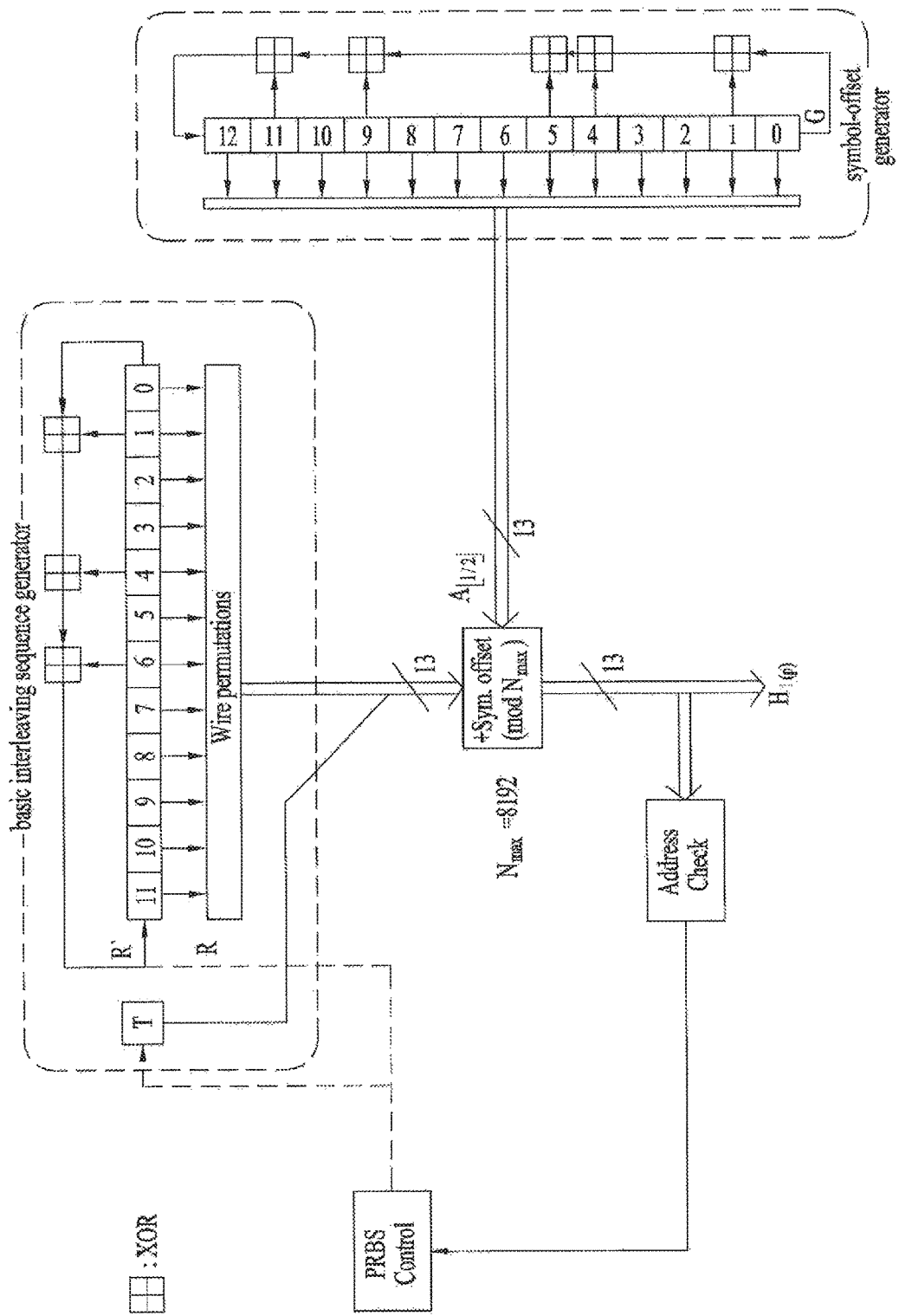
FIG. 61 illustrates a frequency interleaver of 8K FFT mode according to another embodiment of the present invention.

FIG. 61 illustrates a frequency interleaver of 8K FFT mode according to another embodiment of the present invention.

As described above, the frequency interleaver of 8K FFT mode may interleave an input symbol using an interleaving sequence or interleaving address. The frequency interleaver of 8K FFT mode illustrated in FIG. 61 may include a basic interleaving sequence generator, a symbol offset generator, a modulo operator, and an address check block to generate the above-described interleaving sequence or interleaving address. FIG. 61 corresponds to another embodiment of the frequency interleaver described above in relation to FIGS. 36, 38, and 39. A description is now given of each block.

The basic interleaving sequence generator may include a basic random address generator and a wire permutation block. The basic random address generator may include a 1-bit toggle switch and a 12-bit PN generator and may operate to generate quasi-randomness in interleaving. The wire permutation block may change the order of bits when a decimal address is generated using the value of a PRBS register. In this case, the wire permutation block may change the order of bits using a preset wire permutation table. In 8K FFT mode, a different wire permutation table may be used per data cells corresponding to each symbol included in an OFDM symbol pair. A detailed description thereof will be given below.

The symbol offset generator operates in units of an OFDM symbol pair and may generate a symbol offset for cyclically shifting a basic interleaving sequence output from the basic interleaving sequence generator.

The modulo operator operates if output data exceeds Nmax, and the value of Nmax in the case of 8K may be 8192.

The address check block and a PRBS controller do not use but ignore an output value $H_j(p)$, i.e., an interleaving sequence (or interleaving address), of 13 bits if the output value is greater than an input data vector size Ndata, and may repeatedly control operation of the basic interleaving sequence generator to allow the interleaving address value not to exceed Nmax.

As described above, the modulo operator may operate prior to the address check block. This serves to allow the receiver to perform deinterleaving using a single memory even when the OFDM symbol pair has different sizes of data vectors.

FIG. 62 illustrates wire permutation tables according to embodiments of the present invention.

The first row of each table shows bit positions of an input bit sequence, and the second and third rows show bit positions changed through permutation.

In this figure, (a) illustrates an exemplary wire permutation table in 32K FFT mode, which is equally applied to data cells corresponding to symbols included in an input OFDM symbol pair.

In this figure, (b) illustrates an exemplary wire permutation table in 16K FFT mode, which is equally applied to data cells corresponding to symbols included in an input OFDM symbol pair.

In this figure, (c) illustrates another exemplary wire permutation table in 16K FFT mode, which is applied differently to data cells corresponding to each input OFDM symbol pair. As illustrated in the figure, the second row shows changed bit positions of data cells corresponding to an even symbol of the input OFDM symbol pair, and the third row shows changed bit positions of data cells corresponding to an odd symbol of the input OFDM symbol pair.

In this figure, (d) illustrates an exemplary wire permutation table in 8K FFT mode, which is applied differently to data cells corresponding to each input OFDM symbol pair. A description of this table is the same as that of the above table of (c), and thus is omitted herein.

Each bit position may vary depending on the intention of a designer.

FIG. 63 illustrates an equation showing operation of the basic interleaving sequence generator according to an embodiment of the present invention.

As described above, the basic interleaving sequence generator according to an embodiment of the present invention may generate a binary word R' having a different size of bits per FFT mode. FIG. 63 illustrates an equation showing a process for generating the binary word. This may be changed to an arbitrary PRBS. The basic interleaving sequence generator according to an embodiment of the present invention may generate a basic interleaving sequence by performing wire permutation and toggling on the generated binary word R'.

FIG. 64 illustrates an equation showing operation of the symbol offset generator according to an embodiment of the present invention.

As described above, the symbol offset generator according to an embodiment of the present invention may generate a symbol offset for each OFDM symbol pair, and the generated symbol offset has a constant value for data cells corresponding to two symbols included in the OFDM symbol pair. In addition, the symbol offset generator may generate a binary word $G_k$ having a specific value per FFT mode. This may be changed to an arbitrary PRBS.

FIG. 65 illustrates equations showing an interleaving address according to an embodiment of the present invention.

The frequency interleaver according to the present invention may generate an interleaving address $H_l(p)$ using the above-described basic interleaving sequence and the symbol offset.

The equation illustrated in an upper part of the figure illustrates a process for generating the interleaving address, and the equation illustrated in a lower part of the figure illustrates the symbol offset. These equations may vary depending on the intention of a designer.

A description is now given of a frequency interleaver of 16K FFT mode according to another embodiment of the present invention.

The frequency interleaver of 16K FFT mode according to the present invention may apply a different interleaving sequence per data cells corresponding to each OFDM symbol. In this case, the frequency interleaver of 16K FFT mode according to an embodiment of the present invention may apply the interleaving sequence to randomly read data cells corresponding to an input symbol from memory, and there is no restriction on the number of OFDM symbols in a frame. In addition, even when a different interleaving sequence is applied per OFDM symbol, the frequency interleaver of 16K FFT mode according to the present invention may generate the different interleaving sequence per OFDM symbol by rotating a basic interleaving sequence by a symbol offset. In this case, the symbol offset may have a constant value for cells corresponding to every OFDM symbol pair.

As a result, the frequency interleaver of 16K FFT mode according to the present invention may enable frequency deinterleaving using a single memory at the receiver side, and the maximum memory size required in this case may be 16K.

FIG. 66 illustrates an equation showing a frequency interleaver of 16K FFT mode according to another embodiment of the present invention.

FIG. 66 corresponds to another embodiment of the frequency interleaver of 16K FFT mode, which is described above in relation to FIG. 56. A description is now given of each block. This figure illustrates an equation showing frequency interleaving input and output in a case when the frequency interleaver of 16K FFT mode according to the present invention applies a different interleaving sequence per data cells corresponding to each OFDM symbol to randomly write the same to memory.

Specifically, a left part of the equation shows output data obtained by performing frequency interleaving (interleaved vector) and a right part shows input data cells for frequency interleaving (interleaver input vector).

In the figure, $X_{m,l,p}$ indicates a cell index p in an OFDM symbol of an $m^{th}$ frame.

As illustrated in the figure, the interleaving sequence may be calculated using a symbol offset and the value of Nmax. The size of Nmax is as described above.

In addition, the receiver side may perform frequency deinterleaving using double memories. The maximum memory size required in this case may be 32K.

A description is now given of a frequency interleaver of 8K FFT mode according to another embodiment of the present invention.

The frequency interleaver of 8K FFT mode according to the present invention may apply the same interleaving sequence to data cells corresponding to an OFDM symbol pair. In this case, like the above-described frequency interleaver of 32K FFT mode, the frequency interleaver of 8K FFT mode according to an embodiment of the present invention may use the interleaving sequence to write data cells corresponding to an even symbol of the OFDM symbol pair, and use the interleaving sequence to read data cells corresponding to an odd symbol of the OFDM symbol pair. Operation of the frequency interleaver of 8K FFT mode is the same as the operation of the frequency interleaver of 32K FFT mode, and thus a detailed description thereof is omitted herein. As a result, the frequency interleaver of 8K FFT mode according to the present invention may enable frequency deinterleaving using a single memory at the receiver side, and the maximum memory size required in this case may be 8K.

Furthermore, the frequency interleaver of 8K FFT mode according to an embodiment of the present invention may apply the interleaving sequence to randomly write data cells corresponding to an input symbol, and there is no restriction on the number of OFDM symbols in a frame. In addition, even when a different interleaving sequence is applied per OFDM symbol, the frequency interleaver of 8K FFT mode according to the present invention may generate the different interleaving sequence per OFDM symbol by rotating a basic interleaving sequence by a symbol offset. In this case, the symbol offset may be generated differently per OFDM symbol pair.

In this case, the receiver side may perform frequency deinterleaving using double memories, and the maximum memory size required in this case may be 16K.

FIG. 67 illustrates equations showing operation of the frequency interleaver of 8K FFT mode according to another embodiment of the present invention.

FIG. 67 corresponds to another embodiment of the frequency interleaver of 8K FFT mode, which is described above in relation to FIG. 57.

In this figure, (a) illustrates an equation showing operation in a case when the frequency interleaver of 8K FFT mode according to the present invention applies the same interleaving sequence to data cells corresponding to an OFDM symbol pair, and showing frequency interleaving input and output for data cells corresponding to an even symbol and data cells corresponding to an odd symbol of an OFDM symbol pair.

In this figure, (b) illustrates an equation showing frequency interleaving input and output in a case when the frequency interleaver of 8K FFT mode according to the present invention performs write operation by applying a different interleaving sequence per data cells corresponding to each OFDM symbol.

Specifically, a left part of the equation shows output data obtained by performing frequency interleaving (interleaved vector) and a right part shows input data cells for frequency interleaving (interleaver input vector).

In the figure, $X_{m,l,p}$ may indicate a cell index p to be mapped to an $l^{th}$ OFDM symbol of an $m^{th}$ frame, and $X_{m,l,H(p)}$ indicates that the cell index p to be mapped to the $l^{th}$ OFDM symbol of the $m^{th}$ frame is read based on an interleaving address (or interleaving sequence).

Accordingly, the equation illustrated in (a) shows that data cells corresponding to an even symbol of an OFDM symbol pair are written to memory using an interleaving sequence, and data cells corresponding to an odd symbol are read based on the interleaving sequence.

In addition, the equation illustrated in (b) shows a process for writing data cells corresponding to each OFDM symbol using an interleaving sequence.

A block of a lower part of (a) or (b) shows an interleaving sequence applied per OFDM symbol pair. As illustrated in the figure, the interleaving sequence may be calculated using a symbol offset and the value of Nmax. The size of Nmax is as described above.

FIG. 68 illustrates an equation showing input and output of a frequency interleaver based on each FFT mode.

The equation illustrated in a block of the figure illustrates the relationship between input and output of the frequency interleaver of 16K FFT mode and 8K FFT mode, and shows a case in which one interleaving sequence is applied to data cells corresponding to one OFDM symbol. As described above, a left part shows an interleaved vector output from the frequency interleaver and a right part shows an input data vector (or an input vector) input to the frequency interleaver.

FIG. 69 illustrates equations showing operation of the frequency interleaver based on an FFT mode according to an embodiment of the present invention.

FIG. 69 corresponds to another embodiment of the above-described equations showing operation of the frequency interleaver of 32K, 16K, or 8K FFT mode. In this figure, (a) illustrates an equation showing operation of the frequency interleaver of 32K FFT mode according to an embodiment of the present invention, and (b) illustrates an equation showing operation of the frequency interleaver of 16K or 8K FFT mode according to an embodiment of the present invention.

A left part of the equation illustrated in (a) or (b) shows output data obtained by performing frequency interleaving (interleaved data cells corresponding to an OFDM symbol) and a right part shows input data cells for frequency interleaving.

Specifically, (a) illustrates an equation in a case when the frequency interleaver of 32K FFT mode according to the present invention applies the same interleaving sequence or interleaving address to data (or data cells) corresponding to an OFDM symbol pair. As described above, the frequency interleaver of 32K FFT mode according to an embodiment of the present invention may write data cells corresponding to an even symbol of the OFDM symbol pair, to memory using the interleaving sequence, and read data cells corresponding to an odd symbol of the OFDM symbol pair, from the memory using the interleaving sequence. In this case, the number of symbols corresponding to OFDM symbols in a signal frame is always an even number.

The frequency interleaver of 32K FFT mode according to the present invention may use a different interleaving sequence per data cells corresponding to every OFDM symbol pair, thereby improving randomness and maximizing diversity performance. Specifically, the frequency interleaver of 32K FFT mode according to the present invention may generate a different interleaving sequence per data cells corresponding to every OFDM symbol pair by rotating a basic interleaving sequence by a symbol offset. In this case, the symbol offset may be generated differently per data cells corresponding to every OFDM symbol pair.

Accordingly, since the transmitter linearly reads data cells corresponding to an even symbol of an OFDM symbol pair and linearly writes data cells corresponding to an odd symbol of the OFDM symbol pair in a frequency interleaving process, the broadcast signal reception apparatus or the frequency deinterleaver included in the broadcast signal reception apparatus according to an embodiment of the present invention may perform frequency deinterleaving using a single memory. The maximum memory size required in this case may be 32K.

In this figure, (b) shows that the frequency interleaver of 16K or 8K FFT mode according to the present invention may perform frequency interleaving by applying a different interleaving sequence per data cells corresponding to each OFDM symbol. In this case, the frequency interleaver of 16K or 8K FFT mode according to an embodiment of the present invention may apply the interleaving sequence to randomly read data cells corresponding to an input symbol from memory, and there is no restriction on the number of OFDM symbols in a frame. In addition, even when a different interleaving sequence is applied per data cells corresponding to each OFDM symbol, the frequency interleaver of 16K or 8K FFT mode according to the present invention may generate the different interleaving sequence per data cells corresponding to each OFDM symbol by rotating a basic interleaving sequence by a symbol offset. In this case, the symbol offset may be generated differently per data cells corresponding to every OFDM symbol pair.

In this case, the receiver side may perform frequency deinterleaving using double memories. The maximum memory size required in this case may be 32K or 16K.

Figures 70, 71:
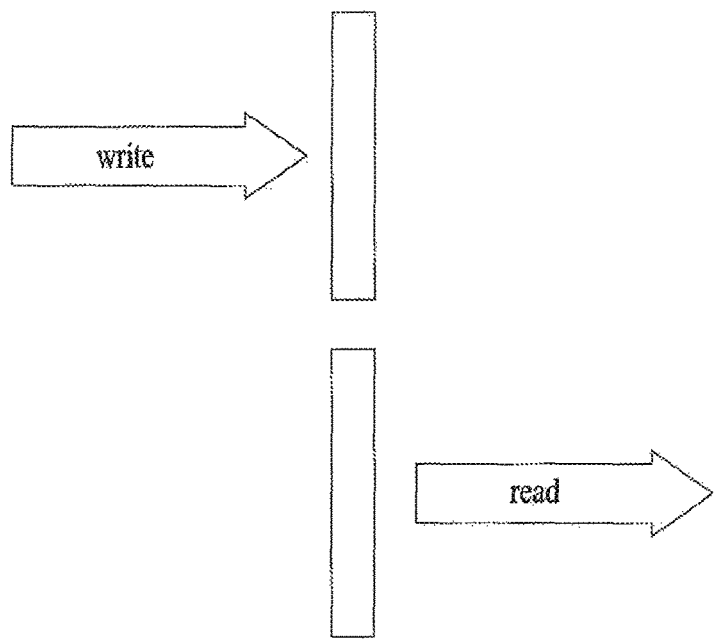
FIG. 70 illustrates an equation showing an interleaving address according to another embodiment of the present invention.
FIG. 71 illustrates a frequency deinterleaving process according to an embodiment of the present invention.

FIG. 70 illustrates an equation showing an interleaving address according to another embodiment of the present invention.

FIG. 70 corresponds to another embodiment of the equation showing an interleaving address, which is described above in relation to FIG. 65, and illustrates a process for generating an interleaving address $H_j(p)$ using the above-described basic interleaving sequence and the symbol offset. This equation may vary depending on the intention of a designer. A detailed description thereof has been given above and thus is omitted herein.

FIG. 71 illustrates a frequency deinterleaving process according to an embodiment of the present invention.

Specifically, FIG. 71 illustrates a frequency deinterleaving process at the receiver side in a case when a frequency interleaver of 16K or 8K FFT mode has performed frequency interleaving by applying a different interleaving sequence per data cells corresponding to each OFDM symbol. In this case, since frequency deinterleaving may be performed using double memories as described above, the receiver side may perform frequency deinterleaving in a ping-pong structure. A basic interleaving sequence used in this case is the same as that used at the transmitter side.

A description is now given of the structure of a signal frame of the broadcast signal transmission/reception apparatus for future broadcast services, according to an embodiment of the present invention.

Figure 72:
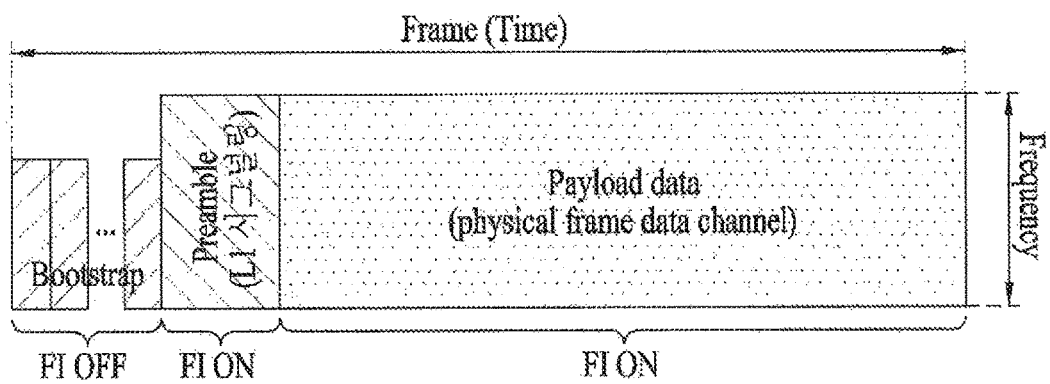
FIG. 72 illustrates the logical structure of a signal frame according to an embodiment of the present invention.

FIG. 72 illustrates the logical structure of a signal frame according to an embodiment of the present invention.

FIG. 72 corresponds to another embodiment of the frame described above in relation to FIGS. 1 to 29, and the logical structure of the signal frame according to an embodiment of the present invention may include a bootstrap, preamble symbols (L1 signaling), and payload data symbols (or data symbols).

The bootstrap illustrated in FIG. 72 may correspond to the above-described preamble, the preamble symbols illustrated in FIG. 72 may correspond to the above-described FSS, and the payload data symbols may correspond to the normal data symbols. In addition, L1 signaling may correspond to the above-described PLS1 or PLS2 signaling.

The bootstrap according to an embodiment of the present invention may be inserted at a front part of the signal frame, and may be processed to have robustness compared to the preamble or the payload data in such a manner that the broadcast signal reception apparatus can detect the corresponding signal frame. In addition, the bootstrap according to an embodiment of the present invention may carry essential broadcast system information and essential information for accessing a corresponding broadcast system. The bootstrap according to an embodiment of the present invention may include Emergency Alert System (EAS) wake-up information, system information, preamble structure indicator information, information for future extension, etc.

The preamble structure indicator information according to an embodiment of the present invention may include an FFT mode of the preamble, the number of active carriers (NoA) of the preamble, the number of OFDM symbols included in the preamble, etc.

As illustrated in the figure, the above-described frequency interleaving process is performed on the preamble symbols and the data symbols according to an embodiment of the present invention (FI ON), but frequency interleaving is not performed on the bootstrap (H OFF).

A description is now given of frequency interleaving of preamble symbols according to an embodiment of the present invention.

Figure 73:
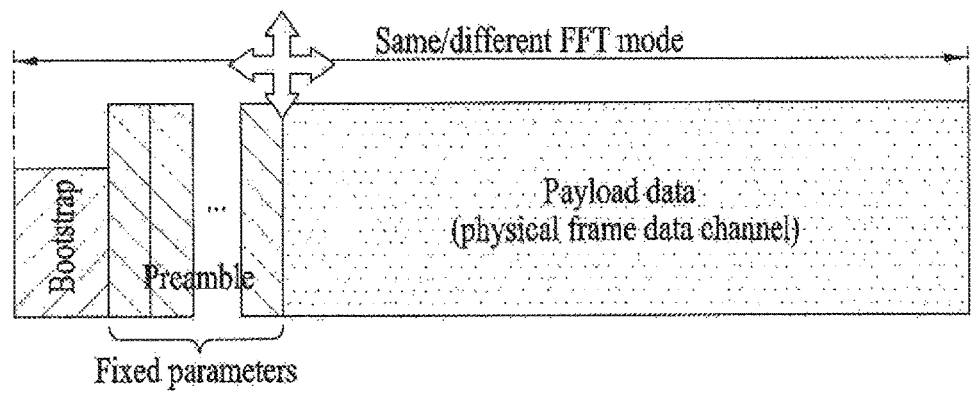
FIG. 73 illustrates the structure of preamble symbols according to an embodiment of the present invention.

FIG. 73 illustrates the structure of preamble symbols according to an embodiment of the present invention.

The preamble symbols according to an embodiment of the present invention may include one or more OFDM symbols based on the number of bits of L1 signaling information to be transmitted. The L1 signaling information to be transmitted using the preamble symbols may be mapped to active carriers of the OFDM symbols, and then frequency-interleaved. In this case, input data of a frequency interleaver may be preamble cells corresponding to the OFDM symbols.

Parameters of the preamble symbols have arbitrary fixed values unlike data symbols.

Therefore, the broadcast signal reception apparatus according to an embodiment of the present invention may process the preamble symbols without acquiring signaling information of the preamble from a bootstrap, and may reduce a service acquisition time including a channel scan time by rapidly acquiring the L1 signaling information carried by the preamble symbols. In addition, the possibility of FFT/GI acquisition failure may be minimized even in a poor channel environment and thus broadcast signal reception performance may be improved.

Parameters of the preamble symbols and preconditions for using the parameters according to an embodiment of the present invention are as described below.

Initially, the smallest FFT mode (e.g., 8K FFT mode) may be applied to the preamble symbols to improve flexibility in operating a broadcast signal system. In addition, the NoA of the preamble symbols may be fixed to allow the receiver to detect the preamble symbols without signaling the bootstrap. Furthermore, the number of preamble symbols may be determined in consideration of the relationship between the FFT mode of the preamble symbols and the FFT mode of the data symbols.

If the FFT mode of the preamble symbols is different from the FFT mode of the data symbols, the number of preamble symbols is restricted to an even number. This serves to consecutively frequency-deinterleave the data symbols using a single memory by the broadcast signal reception apparatus.

If the FFT mode of the preamble symbols is the same as the FFT mode of the data symbols, the number of preamble symbols is not restricted. That is, an odd or even number of preamble symbols may be used irrespective of the data symbols.

Figure 74:
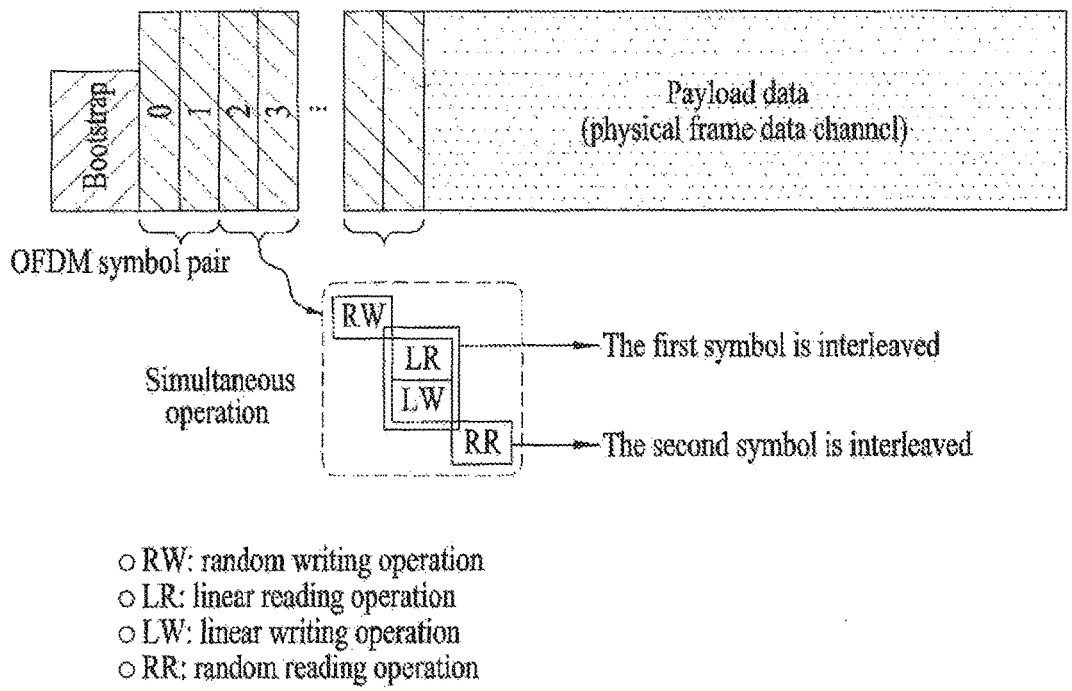
FIG. 74 illustrates a frequency interleaving process of preamble symbols according to an embodiment of the present invention.

FIG. 74 illustrates a frequency interleaving process of preamble symbols according to an embodiment of the present invention.

Specifically, FIG. 74 illustrates a frequency interleaving process applied to preamble cells corresponding to the preamble symbols in a case when the FFT mode of the preamble symbols is different from the FFT mode of the data symbols.

In this case, the number of preamble symbols described above in relation to FIG. 73 may be an even number. The frequency interleaver according to an embodiment of the present invention may perform frequency interleaving by regarding preamble cells corresponding to an OFDM symbol pair including two consecutive symbols, as one group.

As illustrated in a lower part of the figure, the frequency interleaver according to an embodiment of the present invention may write preamble cells corresponding to an even symbol of an OFDM symbol pair, to memory using an interleaving sequence, and read preamble cells corresponding to an odd symbol of the OFDM symbol pair, from memory using the interleaving sequence. In addition, the write operation and the read operation of the frequency interleaver according to an embodiment of the present invention are consecutively performed on input preamble cells and may be performed simultaneously.

That is, if preamble cells corresponding to an odd symbol (the second symbol) are input after preamble cells corresponding to an even symbol (the first symbol) are randomly written to memory, the frequency interleaver according to an embodiment of the present invention may linearly read the written preamble cells corresponding to the even symbol and, at the same time, linearly write the input preamble cells corresponding to the odd symbol to the memory. After that, the preamble cells corresponding to the odd symbol which are written to the memory may be randomly read.

As a result, the broadcast signal reception apparatus or the frequency deinterleaver included in the broadcast signal reception apparatus according to an embodiment of the present invention may perform frequency deinterleaving using a single memory. This principle is equally applied to a frequency interleaving process of the data symbols.

Figure 75:
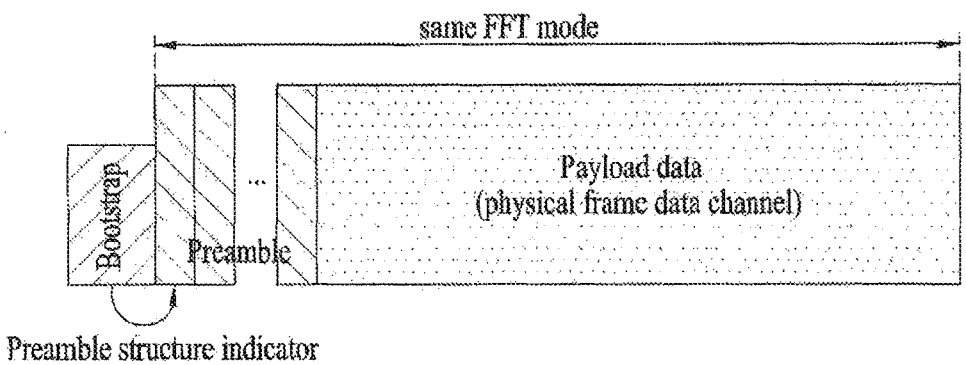
FIG. 75 illustrates a frequency interleaving process of preamble symbols according to another embodiment of the present invention.

FIG. 75 illustrates a frequency interleaving process of preamble symbols according to another embodiment of the present invention.

Specifically, FIG. 75 illustrates a frequency interleaving process applied to preamble cells corresponding to the preamble symbols in a case when the FFT mode of the preamble symbols is the same as the FFT mode of the data symbols.

In this case, it is assumed that the preamble symbols use the same parameters (FFT/GI/NoA) as the data symbols, and the broadcast signal reception apparatus acquires parameter information of the preamble symbols and information about the number of preambles from the bootstrap (preamble structure indicator information). In addition, as described above in relation to FIG. 73, the number of preamble symbols may be an even number or an odd number.

FIG. 75 illustrates the frequency interleaving process in a case when the number of preamble symbols is an even number. Therefore, the frequency interleaver according to an embodiment of the present invention may perform frequency interleaving by regarding preamble cells corresponding to an OFDM symbol pair including two consecutive symbols, as one group. A detailed description thereof has been given above in relation to FIG. 74 and thus is omitted herein.

Figure 76:
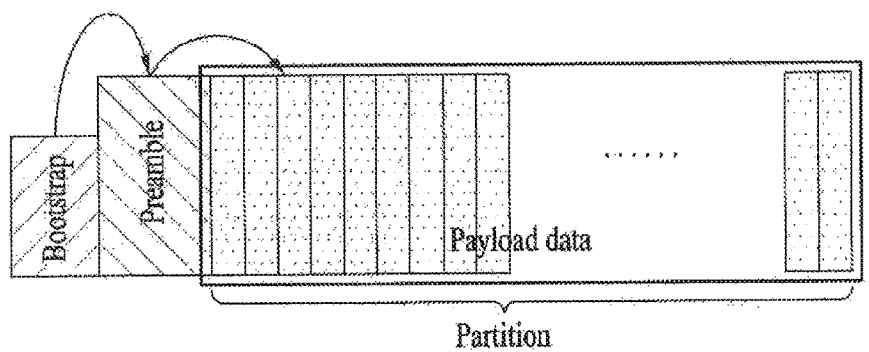
FIG. 76 illustrates the signaling structure of the logical structure of a signal frame according to an embodiment of the present invention.

FIG. 76 illustrates the signaling structure of the logical structure of a signal frame according to an embodiment of the present invention.

Specifically, FIG. 76 illustrates signaling information/content to be transmitted in the order of a bootstrap, preamble symbols, and data symbols for frequency interleaving and frequency deinterleaving according to an embodiment of the present invention, and an overall operation mechanism thereof. If different FFT modes are applied to the data symbols according to the present invention, a set of data symbols to be processed in the same FFT mode may be called a partition.

The signal frame according to an embodiment of the present invention may includes at least one partition and the partition can be referred as a sub frame (or sub-frame). It can be changed by a designer's intention.

FIG. 76 illustrates the logical structure of the signal frame in a case when the same or different FFT modes are applied to the data symbols.

As described above, the bootstrap according to an embodiment of the present invention carries information required to acquire the preamble symbols by the broadcast signal reception apparatus. Specifically, the bootstrap according to an embodiment of the present invention may carry FFT mode information of the preamble symbols, the NoA of the preamble symbols, the number of preamble symbols, etc.

The preamble symbols according to an embodiment of the present invention may carry information required to detect the data symbols by the broadcast signal reception apparatus. Specifically, the preamble symbols according to an embodiment of the present invention may include the number of partitions, FFT mode information per partition, the NoA of data symbols included in each partition, the number of data symbols per each partition, start symbol (or cell) information of each partition, a same FFT indicator indicating the location (or timing) of the same FFT mode within the signal frame, etc. The above-described information items may dynamically vary every signal frame.

Figure 77A:
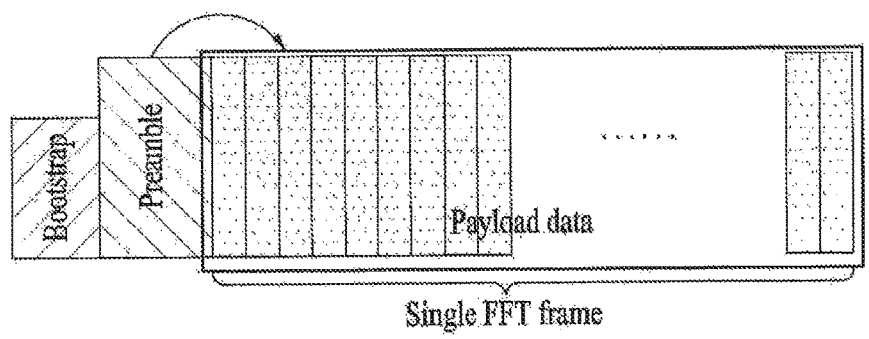
FIG. 77(a) and FIG. 77(b) illustrate the structure of payload data of a signal frame according to an embodiment of the present invention.
Figure 77B:
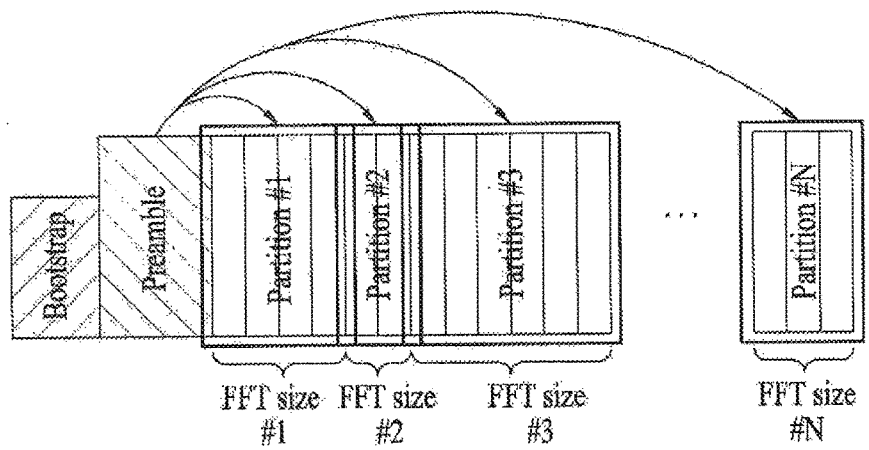

FIG. 77 illustrates the structure of payload data of a signal frame according to an embodiment of the present invention.

In this figure, (a) illustrates a payload data structure in a case when the same FFT mode is applied to payload data, i.e., data symbols, and (b) illustrates a payload data structure in a case when various FFT modes are applied to data symbols.

In the present invention, a signal frame illustrated in (a) may be called a single FFT signal frame, and a signal frame illustrated in (b) may be called a mixed-FFT-mode signal frame. The names thereof may vary depending on the intention of a designer.

In the case of (a), data symbols in one signal frame have the same OFDM symbol structure, and have the same parameters (e.g., FFT mode, GI length, NoA, pilot pattern, etc.). As described above, the parameters for the data symbols are transmitted using preamble symbols.

If the frequency interleaver according to an embodiment of the present invention operates per data cells corresponding to an OFDM symbol pair, the number of data symbols should be defined as an even number. Accordingly, the number of data symbols may be defined as described below based on the relationship between the FFT mode of the preamble symbols and the FFT mode of the data symbols.

If the FFT mode of the preamble symbols is different from the FFT mode of the data symbols, the number of data symbols should be an even number.

If the FFT mode of the preamble symbols is the same as the FFT mode of the data symbols, a sum of the number of preamble symbols and the number of data symbols should be an even number. As a result, the number of data symbols may be an even number or an odd number based on the number of preamble symbols.

In the case of (b), data symbols in one signal frame have a plurality of OFDM symbol structures, and have different parameters (e.g., FFT mode, GI length, NoA, pilot pattern, etc.) based on the symbol structure. Since a set of data symbols having the same OFDM structure in the mixed FFT frame may be defined as a partition, one mixed FFT frame may include a plurality of partitions.

Accordingly, as illustrated in the figure, parameters (e.g., FFT mode, GI length, NoA, pilot pattern, etc.) may be independently set for each partition, and the preamble symbols may include information about the location and structure of each partition, information about the number of data symbols, etc. In addition, the partitions of various FFT modes may be transmitted in a signal frame having a Time Division Multiplexing (TDM), Layered Division Multiplexing (LDM), or Frequency Division Multiplexing (FDM) structure, and a partition of each FFT mode may be defined as a set of OFDM symbols having a specific GI.

Different FFT modes may be defined to process broadcast services appropriate for a variety of broadcast signal reception apparatuses, e.g., a mobile broadcast signal reception apparatus and a fixed broadcast signal reception apparatus. Accordingly, if a target broadcast service or a target broadcast signal reception apparatus is determined per FFT mode, the broadcast signal reception apparatus may acquire and process only a partition of a broadcast service appropriate therefor, and thus a power saving effect of the receiver may be increased.

Frequency deinterleaving of the broadcast signal reception apparatus according to an embodiment of the present invention may be performed as described below based on the relationship between the number of data symbols of each partition and the number of preamble symbols in a case when the FFT mode of the preamble symbols is the same as or different from the FFT mode of the data symbols.

When the FFT mode of the preamble symbols is the same as the FFT mode of the data symbols of the first partition, if the number of preamble symbols and the number of data symbols of each partition are even numbers, deinterleaving may be performed as described below.

The broadcast signal reception apparatus may consecutively deinterleave the preamble symbols and the data symbols using a single memory (maximum value: 32K). Particularly, since the broadcast signal reception apparatus may perform deinterleaving using a single memory even when partitions have different FFT modes, efficient memory use may be achieved.

When the FFT mode of the preamble symbols is the same as the FFT mode of the data symbols of the first partition, if the number of preamble symbols is an odd number and the number of data symbols of each partition is an even number or an odd number, deinterleaving may be performed as described below.

In this case, the broadcast signal reception apparatus may not consecutively deinterleave the partitions corresponding to the different FFT modes, using a single memory. Accordingly, since the broadcast signal reception apparatus deinterleaves the preamble symbols and the data symbols using double memories, memory efficiency may be reduced.

When the FFT mode of the preamble symbols is different from the FFT mode of the data symbols of the first partition, if the number of preamble symbols and the number of data symbols of each partition are even numbers, deinterleaving may be performed as described below.

The broadcast signal reception apparatus may consecutively deinterleave the preamble symbols and the data symbols using a single memory (maximum value: 32K). Particularly, since the broadcast signal reception apparatus may perform deinterleaving using a single memory even when partitions have different FFT modes, efficient memory use may be achieved.

When the FFT mode of the preamble symbols is different from the FFT mode of the data symbols of the first partition, if the number of preamble symbols is an odd number and the number of data symbols of each partition is an even number or an odd number, deinterleaving may be performed as described below.

In this case, the broadcast signal reception apparatus may not consecutively deinterleave the partitions corresponding to the different FFT modes, using a single memory. Accordingly, since the broadcast signal reception apparatus deinterleaves the preamble symbols and the data symbols using double memories, memory efficiency may be reduced.

Accordingly, to allow the broadcast signal reception apparatus to efficiently perform frequency deinterleaving using a single memory, the FFT mode of the preamble symbols should be the same as the FFT mode of the first partition. In addition, to allow the broadcast signal reception apparatus to consecutively perform frequency deinterleaving even when partitions have different FFT modes, the number of data symbols in each partition may satisfy the following condition.

A sum of the number of preamble symbols and the number of data symbols in the first partition should be an even number. In addition, the number of data symbols included in the other partitions is an even number.

FIG. 78 illustrates a procedure for processing single-FFT-mode signal frames by the broadcast signal reception apparatus, according to an embodiment of the present invention.

In this figure, (a) illustrates a procedure for processing consecutively input single-FFT-mode signal frames of different FFT modes by the broadcast signal reception apparatus, and (b) illustrates a procedure for processing consecutively input single-FFT-mode signal frames before frequency deinterleaving by the broadcast signal reception apparatus.

Specifically, as illustrated in (a), in the single-FFT-mode signal frames, an FFT mode of preamble symbols may be the same as the FFT mode of data symbols in one signal frame, and different signal frames may have different FFT modes. This figure shows an embodiment in which the first signal frame has a 16K FFT mode, the second signal frame has a 8K FFT mode, the third signal frame has a 16K FFT mode, and the fourth and fifth signal frames have a 32K FFT mode. In addition, a sum of the number of preamble symbols and the number of data symbols next to the preamble symbols in each signal frame is an even number, and each signal frame may include one partition.

Each signal frame may include a bootstrap, one or more preamble symbols, and one or more data symbols. Information carried by the bootstrap and the preamble symbols is as described above.

Therefore, the broadcast signal reception apparatus according to an embodiment of the present invention may decode the preamble symbols using bootstrap information, and decode the data symbols using information carried by the preamble symbols.

As illustrated in (b), the broadcast signal reception apparatus according to an embodiment of the present invention may perform frequency deinterleaving on the signal frames received as illustrated in (a). The broadcast signal reception apparatus according to an embodiment of the present invention may perform frequency deinterleaving using the information included in the bootstrap and the preamble symbols, and the maximum reception memory size used in this case may be 32K. In addition, the broadcast signal reception apparatus according to an embodiment of the present invention may simultaneously perform read operation and write operation on input data corresponding to each OFDM symbol, and may consecutively perform frequency deinterleaving on the signal frames of the different FFT modes using a single memory.

Therefore, as illustrated in (b), if signal frame 0 of 32K FFT mode, signal frame 1 of 16K FFT mode, and signal frame 2 of 8K FFT mode are consecutively received, the broadcast signal reception apparatus according to an embodiment of the present invention may virtually change an input format of the frequency deinterleaver to efficiently performing frequency deinterleaving using a single 32K memory. In this figure, (b) illustrates a procedure for changing the input format by relocating the data symbols in each signal frame based on NoA of 32K FFT mode. In this case, the input format may vary depending on the intention of a designer or a reception apparatus implementation method.

Accordingly, if the input format of the frequency deinterleaver is changed as illustrated in a right block of (b), the frequency deinterleaver may perform frequency deinterleaving using a single memory irrespective of NoA of the signal frames of the different FFT modes.

FIG. 79 illustrates a procedure for processing single-FFT-mode signal frames by the broadcast signal reception apparatus, according to another embodiment of the present invention.

FIG. 79 corresponds to another embodiment of FIG. 78, and shows a case in which the broadcast signal reception apparatus frequency-deinterleaves only signal frames of one FFT mode using a single memory.

In this figure, (a) illustrates a procedure for detecting and processing only signal frames of 16K FFT mode among consecutively input single-FFT-mode signal frames by the broadcast signal reception apparatus, and (b) illustrates a procedure for selectively performing frequency deinterleaving on only signal frames of 32K FFT mode among consecutively input single-FFT-mode signal frames by the broadcast signal reception apparatus.

As illustrated in (a), the broadcast signal reception apparatus according to an embodiment of the present invention may selectively decode only the signal frames of 16K FFT mode. In the case of (a), a sum of the number of preamble symbols and the number of data symbols next to the preamble symbols in each signal frame is an even number, and each signal frame may include one partition. In addition, the broadcast signal reception apparatus according to an embodiment of the present invention may detect signal frames of the same FFT mode using a same FFT indicator carried by the preamble symbols.

In addition, as illustrated in (b), the broadcast signal reception apparatus according to an embodiment of the present invention may frequency-deinterleave only the signal frames of 32K FFT mode using a single memory having the maximum size of 32K.

Specifically, as illustrated in (b), if signal frame 0 of 32K FFT mode, signal frame 1 of 16K FFT mode, signal frame 2 of 8K FFT mode, and signal frame 3 of 32K FFT mode are consecutively received, the broadcast signal reception apparatus according to an embodiment of the present invention may detect and frequency-deinterleave only signal frames 0 and 4 of 32K FFT mode.

In this figure, (b) illustrates a procedure for changing an input format of the frequency deinterleaver by detecting only the signal frames of 32K FFT mode. Accordingly, if the input format of the frequency deinterleaver is changed as illustrated in a right block of (b), the frequency deinterleaver may frequency-deinterleave only the signal frames of 32K FFT mode using a single memory.

FIG. 80 illustrates a procedure for processing mixed-FFT-mode signal frames by the broadcast signal reception apparatus, according to an embodiment of the present invention.

In this figure, (a) illustrates a procedure for processing consecutively input mixed-FFT-mode signal frames of different FFT modes by the broadcast signal reception apparatus, and (b) illustrates a procedure for processing consecutively input mixed-FFT-mode signal frames before frequency deinterleaving by the broadcast signal reception apparatus.

Specifically, as illustrated in (a), in the mixed-FFT-mode signal frames, an FFT mode of preamble symbols may be the same as the FFT mode of the first partition in one signal frame, and a sum of the number of preamble symbols and the number of data symbols in a partition next to the preamble symbols may be an even number. In addition, the number of data symbols included in the other partitions may be an even number, and one mixed-FFT-mode signal frame may include partitions having two or more different FFT modes.

The figure shows an embodiment in which the first signal frame includes partitions of 8K and 16K FFT modes, the second signal frame includes partitions of 8K and 32K FFT modes, the third signal frame includes partitions of 8K, 16K, and 32K FFT modes, the fourth signal frame includes partitions of 8K and 16K FFT modes, and the fifth signal frame includes partitions of 8K and 32K FFT modes.

In addition, each signal frame may include a bootstrap, one or more preamble symbols, and one or more data symbols. Information carried by the bootstrap and the preamble symbols is as described above.

Therefore, the broadcast signal reception apparatus according to an embodiment of the present invention may decode the preamble symbols using bootstrap information, and decode the data symbols using information carried by the preamble symbols. Particularly, the broadcast signal reception apparatus according to an embodiment of the present invention may check the location and FFT mode of each partition in one signal frame using start symbol (or cell) information of each partition and FFT mode information per partition, which are carried by the preamble symbols.

As illustrated in (b), the broadcast signal reception apparatus according to an embodiment of the present invention may perform frequency deinterleaving on the signal frames received as illustrated in (a). The broadcast signal reception apparatus according to an embodiment of the present invention may perform frequency deinterleaving using the information included in the bootstrap and the preamble symbols, and the maximum reception memory size used in this case may be 32K. In addition, the broadcast signal reception apparatus according to an embodiment of the present invention may simultaneously perform read operation and write operation on input data corresponding to each OFDM symbol, and may consecutively perform frequency deinterleaving on data corresponding to two or more FFT modes, which is included in one signal frame, using a single memory.

Therefore, as illustrated in (b), if a mixed-FFT-mode signal frame including a partition of 32K FFT mode, a partition of 16K FFT mode, and a partition of 8K FFT mode is received, the broadcast signal reception apparatus according to an embodiment of the present invention may virtually change an input format of the frequency deinterleaver to efficiently performing frequency deinterleaving using a single 32K memory. In this figure, (b) illustrates a procedure for changing the input format by relocating the data symbols included in the partitions of the mixed-FFT-mode signal frame based on NoA of 32K FFT mode. In this case, the input format may vary depending on the intention of a designer or a reception apparatus implementation method.

Accordingly, if the input format of the frequency deinterleaver is changed as illustrated in a right block of (b), the frequency deinterleaver may frequency-deinterleave partitions of different FFT modes in one mixed-FFT-mode signal frame, using a single memory.

FIG. 81 illustrates a procedure for processing mixed-FFT-mode signal frames by the broadcast signal reception apparatus, according to another embodiment of the present invention.

FIG. 81 corresponds to another embodiment of FIG. 80, and shows a case in which the broadcast signal reception apparatus frequency-deinterleaves only partitions of a specific FFT mode using a single memory.

In this figure, (a) illustrates a procedure for detecting and processing only partitions of a specific FFT mode, e.g., 16K FFT mode, which are included in consecutively input mixed-FFT-mode signal frames of different FFT modes, by the broadcast signal reception apparatus, and (b) illustrates a procedure for processing only partitions of 32K FFT mode, which are included in consecutively input mixed-FFT-mode signal frames, before frequency deinterleaving by the broadcast signal reception apparatus.

As illustrated in (a), the broadcast signal reception apparatus according to an embodiment of the present invention may selectively decode only the partitions of 16K FFT mode. An FFT mode of preamble symbols may be the same as the FFT mode of the first partition in one signal frame, and a sum of the number of preamble symbols and the number of data symbols in a partition next to the preamble symbols may be an even number. In addition, the number of data symbols included in the other partitions may be an even number, and one mixed-FFT-mode signal frame may include partitions having two or more different FFT modes.

The broadcast signal reception apparatus according to an embodiment of the present invention may decode the preamble symbols using bootstrap information, and decode the data symbols using information carried by the preamble symbols. Particularly, the broadcast signal reception apparatus according to an embodiment of the present invention may check the location and FFT mode of each partition in a current signal frame using start symbol (or cell) information of each partition and FFT mode information per partition, which are carried by the preamble symbols, may process partitions of a desired FFT mode, and detect partitions of the same FFT mode, which are transmitted in different signal frames, using a same FFT indicator.

As illustrated in (b), the broadcast signal reception apparatus according to an embodiment of the present invention may frequency-deinterleave only the partitions of 32K FFT mode using a single memory having the maximum size of 32K.

Specifically, as illustrated in (b), if signal frame 0 including partitions of 32K, 16K, and 8K FFT modes, and signal frame 1 including partitions of 32K FFT mode and other FFT modes are consecutively received, the broadcast signal reception apparatus according to an embodiment of the present invention may detect and frequency-deinterleave only the partition of 32K FFT mode in each signal frame.

In this figure, (b) illustrates a procedure for changing an input format of the frequency deinterleaver by detecting only the partitions of 32K FFT mode. Accordingly, if the input format of the frequency deinterleaver is changed as illustrated in a right block of (b), the frequency deinterleaver may frequency-deinterleave only the partitions of 32K FFT mode using a single memory.

Figure 82:
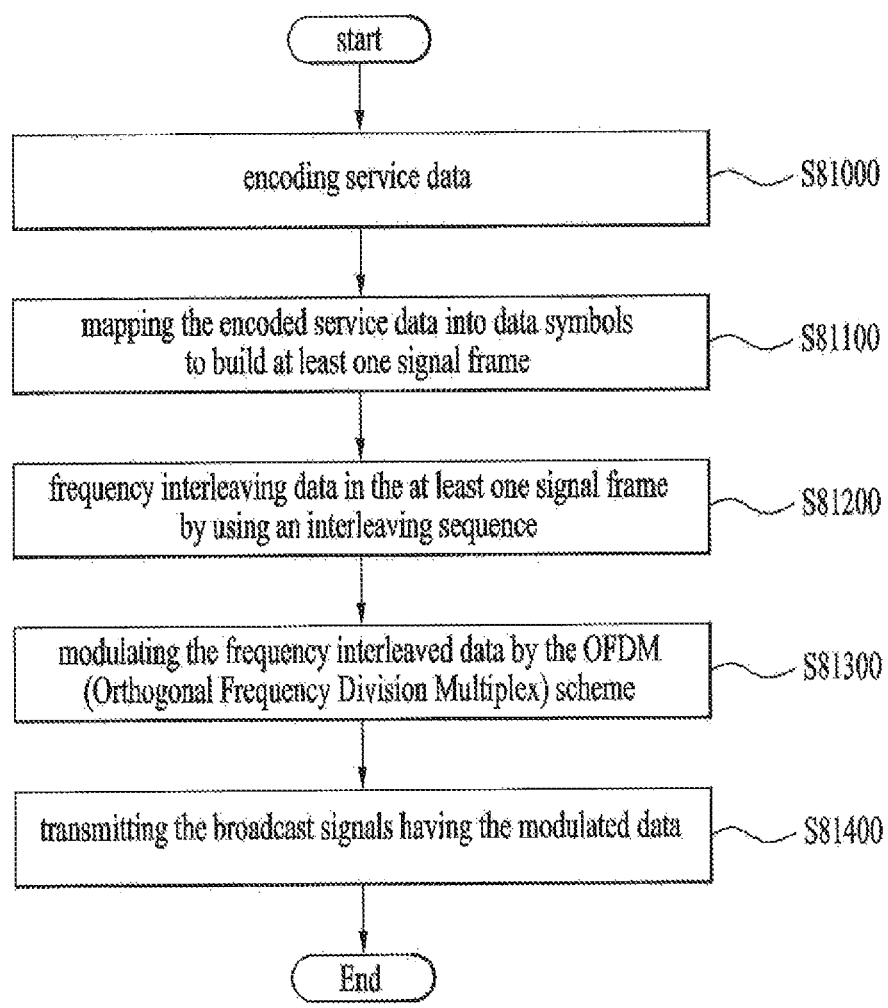
FIG. 82 is a flowchart illustrating a method for receiving broadcast signals according to an embodiment of the present invention.

FIG. 82 is a flowchart illustrating a method for receiving broadcast signals according to an embodiment of the present invention.

The apparatus for receiving broadcast signals according to an embodiment of the present invention may perform a reverse process of transmitting broadcast signals which is described in FIG. 1 to FIG. 8, FIG. 10 to FIG. 80.

The apparatus for receiving broadcast signals according to an embodiment of the present invention or a receiver can receive broadcast signals (S81000).

Then the apparatus for receiving broadcast signals according to an embodiment of the present invention or a synchronization & demodulation module in the apparatus for receiving broadcast signals can demodulate the received broadcast signals by an OFDM (Othogonal Frequency Division Multiplexing) scheme (S81100). Details are as described in FIG. 9.

The apparatus for receiving broadcast signals according to an embodiment of the present invention or the frequency deinterleaver can frequency de-interleave the demodulated broadcast signals by using a different interleaving sequence (S81200). The frequency deinterleaving is a reverse process described in FIG. 30 to FIG. 81.

Subsequently, the apparatus for receiving broadcast signals according to an embodiment of the present invention or the frame parsing module can parse at least one signal frame from the frequency deinterleaved broadcast signals (S81300). The detailed process of parsing is as described in FIG. 9.

Then, the apparatus for receiving broadcast signals according to an embodiment of the present invention or the demapping & decoding module can decode service data in the parsed at least one signal frame (S81400).

Details are as described in FIG. 9. In this case, the signal frame includes service data corresponding to each of a plurality of physical paths. As described above, a physical path is a logical channel in the physical layer that carries service data or related metadata, which may carry one or multiple service(s) or service component(s) and the title can be changed according to designer's intention. The physical path according to an embodiment of the present invention is equal to the DP which is described above.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

Both apparatus and method inventions are mentioned in this specification and descriptions of both of the apparatus and method inventions may be complementarily applicable to each other.

A module, a unit or a block according to embodiments of the present invention is a processor/hardware executing a sequence of instructions stored in a memory (or storage unit). The steps or the methods in the above described embodiments can be operated in/by hardwares/processors. In addition, the method of the present invention may be implemented as a code that may be written on a processor readable recording medium and thus, read by the processors provided in the apparatus according to embodiments of the present invention.

What is claimed is:

1. An apparatus for receiving broadcast signals, the apparatus comprising: a receiver to receive the broadcast signals;
    a demodulator to demodulate the received broadcast signals by an OFDM (Orthogonal Frequency Division Multiplex) scheme according to Fast Fourier Transformation (FFT) sizes;
    a frequency de-interleaver to frequency de-interleave the demodulated broadcast signals based on an FFT size, wherein the frequency de-interleaver is configured to: generate a de-interleaving sequence based on a toggle bit, a basic de-interleaving sequence, and a symbol offset, when the FFT size is 32K, a single permutation is applied to the basic de-interleaving sequence, and when the FFT size is 8K or 16K, at least two different permutations are applied to the basic de-interleaving sequence, and
    check whether or not an address of the interleaving sequence is within a range of an OFDM symbol with the FFT size; and
    de-interleave data in a signal frame in the demodulated broadcast signals using the generated de-interleaving sequence, when the address is within the range of the OFDM symbol; and
    a decoder to decode the de-interleaved data in the signal frame.

2. The apparatus of claim 1, wherein the symbol offset is generated based on the FFT size for two sequential OFDM symbols.

3. A method for receiving broadcast signals, the method comprising: receiving the broadcast signals;
    demodulating the received broadcast signals by an OFDM (Orthogonal Frequency Division Multiplex) scheme according to Fast Fourier Transformation (FFT) sizes;
    frequency de-interleaving the demodulated broadcast signals based an FFT size, the frequency de-interleaving include:
    generating a de-interleaving sequence based on a toggle bit, a basic de-interleaving sequence, and a symbol offset, when the FFT size is 32K, a single permutation is applied to the basic de-interleaving sequence, and when the FFT size is 8K or 16K, at least two different permutations are applied to the basic de-interleaving sequence;
    checking whether or not an address of the de-interleaving sequence is within a range of an OFDM symbol with the FFT size; and
    de-interleaving data in a signal frame in the demodulated broadcast signals using the generated de-interleaving sequence, when the address is within the range of the OFDM symbol; and
    decoding the de-interleaved data in the signal frame.

4. The method of claim 3, wherein the symbol offset is generated based on the FFT size for two sequential OFDM symbols.

* * * * *

UNITED STATES PATENT AND TRADEMARK OFFICE
CERTIFICATE OF CORRECTION

| | |
|---|---|
| PATENT NO. | : 9,917,720 B2 |
| APPLICATION NO. | : 15/687014 |
| DATED | : March 13, 2018 |
| INVENTOR(S) | : Jongseob Baek et al. |

Page 1 of 1

It is certified that error appears in the above-identified patent and that said Letters Patent is hereby corrected as shown below:

In the Claims

Column 72, Line 25, Claim 1, replace "the interleaving sequence" with --the de-interleaving sequence--

Column 72, Line 44, Claim 3, replace "include:" with --includes:--

Signed and Sealed this
Twenty-eighth Day of April, 2020

Andrei Iancu
*Director of the United States Patent and Trademark Office*